(12) United States Patent
Kang et al.

(10) Patent No.: US 11,889,184 B2
(45) Date of Patent: Jan. 30, 2024

(54) SERVER AND METHOD FOR PROVIDING CONNECTED SERVICE

(71) Applicant: THINKWARE CORPORATION, Seongnam-si (KR)

(72) Inventors: Young Su Kang, Seongnam-si (KR); Min Suk Kang, Seongnam-si (KR); Seung Yo Jang, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 17/867,960

(22) Filed: Jul. 19, 2022

(65) Prior Publication Data

US 2023/0023742 A1    Jan. 26, 2023

Related U.S. Application Data

(63) Continuation of application No. 16/987,848, filed on Aug. 7, 2020, now Pat. No. 11,451,701.

(30) Foreign Application Priority Data

| Aug. 8, 2019 | (KR) | 10-2019-0097009 |
| Jul. 15, 2020 | (KR) | 10-2020-0087298 |
| Jul. 23, 2020 | (KR) | 10-2020-0091801 |

(51) Int. Cl.
*H04N 23/661* (2023.01)
*H04L 67/12* (2022.01)
*H04L 65/1073* (2022.01)

(52) U.S. Cl.
CPC ....... *H04N 23/661* (2023.01); *H04L 65/1073* (2013.01); *H04L 67/12* (2013.01)

(58) Field of Classification Search
CPC .... H04N 23/661; H04L 65/1073; H04L 67/12
USPC .......................................................... 348/148
See application file for complete search history.

(56) References Cited

U.S. PATENT DOCUMENTS

| 11,025,854 B2 * | 6/2021 | Galluzzi ................ H04N 7/183 |
| 11,378,413 B1 * | 7/2022 | Rao .................... G01C 21/3605 |
| 2014/0192194 A1 | 7/2014 | Bedell et al. |
| 2016/0129883 A1 | 5/2016 | Penilla et al. |
| 2018/0032829 A1 | 2/2018 | Kim |

(Continued)

FOREIGN PATENT DOCUMENTS

WO    2016/210109 A1    12/2016

OTHER PUBLICATIONS

Extended European Search Report dated Sep. 4, 2020, issued in counterpart EP Application No. 20190058.6. (7 pages).

(Continued)

*Primary Examiner* — Frantz B Jean
(74) *Attorney, Agent, or Firm* — WHDA, LLP

(57) ABSTRACT

A method for providing a connected service of an image capturing apparatus for a vehicle is provided. The method includes connecting the image capturing apparatus for a vehicle to a server for providing a connected service using a wireless communication module; generating event data including event code information and operation mode information of the image capturing apparatus for a vehicle, when an event occurs in the image capturing apparatus for a vehicle; and transmitting the generated event data to the server for providing a connected service through the wireless communication module.

18 Claims, 119 Drawing Sheets

(56) References Cited

U.S. PATENT DOCUMENTS

2018/0367731 A1* 12/2018 Gatti .................. B60R 25/2063
2021/0124344 A1*  4/2021 Hu ......................... G01S 7/497
2021/0152732 A1*  5/2021 Eki ...................... A61B 1/045
2021/0341303 A1* 11/2021 Rappel-Kroyzer .........................
                                                    G08G 1/0141
2021/0382969 A1* 12/2021 Park ..................... G06V 20/59

OTHER PUBLICATIONS

Office Action dated Sep. 18, 2023, issued in counterpart EP application No. 20 190 058.6. (8 pages).

* cited by examiner

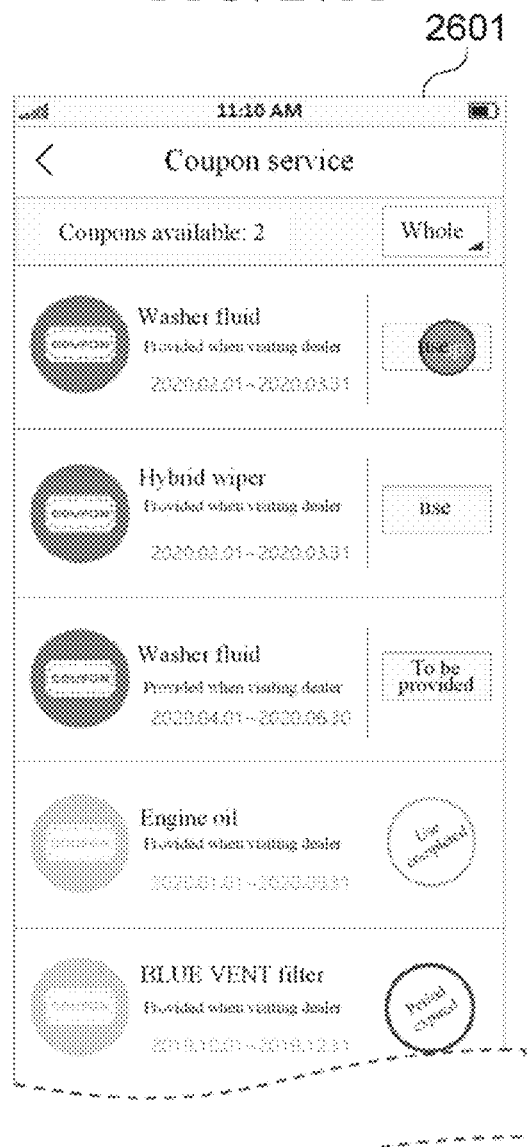

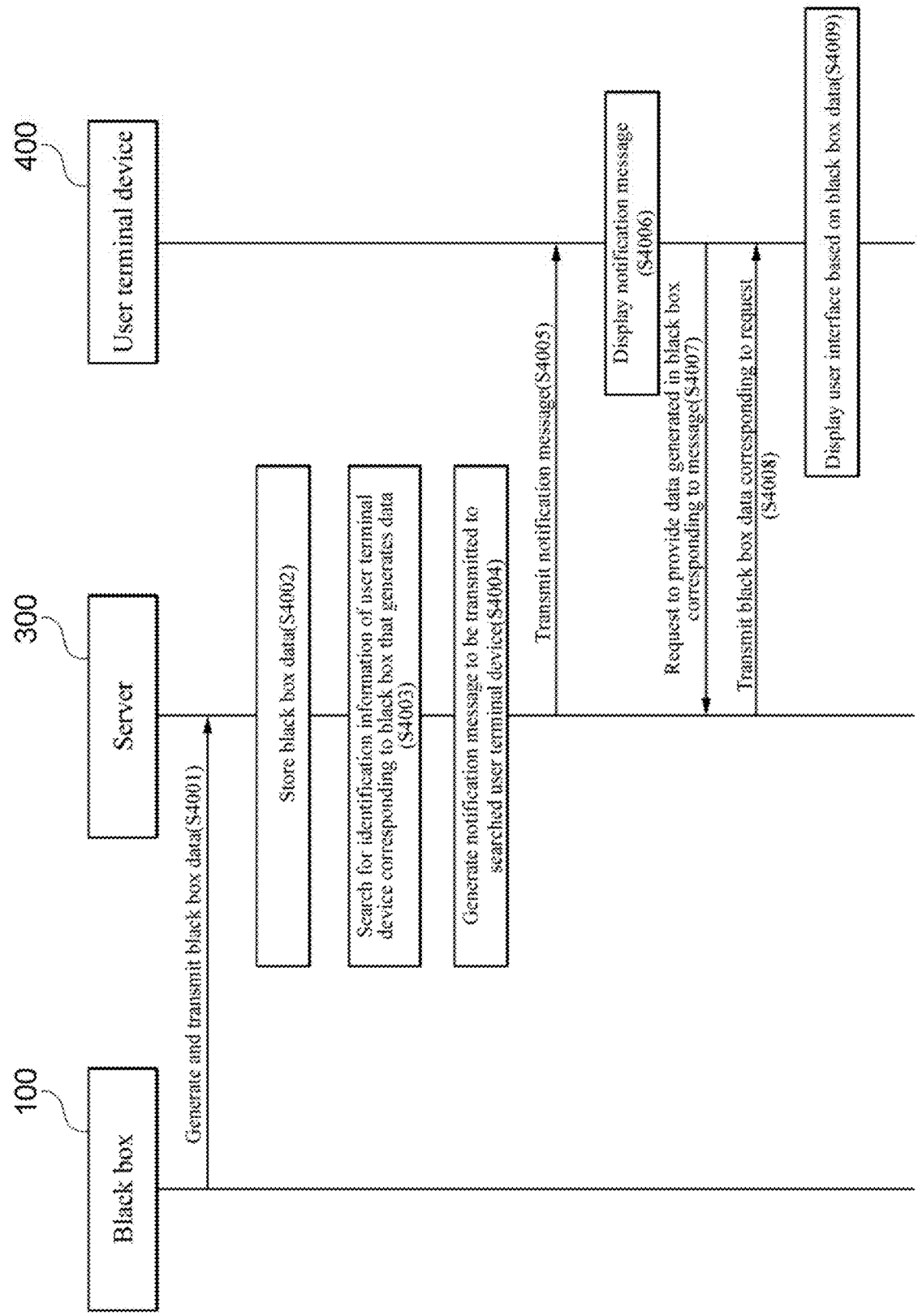

- Event Code = 4

| Byte | Type | Contents | Description |
|---|---|---|---|
| 4 | unsigned int | Auth Number | Server Authentication Number |

- Event Code = 13

| Byte | Type | Contents | Description |
|---|---|---|---|
| 1 | unsigned char | Shock Value | Shock Detection Value |
| 1 | unsigned char | Speed | Speed at Shock |
| 2 | unsigned short | Reserved | 0x00 0x00 |

- In Other Event Codes, 0x00 0x00 0x00 0x00

FIG. 53

| Event | Description |
|---|---|
| 1 | Front Camera Image |
| 2 | Rear Camera Image |
| 3 | Left Camera Image |
| 4 | Right Camera Image |

FIG. 54

| Bit | Description |
|---|---|
| 1 ~ 7 | Not Used |
| 0 | Encryption Flag (0 : Encrypted (default) / 1 : Not Encrypted) |

FIG. 55

| Value | Description |
|---|---|
| 1 | Lane Departure |
| 10 | Forward Collision Warning System (FCWS): 40 Km/h or more |
| 20 | Forward Collision Warning System (uFCWS): less than 30 Km/h |

US 11,889,184 B2

SERVER AND METHOD FOR PROVIDING CONNECTED SERVICE

CROSS-REFERENCE TO RELATED APPLICATION(S)

This application is a continuation of U.S. application Ser. No. 16/987,848, filed on Aug. 7, 2020 and issued on Sep. 20, 2022 as a U.S. Pat. No. 11,451,701, which claims benefit of priority to Korean Patent Application No. 10-2019-0097009 filed on Aug. 8, 2019, 10-2020-0087298 filed on Jul. 15, 2020 and 10-2020-0091801 filed on Jul. 23, 2020 in the Korean Intellectual Property Office, the disclosure of which is incorporated herein by reference in its entirety.

BACKGROUND

1. Field

The present invention relates to an image capturing apparatus for a vehicle, a server, a user terminal device, and a method for providing a connected service using the same that provide the connected service to the vehicle by utilizing a wireless communication network.

2. Description of Related Art

An image capturing apparatus for a vehicle, which is an apparatus that records images captured during driving, stopping, and parking of the vehicle, is very importantly used in identifying a cause of a vehicle's accident. Accordingly, in recent years, the number of vehicles equipped with the image capturing apparatus has been increasing.

Since the images captured by the image capturing apparatus for a vehicle include the images captured during driving, stopping, and parking of the vehicle and location information where the images were captured, the image capturing apparatus for a vehicle may further enhance a driving convenience for a driver and provide various functions or services utilizing such information.

SUMMARY

An object of the present invention is to implement a connected service that provides various meaningful information about a vehicle to a user of a user terminal device and receives various control commands from the user to control an operation of an image capturing apparatus for the vehicle, by enabling communication between the image capturing apparatus for the vehicle and the user terminal device.

According to an exemplary embodiment of the present invention, a method for providing a connected service of a server for providing the connected service, includes: storing service subscription information including information of a subscriber subscribed to a service and apparatus information of the subscriber; receiving a terminal registration request from an image capturing apparatus for a vehicle; determining validity of the terminal registration request by comparing identification information corresponding to the terminal registration request with pre-stored service subscription information; registering the image capturing apparatus for a vehicle as an apparatus supplied with a service when it is determined that the terminal registration request is valid; and receiving operation data generated in an operation process of the registered image capturing apparatus for a vehicle and storing the received operation data.

The operation data may include at least one of event data corresponding to an event occurring in the image capturing apparatus for a vehicle, image data captured in the image capturing apparatus for a vehicle, and location data of the image capturing apparatus for a vehicle.

The method for providing a connected service may further include: searching for identification information and/or subscriber identification information of a user terminal device corresponding the image capturing apparatus for a vehicle that transmits the operation data based on the stored service subscription information; generating a notification message to be transmitted to the user terminal device based on the searched information; and transmitting the generated notification message to the user terminal device.

The method for providing a connected service may further include, when operation data corresponding to the notification message is requested from the user terminal device, transmitting the operation data corresponding to the request of the user terminal device to the user terminal device.

The method for providing a connected service may further include: receiving a service provision request from the user terminal device; searching for subscriber identification information corresponding to a user terminal device requesting the service provision based on the stored service subscription information; and detecting the operation data corresponding to the searched subscriber identification information.

The method for providing a connected service may further include: providing the type of the detected operation data to the user terminal device; and transmitting operation data corresponding to a request of the user terminal device to the user terminal device when the provision of the operation data requested based on the type of the detected operation data from the user terminal device.

The terminal registration request of the image capturing apparatus for a vehicle may include at least one of identification information of the image capturing apparatus for a vehicle and identification information of a communication module included in the image capturing apparatus for a vehicle.

The terminal registration request of the user terminal device may include at least one of identification information of the user terminal device and identification information of a user for the user terminal device.

According to an exemplary embodiment of the present invention, a method for providing a connected service of an image capturing apparatus for a vehicle, includes: connecting the image capturing apparatus for a vehicle to a server for providing a connected service using a wireless communication module; generating event data including event code information and operation mode information of the image capturing apparatus for a vehicle, when an event occurs in the image capturing apparatus for a vehicle; and transmitting the generated event data to the server for providing a connected service through the wireless communication module.

The event may include a first event includes at least one of an impact occurrence event while parked, an impact occurrence event while driving, and a movement occurrence event while parked, the method may further include extracting at least two images of images captured within a predetermined time range of an occurrence of the first event when the first event occurs, and generating image upload data using the extracted images, and in the transmitting of the generated event data, the first event data and the image upload data may be transmitted to the server for providing a connected service through the wireless communication module.

The image upload data may include total image count information.

The event may include a second event including at least one of a parking location image request response event and a live image request response event according to a request in the user terminal device provided with the connected service, the method may further include extracting an image of a time point corresponding to the second event when the second event occurs and generating image upload data, and in the transmitting of the generated event data, the second event data and the image upload data may be transmitted to the server for providing a connected service through the wireless communication module.

The event may include a third event corresponding to an advance driving assistance system (ADAS) event, and the method may further include generating third event data including the type of the third event, an occurrence time of the third event, and an occurrence location of the third event, when the third event occurs.

The ADAS may include at least two of a front vehicle start notification, a front vehicle collision notification, and a lane departure notification.

The method for providing a connected service may further include: generating data for terminal registration request of the image capturing apparatus for a vehicle upon initial connection of the image capturing apparatus for a vehicle and transmitting the generated data to the server for providing a connected service through the wireless communication module; and receiving registration request response data including at least one of a traffic information day use time limit, a parking location image remaining count, a live image remaining count, and an impact image remaining count from the server for providing a connected service as a response to the terminal registration request.

The terminal registration request may be repeatedly performed whenever the power of the image capturing apparatus for a vehicle is turned on.

The wireless communication module may be NB-IOT or CAT-M1.

In the generating of the image upload data, the image capturing apparatus for a vehicle may adjust a size of data to be transmitted to the server in consideration of data communication speed with the server for providing a connected service, a state of a battery of the image capturing apparatus for a vehicle, and a size of a storage space allocated to the server for providing a connected service.

According to an exemplary embodiment of the present invention, a method for providing a connected service of a user terminal device, includes: accessing a server for providing a connected service; receiving data transmitted from an image capturing apparatus for a vehicle to the server for providing a connected service; and generating a user interface based on the received data and displaying the generated user interface, wherein the user interface includes a main user interface, and the main user interface displays at least two of connection state information of a connected image capturing apparatus for a vehicle, an operation mode of the image capturing apparatus for a vehicle, whether or not an impact event of the vehicle occurs, and whether or not a movement event of the vehicle occurs.

A vehicle image may be displayed on one region of the main user interface, and whether or not the impact event of the vehicle occurs and whether or not the movement event of the vehicle occurs may be displayed by an icon on the vehicle image.

A vehicle image may be displayed on one region of the main user interface, and the operation mode of the image capturing apparatus for a vehicle may include a normal recording mode and a parking recording mode, and a border of the vehicle image in the normal recording mode and the parking recording mode may be distinguished and displayed in different colors.

The user interface may include a driving information display region for displaying a driving record for a predetermined period of a vehicle driver, the driving record may include at least one of sudden deceleration, sudden acceleration, over-speed, forward collision warning, and lane departure warning, and the driving information display region may display the driving record by adjusting a size of a figure according to the number of times of each type of driving record.

The user interface may include the last parking location user interface, the last parking location user interface may display an image for the last parking location, and the image for the last parking location may be an image captured at a predetermined time point during a switching period, when the image capturing apparatus for a vehicle is switched from a normal recording mode to a parking recording mode according to a start-off after a parking of the vehicle is completed.

The user interface may include the last parking location user interface, and the last parking location user interface may display a current location of a user and the last parking location of the vehicle on a map, and display a relationship between both locations by connecting the current location of the user and the last parking location of the vehicle with a line.

The user interface may include an event user interface corresponding to an impact event or a movement event, the event user interface may display an event image, and the event image may be a motion image generated by combining at least two images between a predetermined time before an event occurrence and a predetermined time after the event occurrence.

The user interface may include a live user interface for displaying a live image, and the live image may be a motion image generated by combining at least two images after a live image request time point.

The live user interface may further display remaining available count information of the live image.

According to an exemplary embodiment of the present invention, a server for providing a connected service includes: a storage unit storing service subscription information including information of a subscriber subscribed to a service and apparatus information of the subscriber; a communication unit receiving a terminal registration request from an image capturing apparatus for a vehicle; and a control unit determining validity of the terminal registration request by comparing identification information corresponding to the terminal registration request with pre-stored service subscription information, and registering the image capturing apparatus for a vehicle as an apparatus provided with the service when it is determined that the terminal registration request is valid, wherein the control unit controls to store received operation data in the storage unit, when operation data generated in an operation process of the registered image capturing apparatus for a vehicle is received through the communication unit.

The operation data may include at least one of event data corresponding to an event occurring in the image capturing apparatus for a vehicle, image data captured in the image capturing apparatus for a vehicle, and location data of the image capturing apparatus for a vehicle.

The control unit may search for identification information and/or subscriber identification information of a user terminal device corresponding the image capturing apparatus for a vehicle that transmits the operation data based on the stored service subscription information, generate a notification message to be transmitted to the user terminal device based on the searched information, and control the communication unit to transmit the generated notification message to the user terminal device.

When operation data corresponding to the notification message is requested from the user terminal device, the control unit may control the communication unit to transmit the operation data corresponding to the request of the user terminal device to the user terminal device.

When a service provision request is received from the user terminal device, the control unit may search for subscriber identification information corresponding to a user terminal device requesting the service provision based on the stored service subscription information, and detect the operation data corresponding to the searched subscriber identification information.

The control unit may control the communication unit to provide the type of the detected operation data to the user terminal device, and control the communication unit to transmit operation data corresponding to a request of the user terminal device to the user terminal device when the provision of the operation data is requested based on the type of the detected operation data from the user terminal device.

The terminal registration request of the image capturing apparatus for a vehicle may include at least one of identification information of the image capturing apparatus for a vehicle and identification information of a communication module included in the image capturing apparatus for a vehicle.

The terminal registration request of the user terminal device may include at least one of identification information of the user terminal device and identification information of a user for the user terminal device.

According to an exemplary embodiment of the present invention, an image capturing apparatus fora vehicle includes: a communication unit communicating with a server for providing a connected service; and a control unit generating event data including event code information and operation mode information of the image capturing apparatus for a vehicle, when an event occurs in the image capturing apparatus for a vehicle, and controlling the communication unit to transmit the generated event data to the server for providing a connected service.

The event may include a first event includes at least one of an impact occurrence event while parked, an impact occurrence event while driving, and a movement occurrence event while parked, the control unit may extracts at least two images of images captured within a predetermined time range of an occurrence of the first event when the first event occurs, and generates image upload data using the extracted images, and transmits the first event data and the image upload data to the server for providing a connected service through the communication unit.

The image upload data may include total image count information.

The event may include a second event including at least one of a parking location image request response event and a live image request response event according to a request in the user terminal device provided with the connected service, the control unit may extract an image of a time point corresponding to the second event when the second event occurs and generates image upload data, and transmit the second event data and the image upload data to the server for providing a connected service through the communication unit.

The event may include a third event corresponding to an advance driving assistance system (ADAS) event, and the control unit may generate third event data including the type of the third event, an occurrence time of the third event, and an occurrence location of the third event, when the third event occurs.

The ADAS may include at least two of a front vehicle start notification, a front vehicle collision notification, and a lane departure notification.

The control unit may controls to generate data for terminal registration request of the image capturing apparatus for a vehicle upon initial connection of the image capturing apparatus for a vehicle and transmit the generated data to the server for providing a connected service through the communication unit, and the communication unit may receive registration request response data including at least one of a traffic information day use time limit, a parking location image remaining count, a live image remaining count, and an impact image remaining count from the server for providing a connected service as a response to the terminal registration request.

The terminal registration request may be repeatedly performed whenever the power of the image capturing apparatus for a vehicle is turned on.

The communication unit may be NB-IOT or CAT-M1.

The control unit may adjust a size of data to be transmitted to the server in consideration of data communication speed of the image capturing apparatus for a vehicle with the server for providing a connected service, a state of a battery of the image capturing apparatus for a vehicle, and a size of a storage space allocated to the server for providing a connected service.

According to an exemplary embodiment of the present invention, a user terminal device includes: a display unit; a communication unit accessing a server for providing a connected service and receiving data transmitted from an image capturing apparatus for a vehicle to the server for providing a connected service; and a control unit generating a user interface based on the received data and controlling the display unit to display the generated user interface, wherein the user interface includes a main user interface, and the main user interface displays at least two of connection state information of a connected image capturing apparatus for a vehicle, an operation mode of the image capturing apparatus for a vehicle, whether or not an impact event of the vehicle occurs, and whether or not a movement event of the vehicle occurs.

A vehicle image may be displayed on one region of the main user interface, and whether or not the impact event of the vehicle occurs and whether or not the movement event of the vehicle occurs may be displayed by an icon on the vehicle image.

A vehicle image may be displayed on one region of the main user interface, and the operation mode of the image capturing apparatus for a vehicle may include a normal recording mode and a parking recording mode, and a border of the vehicle image in the normal recording mode and the parking recording mode may be distinguished and displayed in different colors.

The user interface may include a driving information display region for displaying a driving record for a predetermined period of a vehicle driver, the driving record may include at least one of sudden deceleration, sudden acceleration, over-speed, forward collision warning, and lane departure warning, and the driving information display region may display the driving record by adjusting a size of a figure according to the number of times of each type of driving record.

The user interface may include the last parking location user interface, the last parking location user interface may display an image for the last parking location, and the image for the last parking location may be an image captured at a predetermined time point during a switching period, when the image capturing apparatus for a vehicle is switched from a normal recording mode to a parking recording mode according to a start-off after a parking of the vehicle is completed.

The user interface may include the last parking location user interface, and the last parking location user interface may display a current location of a user and the last parking location of the vehicle on a map, and display a relationship between both locations by connecting the current location of the user and the last parking location of the vehicle with a line.

The user interface may include an event user interface corresponding to an impact event or a movement event, the event user interface may display an event image, and the event image may be a motion image generated by combining at least two images between a predetermined time before an event occurrence and a predetermined time after the event occurrence.

The user interface may include a live user interface for displaying a live image, and the live image may be a motion image generated by combining at least two images after a live image request time point.

The live user interface may further display remaining available count information of the live image.

According to an exemplary embodiment of the present invention, a computer readable recording medium in which a program code for executing the method for providing a connected service described above is recorded may be provided.

According to an exemplary embodiment of the present invention, a computer program including a program code for executing the method for providing a connected service described above may be provided.

According to an exemplary embodiment of the present invention, a variety of meaningful information about the vehicle may be provided to the user of the user terminal device by providing the information generated in the image capturing apparatus for the vehicle to the server and the user terminal device through the wireless communication network. As an example, it is possible to enable the connected service connected between the vehicle, the image capturing apparatus for the vehicle, and the server, by exchanging a variety of data such as an image, a parking location, a parking time, whether impact/movement events are detected, and an ADAS driving record collected from the image capturing apparatus for the vehicle with the server and the user terminal device through the wireless communication network, and accordingly, it is possible to increase the convenience of the user having the vehicle and the image capturing apparatus for the vehicle.

Further, according to an exemplary embodiment of the present invention, the connected service that provides a variety of meaningful information about the vehicle to the user of the user terminal device may be implemented by applying low-power wide area communication-based Internet of Things (IoT) technology to the image capturing apparatus for the vehicle. As an example, more advanced functions may be expanded in transmission speed, transmission amount, power efficiency, and the like through the low-power wide area communication device, and a handover function that may monitor the vehicle at all times while driving may be applied.

Further, according to the present invention, an interworking protocol between the low-power wide area communication apparatus and the server for the connected service may be provided.

Meanwhile, the effects obtainable in the present invention are not limited to the effects mentioned above, and other effects that are not mentioned may be obviously understood by those skilled in the art to which the present invention pertains from the following description.

BRIEF DESCRIPTION OF DRAWINGS

The above and other aspects, features and other advantages of the present disclosure will be more clearly understood from the following detailed description taken in conjunction with the accompanying drawings, in which:

FIGS. 27A to 27C are diagrams illustrating a user interface illustrating a coupon usage process according to an exemplary embodiment of the present invention.

FIG. 40 is a timing diagram illustrating a method for providing a connected service according to an exemplary embodiment of the present invention.

FIG. 52 is a table illustrating Auth Number field.

FIG. 53 is a table illustrating Play Type field.

FIG. 54 is a table illustrating Function Flag field.

FIG. 55 is a table illustrating ADAS Event field.

DETAILED DESCRIPTION

Figure 1:
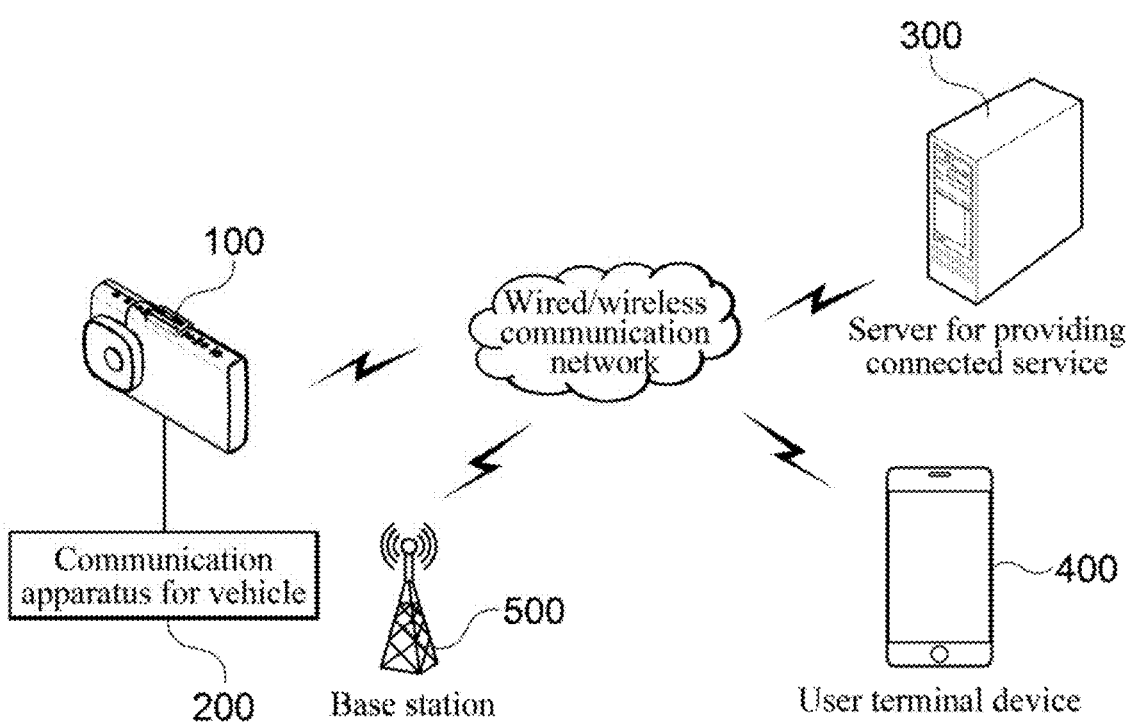
FIG. 1 is a block diagram illustrating a connected service system according to an exemplary embodiment of the present invention.

The following description merely illustrates the principles of the present invention. Therefore, those skilled in the art may implement the principle of the present invention and invent various devices included in the spirit and scope of the present invention, although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, a block diagram of the present specification shows a conceptual aspect of an illustrative circuit for embodying the principle of the present invention. Similarly, it is to be understood that all flowcharts, state transition diagrams, pseudo-codes, and the like, illustrate various processes that may be tangibly embodied in a computer readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute appropriate software as well as dedicated hardware. When the functions are provided by the processors, the functions may be provided by a single dedicated processor, a single shared processor, or a plurality of individual processors and some thereof may be shared with each other.

In addition, terms mentioned as a processor, a control, or a concept similar to the processor or the control should not be interpreted to exclusively cite hardware having the capability to execute software, but should be interpreted to implicitly include digital signal processor (DSP) hardware and a read only memory (ROM), a random access memory (RAM), and a non-volatile memory for storing software without being limited thereto. The above-mentioned terms may also include other well-known hardware.

In the claims of the present specification, components represented as means for performing functions mentioned in a detailed description are intended to include all methods for performing functions including all types of software including, for example, a combination of circuit elements performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become more obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make the gist of the present invention unclear, it will be omitted.

Hereinafter, various exemplary embodiments of the present invention will be described in detail with reference to the accompanying drawings.

FIG. 1 is a block diagram illustrating a connected service system according to an exemplary embodiment of the present invention. Referring to FIG. 1, a connected service system 1000 includes an image capturing apparatus 100 for a vehicle, a communication apparatus 200 for a vehicle, a server 300 for providing a connected service, a user terminal device 400, and a base station 500.

In the present invention, the vehicle is an example of a moving body, and the moving body according to the present invention is not limited to the vehicle. The moving body according to the present invention may include various objects that may be moved, such as a vehicle, a person, a bicycle, a ship, and a train. Hereinafter, for convenience of explanation, a case in which the moving object is the vehicle will be described as an example.

The base station 500 is a wireless communication facility that connects a network and various terminals for a service of wireless communication, and enables communication between the image capturing apparatus 100 for a vehicle, the communication apparatus 200 for a vehicle, the server 300 for providing a connected service, and the user terminal device 400 included in the connected service system 1000 according to the present invention. As an example, the communication apparatus 200 for a vehicle may be wirelessly connected to a communication network through the base station 500, and if the communication apparatus 200 for a vehicle is connected to the communication network, the communication apparatus 200 for a vehicle may exchange data with other devices (e.g., the server 300 for providing a connected service and the user terminal device 400) connected to the network.

The image capturing apparatus 100 for a vehicle may be provided in the vehicle to capture an image related to driving of the vehicle in a driving situation of the vehicle such as driving, stopping, and parking of the vehicle (hereinafter, driving, stopping, and parking are collectively referred to as driving), and store the captured image.

In addition, the image capturing apparatus 100 for a vehicle may be controlled by a user control input through the user terminal device 400. For example, when the user selects an executable object installed on the user terminal device 400, the image capturing apparatus 100 for a vehicle may perform operations corresponding to an event generated by a user input to the executable object. Here, the executable object may be a type of application installed on the user terminal device 400 to remotely control the image capturing apparatus 100 for a vehicle.

In addition, in the present specification, an action that triggers the operation of the image capturing apparatus 100 for a vehicle will be defined as an event. For example, the types of events may be impact detection, motion detection, user gesture detection, user touch detection, and reception of a control command from a remote. Here, the image capturing apparatus 100 for a vehicle may include all or some of a front capturing apparatus that captures the front of the vehicle, a rear capturing apparatus that captures the rear thereof, aside capturing apparatus that captures the left and right sides thereof, a capturing apparatus that captures a face of a driver of the vehicle, and an interior capturing apparatus that captures an interior of the vehicle.

In the present specification, an infra-red camera for a vehicle, a black-box for a vehicle, a car dash cam, or a car video recorder are different expressions of the image capturing apparatus 100 for a vehicle, and may all mean the same.

The communication apparatus 200 for a vehicle is an apparatus that is connected to the image capturing apparatus 100 for a vehicle to enable communication of the image capturing apparatus 100 for a vehicle, and the image capturing apparatus 100 for a vehicle may communicate with an external server through the communication apparatus 200 for a vehicle. Here, the communication apparatus 200 for a vehicle may use various wireless communication connection methods such as cellular mobile communication such as Long Term Evolution (LTE), and a wireless local area network (WLAN) method such as Wireless Fidelity (WiFi).

In addition, according to an exemplary embodiment of the present invention, the communication apparatus 200 for a vehicle performing wireless communication with the server may be implemented as a communication module using low-power wide-area (LPWA) technology. Here, as an example of the low-power wide-area technology, a low-power wideband wireless communication module such as Long Range (LoRa), Narrow Band-Internet of Things (NB-IoT), or Cat M1 may be used.

Hereinafter, for convenience of explanation, a case in which the communication apparatus 200 for a vehicle is implemented as a communication module using the low-power wide-area technology will be described as an example. However, this is only an example of implementation of the present invention, and the example of implementation of the communication apparatus 200 for a vehicle is not limited thereto, and the communication apparatus 200 for a vehicle according to the present invention may be implemented as any communication module that may communicate with external devices.

Meanwhile, the communication apparatus 200 for a vehicle according to an exemplary embodiment of the present invention may also perform a location tracking function such as a global positioning system (GPS) tracker.

In addition, in FIG. 1, the communication apparatus 200 for a vehicle is described as being an external type provided separately from the image capturing apparatus 100 for a vehicle, but is not limited thereto, and the communication apparatus 200 for a vehicle may also be implemented as a built-in communication module provided inside the image capturing apparatus 100 for a vehicle.

In the present specification, the dongle is another expression of the low-power wide-area communication apparatus (or low-power wide-area communication module) or the communication apparatus 200 for a vehicle, and may all mean the same.

The server 300 for providing a connected service relays various data between the communication apparatus 200 for a vehicle and the user terminal device 400 to enable various connected services to be described later.

As an example, the server 300 for providing a connected service may receive data including various information generated by the image capturing apparatus 100 for a vehicle from the communication apparatus 200 for a vehicle, and store the received data by matching the received data to user identification information. In addition, the server 300 for providing a connected service may transmit the data generated by the image capturing apparatus 100 for a vehicle to a user corresponding to the user identification information. Here, the user corresponding to the user identification information may mean a user with authority to data.

In this case, the user terminal device 400 may display a screen providing a variety of meaningful information based on the received data.

Here, the server 300 for providing a connected service may include a message queuing telemetry transport (MQTT) server and a transmission control protocol (TCP) server from a viewpoint of a messaging protocol.

MQTT is a lightweight publish/subscribe-based messaging protocol, and means a protocol designed to be used in low power and low bandwidth environments for the Internet of Things (IoT). The MQTT server according to the present invention performs communication with the communication apparatus 200 for a vehicle and the user terminal device 400 using the MQTT protocol, thereby enabling various connected services to be described later.

TCP means a protocol used in a transport layer, which a fourth layer of an OSI model developed as a communication standard. The TCP server according to the present invention performs communication with the communication apparatus 200 for a vehicle and the user terminal device 400 using the TCP protocol, thereby enabling various connected services to be described later.

The user terminal device 400 may be installed with an application (hereinafter, referred to as "connected service application") for transmitting and receiving various data to and from the image capturing apparatus 100 for a vehicle and/or the communication apparatus 200 for a vehicle through the server 300 for providing a connected service and displaying the result. Accordingly, the user may execute the connected service application installed on the user terminal device 400, and display a guide screen based on various data related to the driving situation of the vehicle received from the image capturing apparatus 100 for a vehicle according to the execution of the application. Here, the user terminal device 400 may be implemented as a smart phone, a tablet computer, a notebook computer, a personal digital assistant (PDA), or a portable multimedia player (PMP), or may also be implemented as a wearable device such as a smart glass wearable on a user's body, a head mounted display (HMD), or the like.

Here, the user may be a person having management authority for the vehicle and/or the image capturing apparatus 100 for a vehicle such as a vehicle owner, a vehicle driver, an owner of the image capturing apparatus 100 for a vehicle, or a supervisor of the image capturing apparatus 100 for a vehicle.

Hereinafter, the image capturing apparatus for a vehicle, the server for providing a connected service, and the user terminal device according to an exemplary embodiment of the present invention will be described in more detail with reference to the subsequent drawings.

Figure 2:
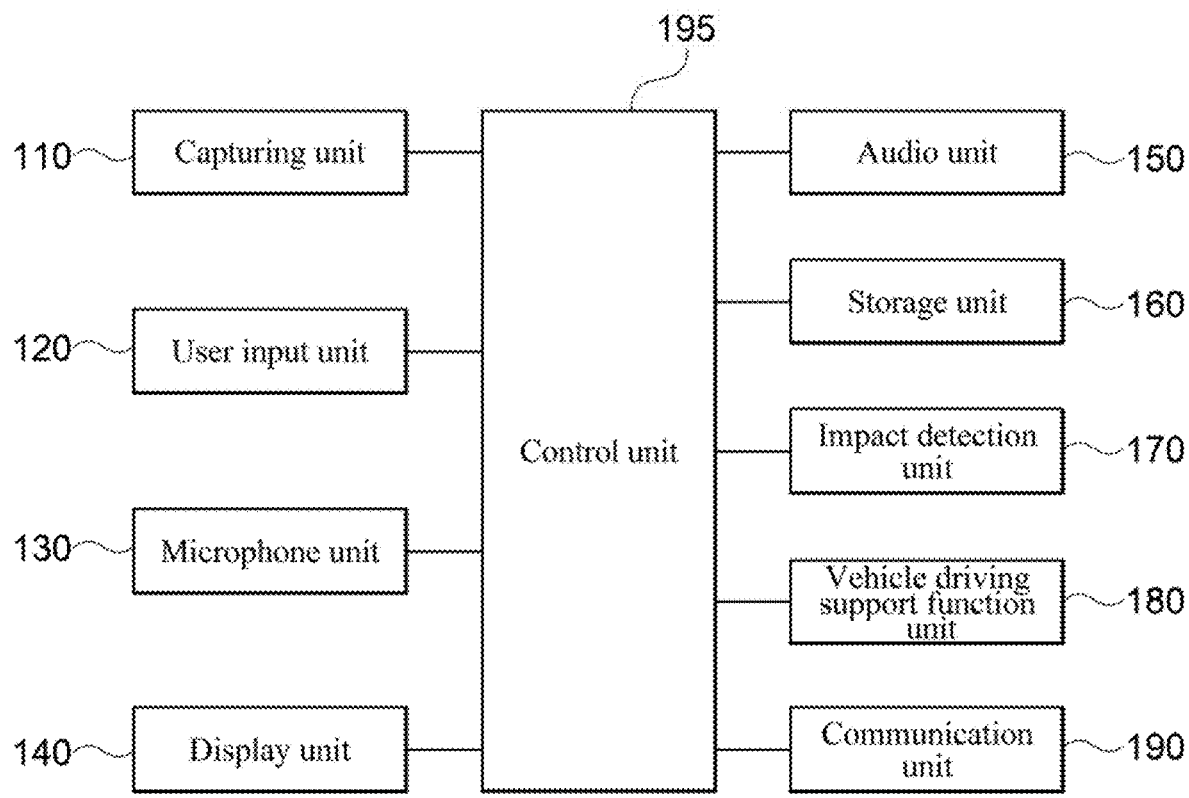
FIG. 2 is a block diagram illustrating an image capturing apparatus for a vehicle according to an exemplary embodiment of the present invention.

FIG. 2 is a block diagram illustrating the image capturing apparatus for a vehicle according to an exemplary embodiment of the present invention. Referring to FIG. 2, the image capturing apparatus 100 for a vehicle may include a capturing unit 110, a user input unit 120, a microphone unit 130, a display unit 140, an audio unit 150, a storage unit 160, an impact detection unit 170, a vehicle driving support function unit 180, a communication unit 190, and a control unit 195.

The capturing unit 110 may capture a driving image of the vehicle. Here, the driving image of the vehicle is an image captured in at least one situation of parking, stopping, and driving of the vehicle, and may include at least one image of the front, rear, side, and interior of the vehicle. At this time, the capturing unit 110 may also include an infrared camera that may monitor a face or a pupil of a driver, and the control unit 195 may determine a driver's state including whether the driver is drowsy or not by monitoring the face or the pupil of the driver through an infrared camera.

The capturing unit 110 may include a lens unit and an imaging element. The lens unit may perform a function of condensing an optical signal, and the optical signal transmitted through the lens unit 21 reaches an imaging area of the imaging element and forms an optical image. Here, as the imaging element, a charge coupled device (CCD), a complementary metal oxide semiconductor image sensor (CIS), a high speed image sensor, or the like that converts the optical signal into an electrical signal may be used. In addition, the capturing unit 110 may further include all or some of a lens unit driving unit, an aperture, an aperture driving unit, an imaging element control unit, and an image processor.

The user input unit 120 is a component that receives various user inputs for operating the image capturing apparatus 100 for a vehicle, and may receive, for example, a user input for setting an operation mode of the image capturing apparatus 100 for a vehicle, a user input for displaying a recorded image on the display unit 140, a user input for setting a manual recording, and the like.

Here, the operation mode of the image capturing apparatus 100 for a vehicle may include a normal recording mode, an event recording mode, a manual recording mode, and a parking recording mode.

The normal recording mode is a mode that is executed when an engine of vehicle is turned on and the vehicle starts driving, and the normal recording mode may be maintained while the vehicle continues to drive. In the normal recording mode, the image capturing apparatus 100 for a vehicle may perform recording in a predetermined time unit (e.g., 1 to 5 minutes). In the present invention, the normal recording mode and the normal mode may be used in the same sense.

The parking recording mode may refer to a mode in which the engine of vehicle is turned off or a battery supply for driving of the vehicle is stopped to operate in a parked state. In the parking recording mode, the image capturing apparatus 100 for a vehicle may perform recording during a certain period (for example, recording before 10 seconds to after 10 seconds of an occurrence of an event) from a predetermined time of the occurrence of an impact event to a predetermined time after the occurrence of the impact event. In the present invention, the parking recording mode and the parking mode may be used in the same sense.

The event recording mode may refer to a mode operated when an impact event is detected by the impact detection unit 170 or an advanced driving assistance system (ADAS) event is detected by the vehicle driving support function unit 180 while driving the vehicle. In the event recording mode, the image capturing apparatus 100 for a vehicle may perform recording during a time (for example, recording before 10 seconds to after 10 seconds of an occurrence of an event) from a predetermined time before the occurrence of the event to a predetermined time after the occurrence of the event.

The manual recording mode may refer to a mode operated by a user manually inputting recording. In the manual recording mode, the image capturing apparatus 100 for a vehicle may perform recording during a time (for example, recording before 10 seconds to after 10 seconds of an occurrence of an event) from a predetermined time before an occurrence of a manual recording request of the user to a predetermined time after the occurrence of the manual recording request of the user.

Here, the user input unit 120 may be configured in various ways that may receive a user input, such as a key pad, a dome switch, a touch pad, a jog wheel, and a jog switch.

The microphone unit 130 may receive a sound generated from the inside or outside of the vehicle or a voice according to a user's speech. Here, the received voice or sound may be related to a sound caused by an external impact or a situation inside/outside the vehicle, and may help to recognize a situation at the time together with an image captured by the capturing unit 110.

The display unit 140 may display a variety of information processed by the image capturing apparatus 100 for a vehicle. For example, the display unit may display a "live view image" which is an image captured in real time by the capturing unit 110, and may display a setting screen for setting an operation mode of the image capturing apparatus 100 for a vehicle.

The audio unit 150 may output audio data received from an external device or stored in the storage unit 160. Here, the audio unit 150 may be implemented as a speaker that outputs the audio data.

The storage unit 160 stores various data and programs necessary for the operation of the image capturing apparatus 100 for a vehicle. In particular, the storage unit 160 may store a driving image captured by the capturing unit 110 and voice data input through the microphone unit 130.

In addition, the storage unit 160 may classify and store data obtained according to the operation mode of the image capturing apparatus 100 for a vehicle in different storage areas.

The storage unit 160 may be configured inside the image capturing apparatus 100 for vehicle, or configured detachably through a port provided in the image capturing apparatus 100 for a vehicle, or may exist outside the image capturing apparatus 100 for a vehicle. When the storage unit 160 is configured inside the image capturing apparatus 100 for a vehicle, the storage unit 160 may exist in the form of a hard disk drive or flash memory. When the storage unit 160 is configured detachably in the image capturing apparatus 100 for a vehicle, the storage unit 160 may exist in the form of an SD card, a Micro SD card, a USB memory, or the like. When the storage unit 160 is configured outside the image capturing apparatus 100 for a vehicle, the storage unit 160 may exist in a storage space in another device or a database server through the communication unit 190.

The impact detection unit 170 may detect an impact applied to the vehicle or a case in which a change in acceleration is a certain amount or more. Here, the impact detection unit 170 may include an acceleration sensor, a geomagnetic sensor, and the like to detect impact or acceleration.

The vehicle driving support function unit 180 may determine whether or not a driving support function is required for the driver of the vehicle based on the driving image captured by the capturing unit 110.

As an example, the vehicle driving support function unit 180 may detect a start of a vehicle located in front of the vehicle and determine whether or not a forward vehicle start alarm (FVSA) is required for the driver, based on the driving image captured by the capturing unit 110. If a predetermined time has elapsed after the forward vehicle started, the vehicle driving support function unit 180 may determine that the forward vehicle start alarm is required.

In addition, the vehicle driving support function unit 180 may detect whether or not a signal is changed and determine whether or not a traffic light change alarm (TLCA) is required for the driver, based on the driving image captured by the capturing unit 110. As an example, if a stop state (0 km/h) is maintained for 4 seconds in a state in which the signal is changed from a stop signal to a straight signal, the vehicle driving support function unit 180 may determine that the traffic light change alarm is required.

In addition, the vehicle driving support function unit 180 may detect whether or not the vehicle departures from a lane and determine a lane departure warning system (LDWS) is required for the driver, based on the driving image captured by the capturing unit 110. As an example, when the vehicle departs from the lane, the vehicle driving support function unit 180 may determine that the lane departure warning system is required.

In addition, the vehicle driving support function unit 180 may detect a danger of a collision a vehicle in front of the vehicle and determine a forward collision warning system (FCWS) is required for the driver, based on the driving image captured by the capturing unit 110. As an example, the vehicle driving support function unit 180 may determine that a primary forward collision warning system is required when an initial forward collision danger is detected, and determine that a secondary forward collision warning system is required when an interval with the front vehicle is further reduced after the initial forward collision danger is detected.

Here, the forward collision warning system may further include an urban FCWS (uFCWS) that provides a forward collision warning at a lower driving speed so as to be suitable for an environment in which a driving speed is low.

The communication unit 190 may enable the image capturing apparatus 100 for a vehicle to communicate with other devices, where the communication unit 190 may be implemented as the low-power wide-area communication apparatus 200 described above. Accordingly, the image capturing apparatus 100 for a vehicle may communicate with the server 300 for providing a connected service and/or the user terminal device 400 through the communication unit 190. In addition, the communication unit 190 may be directly connected to the user terminal device 400, such as WiFi Direct.

Hereinafter, for convenience of explanation, a case in which the communication unit 190 is separately provided as the communication apparatus 200 for a vehicle will be described as an example.

The control unit 195 controls an overall operation of the image capturing apparatus 100 for a vehicle. Specifically, the control unit 195 may control all or some of the capturing unit 110, the user input unit 120, the microphone unit 130, the display unit 140, the audio unit 150, the storage unit 160, the impact detection unit 170, the vehicle driving support function unit 180, and the communication unit 190.

In particular, the control unit 195 may set the operation mode of the image capturing apparatus 100 for a vehicle to one of the normal recording mode, the event recording mode, the parking recording mode, and the manual recording mode, based on at least one of whether or not the vehicle is started, a measurement result of the battery voltage of the vehicle, a detection result of the impact detection unit 170, a determination result of the vehicle driving support function unit 180, and a set value of the operation mode. In addition, the control unit 195 may perform control to stop the operation of the image capturing apparatus 100 for a vehicle when the battery voltage of the vehicle falls below a threshold value or less.

In addition, the control unit 195 may generate data illustrated in FIGS. 5 to 11 to be described later based on various collected data. As an example, when the impact detection unit 170 detects an impact or a movement of the vehicle while parking or driving the vehicle, it is possible to generate impact event data, extract at least two images among images captured within a predetermined time range of event occurrence, and generate image upload data using the extracted images. Here, the movement of the vehicle may refer to a situation in which towing of the vehicle is performed.

As another example, the control unit 195 may generate event data corresponding to a parking location image request response event or a live image request response event, respectively, according to a request from the user terminal device receiving the connected service, and extract images at a time point corresponding to the events to generate an image upload data.

As another example, the control unit 195 may generate ADAS event data when it is determined that a driving support function is required for the vehicle driving support function unit 180. Here, the ADAS event data may include an event type indicating an ADAS event type, an event occurrence time, and an event occurrence location.

As another example, the control unit 195 may perform control to adjust a size of data to be transmitted to the server 300 in consideration of a data communication speed with the server 300 for providing a connected service, a state of the battery of the image capturing apparatus for a vehicle, a size of a user storage space allocated to the server 300 for providing a connected service, and the like.

Meanwhile, the control unit 195 may transmit the generated data to the server 300 for providing a connected service through the low-power wide-area communication module. Here, the data transmitted to the server 300 for providing a connected service may be used to provide a connected service to be described later.

Figure 3:
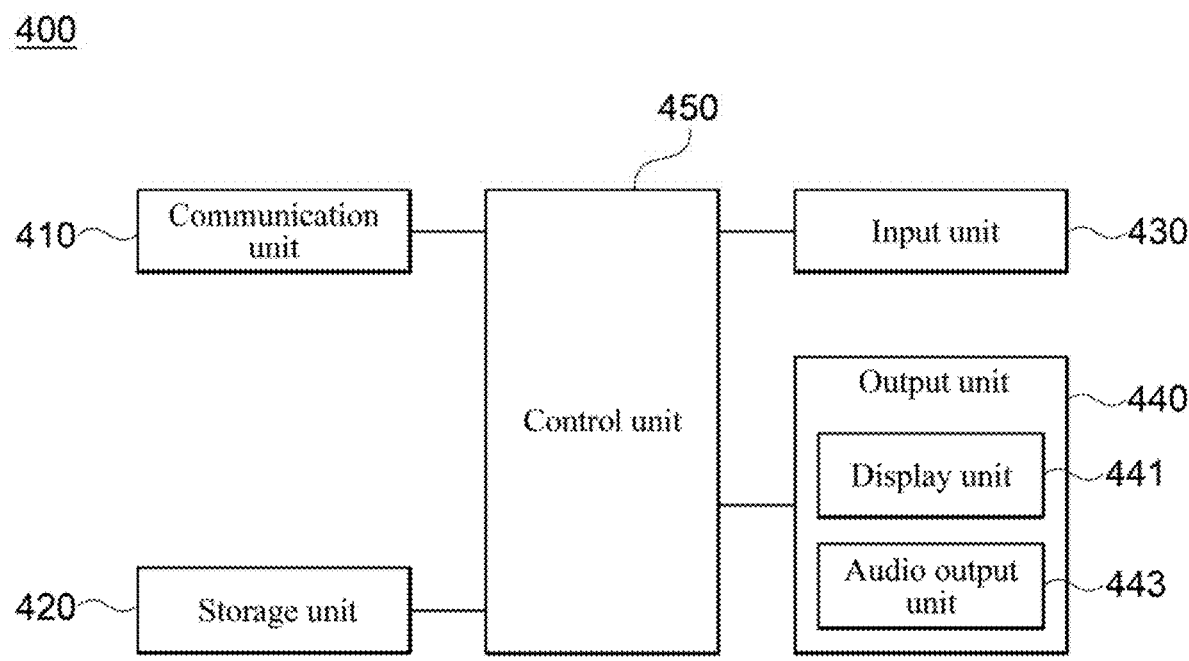
FIG. 3 is a block diagram illustrating a user terminal device according to an exemplary embodiment of the present invention.

FIG. 3 is a block diagram illustrating a user terminal device according to an exemplary embodiment of the present invention. Referring to FIG. 3, the user terminal device 400 may include all or some of a communication unit 410, a storage unit 420, an input unit, an output unit 440, and a control unit 450.

The communication unit 410 may be provided in order for the user terminal device 400 to communicate with other devices. Specifically, the user terminal device 400 may transmit and receive data to and from at least one of the image capturing apparatus 100 for a vehicle, the communication apparatus 200 for a vehicle, and the server 300 for providing a connected service.

Here, the communication unit 410 may be implemented using various communication schemes such as a connection form in a wireless or wired scheme through a local area network (LAN) and the Internet network, a connection form through a universal serial bus (USB) port, a connection form through a mobile communication network such as the 3G and 4G mobile communication networks, and a connection form through a short range wireless communication scheme such as near field communication (NFC), radio frequency identification (RFID), Wi-Fi, or the like.

The storage unit 420 serves to store various data and applications required for an operation of the user terminal device 400. In particular, the storage unit 420 may store a "connected service application" according to an exemplary embodiment of the present invention.

Here, the storage unit 420 may be implemented as a detachable type of storage element such as a USB memory, as well as an embedded type of storage element such as a random access memory (RAM), a flash memory, a read only memory (ROM), an erasable programmable ROM (EPROM), an electronically erasable and programmable ROM (EEPROM), a register, a hard disk, a removable disk, a memory card, or a universal subscriber identity module (USIM).

The input unit 430 serves to convert a physical input from the outside of the user terminal device 400 into a specific electrical signal. Here, the input unit 430 may include all or some of a user input unit and a microphone unit.

The user input unit may receive a user input such as a touch, a gesture, or a push operation. Here, the user input unit may be implemented in various types of buttons, a touch sensor receiving a touch input, and a proximity sensor receiving an approaching motion. In addition, the microphone unit may receive a voice of the user and a sound generated from the inside and the outside of the vehicle.

The output unit 440 is a component that outputs data of the user terminal device 400, and the output unit 440 may include a display unit 441 and an audio output unit 443.

The display unit 441 may output data visually recognizable by the user of the user terminal device 400. In particular, the display unit 441 may display a connected service user interface according to execution of the "connected service application" according to an exemplary embodiment of the present invention.

Here, the connected service user interface may include various user interfaces such as a "main user interface that aggregates and displays various information that is helpful to the user", a "last parking location guide user interface", a "live image display user interface", a "remote image playback user interface", a "coupon service user interface", and an "emergency SOS user interface". The various user interfaces will be described later with reference to FIGS. 12 to 37.

Meanwhile, the audio output unit 443 may output data auditorily recognizable by the user of the user terminal device 400. Here, the audio output unit 443 may be implemented as a speaker that expresses data to be notified to the user of the user terminal device 400 as sound.

The control unit 450 controls an overall operation of the user terminal device 400. Specifically, the control unit 450 may control all or some of the communication unit 410, the storage unit 420, the input unit 430, and the output unit 440. In particular, if various data is received from the image capturing apparatus 100 for a vehicle, the communication apparatus 200 for a vehicle, and/or the server 300 for providing a connected service through the communication unit 410, the control unit 450 may process the received data to generate a user interface, and control the display unit 441 to display the generated user interface.

The control unit 450 may execute applications that provide advertisements, the Internet, games, videos, and the like. In various exemplary embodiments, the control unit 450 may include one processor core (single core) or include a plurality of processor cores. For example, the control unit 450 may include a multi-core such as a dual-core, a quad-core, and a hexa-core. According to exemplary embodiments, the control unit 450 may further include a cache memory located internally or externally.

The control unit 450 may receive commands of other components of the user terminal device 400, interpret the received commands, and perform calculation or process data according to the interpreted commands.

The control unit 450 may process data or signals generated or occurring in an application. For example, the control unit 450 may request instructions, data, or signals to the storage unit 420 to execute or control the application. The control unit 450 may write (or store) or update the instructions, the data, or the signals in the storage unit 420 to execute or control the application.

The control unit 450 may interpret and process messages, data, instructions, or signals received from the communication unit 410, the storage unit 420, the input unit 430, and the output unit 440. In addition, the control unit 450 may generate new messages, data, instructions, or signals based on the received messages, data, instructions, or signals. The control unit 450 may provide the processed or generated messages, data, instructions, or signals to the communication unit 410, the storage unit 420, the input unit 430, the output unit 440, and the like.

All or part of the control unit 450 may be electrically or operably coupled with or connected to other components (e.g., the communication unit 410, the storage unit 420, the input unit 430, and the output unit 440) in the user terminal device 400.

According to exemplary embodiments, the control unit 450 may include one or more processors. For example, the control unit 450 may include an application processor (AP) for controlling a program of an upper layer such as an application program, a communication processor (CP) for performing a control for communication, or the like.

Meanwhile, the above-described input unit 430 may receive an instruction, interaction, or data from the user. The input unit 430 may sense a touch or hovering input of a finger and a pen. The input unit 430 may sense an input caused through a rotatable structure or a physical button. The input unit 430 may include sensors for sensing various types of inputs. The input received by the input unit 430 may have various types. For example, the input received by the input unit 430 may include a touch and release, a drag and drop, a long touch, a force touch, a physical depression, and the like. The input unit 430 may provide the received input and data related to the received input to the control unit 450. In various exemplary embodiments, although not illustrated in FIG. 3, the input unit 430 may include a microphone (or transducer) capable of receiving a user's voice command. In various exemplary embodiments, although not illustrated in FIG. 3, the input unit 430 may include an image sensor or a camera capable of receiving a user's motion.

Meanwhile, the above-described display unit 441 may output content, data, or signals. In various exemplary embodiments, the display unit 441 may display an image signal processed by the control unit 450. For example, the display unit 441 may display a capture or still image. As another example, the display unit 441 may display a video or a camera preview image. As another example, the display unit 441 may display a graphical user interface (GUI) so that the user may interact with the terminal device 400.

The display unit 441 may be configured with a liquid crystal display (LCD) or an organic light emitting diode (OLED).

According to exemplary embodiments, the display unit 441 may be configured with an integrated touch screen by being coupled with a sensor capable of receiving a touch input or the like.

In various exemplary embodiments, the control unit 450 may map at least one function to the input unit 430 such that the input unit 430 has at least one function among a plurality of functions that the user terminal device 400 may provide to the user. For example, the at least one function may include at least one of an application execution function, a vehicle's last parking location display function, a parking location guide function, a my driving record notification function, a live view viewing function, which is a real-time capturing image viewing function of the black box 100, a power on/off control function of the black box 100, a power on/off function of the vehicle, a function related to weather, a driving time guide function, a fuel efficiency guide function, a vehicle's parking/driving mode guide function, a vehicle driving information guide function, an event occurrence guide function, a vehicle's current location inquiry function, a vehicle's parking location and parking time guide function, a parking history guide function, a driving history guide function, an image sharing function, an event history function, a remote playback function, and an image viewing function.

In various exemplary embodiments, the input unit 430 may receive the configuration information from the control unit 450. The input unit 430 may display indications for indicating the functions based on the configuration information.

For example, referring to FIGS. 11 to 36 to be described later, the input unit 430 may display various indications as visual objects based on the configuration information received from the control unit 450.

In various exemplary embodiments, the control unit 450 may transmit the configuration information to the input unit 430 to indicate what the at least one function mapped to the input unit 430 is. The configuration information may include data for displaying, through the display unit 441, an indication for indicating which function of the plurality of functions is provided through the input unit 430. The configuration information may include data for indicating a function selected by the control unit 450 among the plurality of functions.

Figure 4:
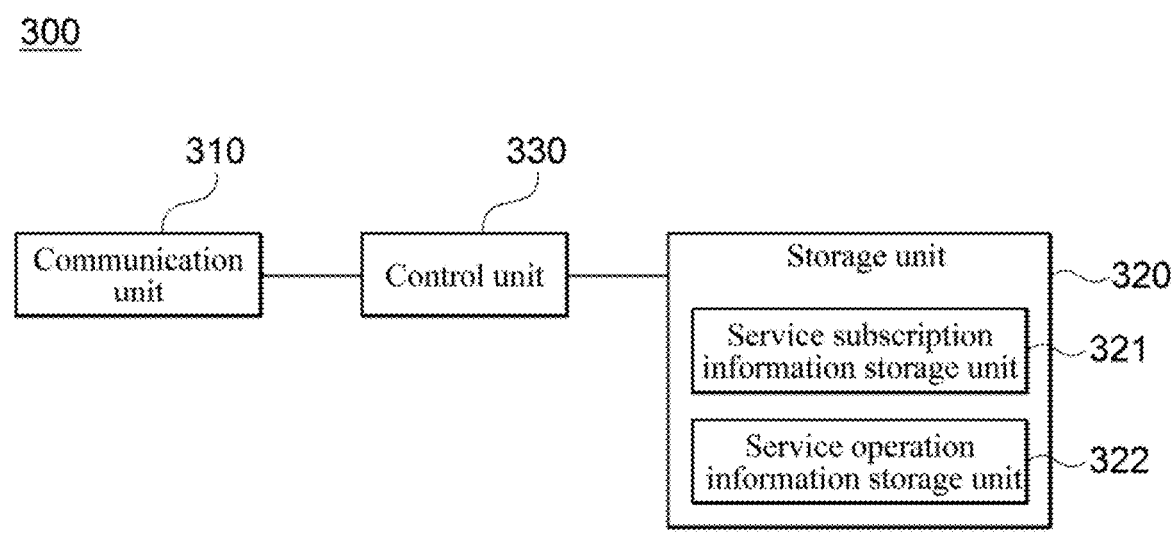
FIG. 4 is a block diagram illustrating a server for providing a connected service according to an exemplary embodiment of the present invention.

FIG. 4 is a block diagram illustrating a server for providing a connected service according to an exemplary embodiment of the present invention. Referring to FIG. 4, the server 300 for providing a connected service may include a communication unit 310, a storage unit 320, and a control unit 330.

The communication unit 310 may be provided in order for the server 300 for providing a connected service to communicate with other devices. Specifically, the communication unit 310 may transmit and receive data to and from at least one of the image capturing apparatus 100 for a vehicle, the communication apparatus 200 for a vehicle, and the user terminal device 400. Here, the communication unit 310 may be implemented as various well-known communication modules.

The storage unit 320 may store various data and programs for an operation of the server 300 for providing a connected service. Here, the storage unit 320 may include a service subscription information storage unit 321 and a service operation information storage unit 322.

Specifically, when a user who wants to receive a connected service subscribes to the service as a member using own terminal device 400, the service subscription information storage unit 321 may store service subscription information generated based on the information input through the member subscription. Here, the service subscription information storage unit 321 may store subscriber information subscribed to the connected service as the member and device information of the corresponding subscriber. The subscriber information may include subscriber identification information and subscription service information.

The subscription service information is information indicating in detail the service to which the subscriber has subscribed, and may include a service application history, a rate plan, a service expiration date, a data rate, a service type, and the like.

The subscriber identification information is information that enables identification of each of a plurality of subscribers, and may include a subscriber's ID, a subscriber's password, a subscriber's social security number, a subscriber's name, a subscriber's nickname, a subscriber's personal identification number (PIN), and the like.

In addition, the subscriber device information may include at least one of identification information of the image capturing apparatus 100 for a vehicle and identification information of the communication apparatus 200 for a vehicle purchased by the subscriber. Here, the identification information of the image capturing apparatus 100 for a vehicle is information that enables identification of each of a plurality of image capturing apparatuses for a vehicle, and may include a black box model name, a black box unique serial number, and the like. In addition, the identification information of the communication apparatus 200 for a vehicle is information that enables identification of each of a plurality of communication apparatuses for a vehicle, and may include a dongle model name, a dongle phone number, a dongle serial number, a universal subscriber identity module (USIM) serial number, and the like.

In addition, the subscriber device information may further include identification information of the terminal device 400 of the subscriber, and the identification information of the user terminal device 400 may include international mobile subscriber identity (IMSI), integrated circuit card ID (IC-CID), and international mobile equipment identity (IMEI), which are the unique information given by the network to identify the user terminal device 400.

In this case, the service subscription information storage unit 321 may match and store the subscriber information and the subscriber device information for each subscriber subscribed to the service as the member.

On the other hand, when the user who subscribes to the service receives the connected service based on the data generated by the image capturing apparatus 100 for a vehicle, the service operation information storage unit 322 may store various data generated in a connected service operation process. As an example, the service operation information storage unit 322 may store various data generated in the connected service operation process as illustrated in Tables 1 to 49, which will be described later.

As an example, when various events such as a vehicle's impact detection, a vehicle's battery off detection, and a live image request from the user terminal device occur, the image capturing apparatus 100 for a vehicle may generate corresponding event data and transmit the generated event data to the server 300 through the communication apparatus 200 for a vehicle. In this case, the service operation information storage unit 322 may match and store the received event data to the service subscription information corresponding to the image capturing apparatus 100 for a vehicle.

Here, the storage unit 320 may be implemented as an embedded module of the server 300 or may be implemented as a separate database (DB) server.

Meanwhile, the control unit 330 may control the overall operation of the server 300 for providing a connected service so that the connected service according to the present invention is provided.

The operation of the server 300 for providing a connected service may be divided into a "new subscription process" in which the user newly subscribes to a service and a "connected service provision process" in which the connected service is provided to a subscriber who subscribes to the service.

In the "new subscription process", the control unit 330 may perform control to initiate a service subscription procedure when a service member subscription is requested from the subscriber, acquire the subscriber information subscribed to the connected service as the member and the device information of the corresponding subscriber, and classify and store the acquired information. Accordingly, the storage unit 320 may establish a subscriber information database.

In the "connected service provision process", the control unit 330 may control various processes such as a black box/user registration process, an event registration process, and an image registration/upload process illustrated in FIGS. 5 to 11 to be described later to provide the connected service to the user terminal device 400. As an example of the connected service provision, the user terminal device 400 may display user interfaces that provide various information related to the vehicle as illustrated in FIGS. 12 to 37.

As an example, when the "registration process of the black box" is performed, the control unit 330 may receive unique information for identifying a communication apparatus such as a universal subscriber identity module (USIM) chip embedded in the communication apparatus 200 for a vehicle through communication with the communication apparatus 200 for a vehicle, and may compare the unique information with information previously stored in the storage unit 320 to check validity of the communication apparatus 200 that has requested registration.

Similarly, in the "registration process of the user", when the user terminal device 400 accesses the server 300, the control unit 330 may acquire user identification information such as the USIM embedded in the user terminal device 400 and may then compare the information previously stored in the storage unit 320 with the acquired user identification information to check whether the user terminal device 400 subscribes to the service and the type of service. If authentication for the user is successfully completed, the control unit 330 may provide various information about the image capturing apparatus 100 for a vehicle in various UX forms based on an authority assigned to the user.

As another example, when the "image registration/upload process" is performed, the control unit 330 may receive an image captured from the image capturing apparatus 100 for a vehicle, and notify the user terminal device 400 of the completion of the image upload when uploading of the received image is completed.

More specifically, the control unit 330 may notify the user terminal device 400 in the form of a push message a message indicating that the upload of the received image is completed, and in this case, the user terminal device 400 may display the completion of the image upload in a pop-up form to the user through the display unit. If the user clicks the displayed pop-up message, the user terminal device 400 may download the image uploaded to the server 300 and display the downloaded image to the user.

Hereinafter, an operation of the connected service system 1000 and an interworking protocol between the communication apparatus 200 for a vehicle and the server 300 for providing a connected service will be described in more detail with reference to FIGS. 5 to 11.

Here, the black box/user registration process, the event registration process, and the image registration/upload process illustrated in FIGS. 5 to 11 may be processes after the user subscribes to the connected service according to the present invention through a member subscription.

In addition, in FIGS. 5 to 11, the black box may refer to the image capturing apparatus 100 for a vehicle, and the dongle may refer to the communication apparatus 200 for a vehicle.

Figure 5:
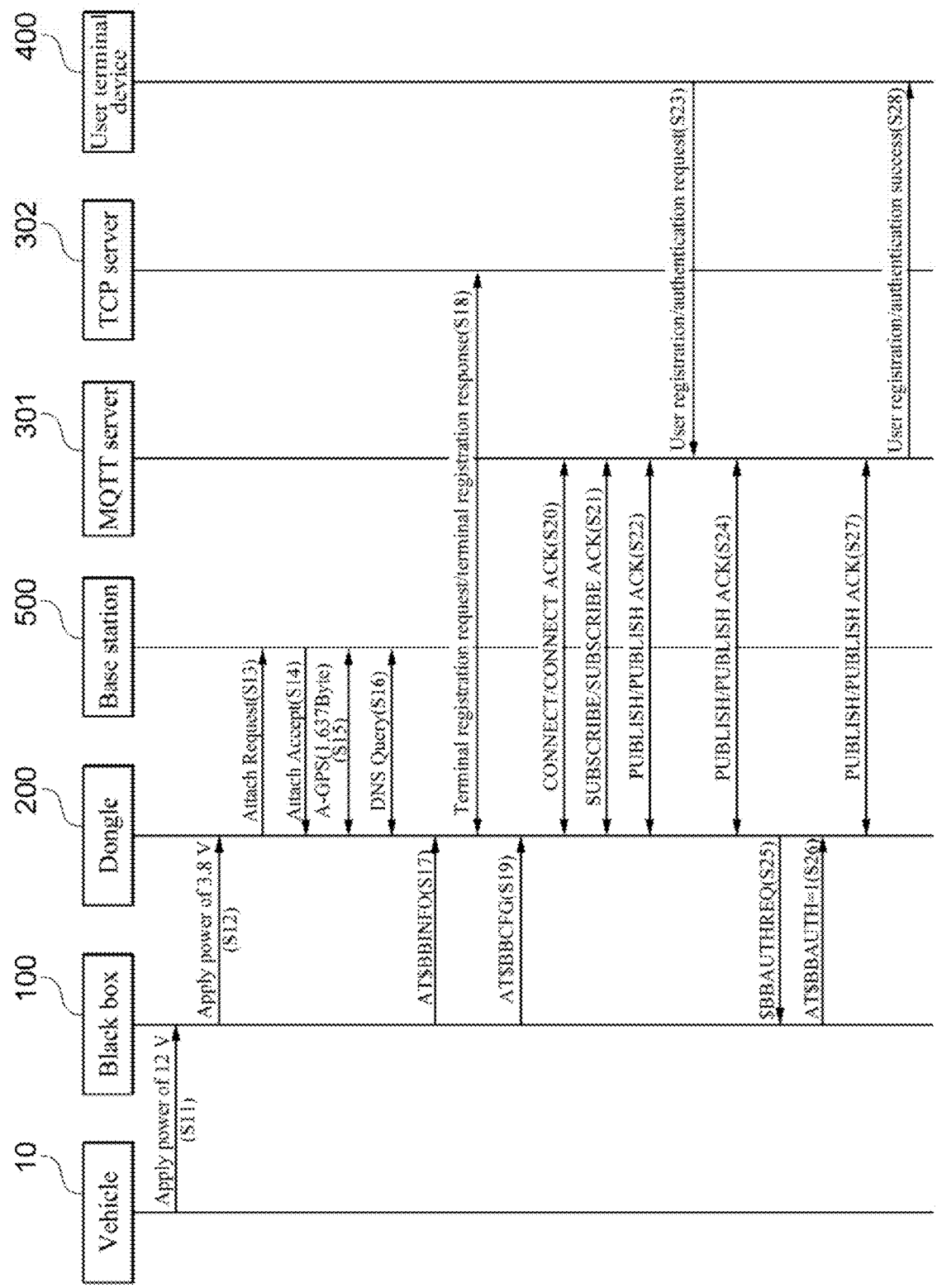
FIG. 5 is a timing diagram illustrating an operation scenario of a connected service system in black box registration and user registration processes according to the present invention.

FIG. 5 is a timing diagram illustrating an operation scenario of a connected service system in black box registration and user registration processes according to the present invention. The black box/user registration process according to FIG. 5 is a procedure performed before providing the connected service to the user who subscribes to the service, and may be performed whenever the power of the black box is turned on. As an example, when the power is applied to the black box by turning on the engine of the vehicle in a state in which the black box is turned off, the black box/user registration process may be performed whenever the power of the black box is turned on, such as when the power of the black box is turned on again after a forced termination of the black box.

Referring to FIG. 5, first, the vehicle 10 may apply power to the black box 100 (S11), the black box 100 may apply the power to the dongle 200 (S12), the dongle 200 may transmit an attach request to the base station 500 (S13), and the base station 500 may transmit an attach accept to the dongle 200 (S14).

Then, when the dongle 200 accesses the network through low-power wide-area communication, the dongle 200 may receive assisted GPS (A-GPS) information from the base station 500 (S15). The black box 100 may calculate a location of the vehicle 10 using the A-GPS information received through the dongle 200. In addition, a domain name system (DNS) query may be shared between the dongle 200 and the base station 500 (S16).

On the other hand, when the dongle 200 accesses the communication network through the base station 500 according to the above-described process, the black box 100 may transmit a terminal registration request including terminal data (AT$BBINFO) to the dongle 200 (S17), the dongle 200 may transmit the terminal registration request to a TCP server 302, and the TCP server 302 may transmit a terminal registration response, which is a response to the terminal registration request, to the dongle 200 (S18). Here, the terminal registration request may be a request for registering with the service before providing the connected service to the black box 100 and/or dongle 200 subscribed to the service.

Here, the terminal registration request transmitted from the dongle 200 to the TCP server 302 may be configured in a data format illustrated in Table 1 below.

TABLE 1

Description cat.m1 Dongle & Black Box Registration Request
Direction Client -> Server

| No. | Offset | Byte | Type | Contents | Description | Value | Endian |
|---|---|---|---|---|---|---|---|
| 1 | 0 | 2 | byte[ ] | STX | Packet Start | 0x02 0x0E | |
| 2 | 2 | 1 | unsigned char | Packet Type | | 0x31 | |
| 3 | 3 | 1 | unsigned char | Total Length | No. 4~No. 11 Length | | |
| 4 | 4 | 19+ | string | BBOX Name | Black Box Model Name | | |
| 5 | 23 | 1 | char | Division | Separator | 0xFF | |
| 6 | 24 | 8 | string | Dongle Name | Dongle Model Name | | |
| 7 | 32 | 1 | char | Division | Separator | 0xFF | |
| 8 | 33 | 8 | string | Dongle Version | Dongle Version | | |
| 9 | 41 | 1 | char | Division | Separator | 0xFF | |
| 10 | 42 | 11 | string | Dongle CTN | Dongle Phone Number | | |
| 11 | 53 | 1 | char | Division | Separator | 0xFF | |
| 12 | 54 | 2 | byte[ ] | ETX | Packet End | 0x03 0x0F | |
| Total Len | | 56+ | | | | | |

Among the contents of Table 1, the BBOX Name field is a field that includes the model name of the black box, which is the image capturing apparatus for a vehicle, and version information of the model, and a description thereof is illustrated in Table 2 below.

TABLE 2

| Field | Description |
|---|---|
| BBOX Name | Black Box Model Name + Version (Separated by Parentheses ('(' / ')')) – ex> QUANTUM2X(v1.01.00) |

In addition, the terminal registration response transmitted from the TCP server 302 to the dongle 200 may be configured in a data format illustrated in Table 3 below.

TABLE 3

Description cat.m1 Dongle & Black Box Registration Request Response
Direction Server -> Client

| No. | Offset | Byte | Type | Contents | Description | Value | Endian |
|---|---|---|---|---|---|---|---|
| 1 | 0 | 2 | byte[ ] | STX | Packet Start | 0x02 0x0E | |
| 2 | 2 | 1 | unsigned char | Packet Type | | 0x52 | |
| 3 | 3 | 1 | unsigned char | Total Length | No. 4~No. 14 Length | | |
| 4 | 4 | 2 | unsigned short | Code | Server Response Code | | Little |
| 5 | 6 | 4 | unsigned in | uuid | Terminal Unique Number | | Little |
| 6 | 10 | 15+ | string | A-GPS URL | | | |
| 7 | 25+ | 1 | char | Division | Separator | 0xFF | |
| 8 | 26+ | 2 | unsigned short | A-GPS Port | | | Little |
| 9 | 28+ | 2 | unsigned short | Traffic Day Pro | Traffic Information Day Use | minute | Little |

TABLE 3-continued

Description cat.m1 Dongle & Black Box Registration Request Response
Direction Server -> Client

| No. | Offset | Byte | Type | Contents | Description | Value | Endian |
|---|---|---|---|---|---|---|---|
| 10 | 30+ | 1 | unsigned char | Traffic Gather | Traffic Information Gather Period | second | |
| 11 | 31+ | 1 | unsigned char | Traffic Report | Traffic Information Transmission Period | second | |
| 12 | 32+ | 1 | unsigned char | Park Img Cnt. | Parking Image Count | | |
| 13 | 33+ | 1 | unsigned char | Live Img Cnt. | Live Image Count | | |
| 14 | 34+ | 1 | unsigned char | Impact Img Cnt | Impact Image Count | | |
| 15 | 35+ | 2 | byte[ ] | ETX | Packet End | 0x03 0x0F | |
| Total Len | | 37+ | | | | | |

The description of A-GPS URL, A-GPS Port, Traffic Day Pro, Traffic Gather, Traffic Report, Park Img Cnt., Live Img Cnt, Impact Img Cnt, and BBOX Name fields among the contents of Table 3 above is illustrated in Table 4 below.

TABLE 4

| Field | Description |
|---|---|
| A-GPS URL | Used When A-GPS IP Is Changed Later (Default : supl.google.com) |
| A-GPS Port | Used When A-GPS Port Is Changed Later (Default : 7276) |
| Traffic Day Pro | Traffic Information Day Use Time Limit (Default : 720) |
| Traffic Gather | Traffic Information Gather Period (Default :1) |
| Traffic Report | Traffic Information Transmission Period (Default :2) |
| Park Img Cnt. | Parking Image Remaining Count |
| Live Img Cnt. | Live Image Remaining Count |
| Impact Img Cnt | Impact Image Remaining Count |

That is, in order to reduce data usage in consideration of the characteristics of low-power wideband wireless communication, the response to the terminal registration request at the time of initial access may include the data fields capable of managing data usage, such as traffic information day use time limit (Traffic Day Pro), traffic information gather period (Traffic Gather), traffic information transmission period (Traffic Report), parking image remaining count (Park Img Cnt), and live image remaining count (Live Img Cnt).

Meanwhile, the registration of the black box 100 and/or the dongle 200 may be completed according to the process described above.

Thereafter, the black box 100 may transmit an MQTT server connection request including terminal configuration data (AT$BBCFG) to the dongle 200 (S19). In this case, the dongle 200 may transmit and receive a connection request (CONNECT) and a connection response (CONNECT ACK) to and from the MQTT server 301 (S20).

Here, the connection request (CONNECT) from the dongle 200 to the MQTT server 301 may be configured as a protocol as illustrated in Table 5 below.

TABLE 5

| Type | bit | 7 | 6 | 5 | 4 | 3 | 2 | 1 | 0 |
|---|---|---|---|---|---|---|---|---|---|
| Fixed header | byte 1 | | Message Type (1) | | | | | Reserved | |
| | byte 2 | | Remaining length (Variable header + Payload) | | | | | | |
| Variable header | byte 1 | | Length MSB | | | | | | |
| | byte 2 | | Length LSB | | | | | | |
| | byte 3 | | "M" | | | | | | |
| | byte 4 | | "Q" | | | | | | |
| | byte 5 | | "T" | | | | | | |
| | byte 6 | | "T" | | | | | | |
| | byte 7 | | Level (4) | | | | | | |
| | byte 8 | User Name Flag | Password Flag | Will Retain | Will Qos | | Will Flag | Clean Session | Reserved |
| | | 1 | 1 | 0 | 0 | 0 | 0 | 1 | 0 |
| | byte 9 | | Keep Alive MSB | | | | | | |
| | byte 10 | | Keep Alive LSB | | | | | | |
| payload | byte 1 | | Client ID Length MSB | | | | | | |
| | byte 2 | | Client ID Length LSB | | | | | | |
| | byte 3.N | | Client ID | | | | | | |
| | byte 1 | | User Name Length MSB (User Name Flag) | | | | | | |
| | byte 2 | | User Name Length LSB (User Name Flag) | | | | | | |

TABLE 5-continued

| Type | bit | 7 | 6 | 5 | 4 | 3 | 2 | 1 | 0 |
|---|---|---|---|---|---|---|---|---|---|
| | byte 3.N | | | User Name (User Name Flag) | | | | | |
| | byte 1 | | | Password Length MSB (Password Flag) | | | | | |
| | byte 2 | | | Password Length LSB (Password Flag) | | | | | |
| | byte 3.N | | | Password (Password Flag) | | | | | |

In addition, the connection response (CONNECT ACK) transmitted from the MQTT server 301 to the dongle 200 may be configured as a protocol as illustrated in Table 6 below.

TABLE 6

| Type | bit | 7 | 6 | 5 | 4 | 3 | 2 | 1 | 0 |
|---|---|---|---|---|---|---|---|---|---|
| Fixed header | byte 1 | | Message Type (2) | | | Reserved | | | |
| | byte 2 | | Remaining length (Variable header) | | | | | | |
| Variable header | byte 1 | | Reserved | | | | | | SP Flag (0) |
| | byte 2 | | Return Code | | | | | | |

Thereafter, the communication apparatus 200 for a vehicle may transmit and receive a subscription request (SUBSCRIBE) and a subscription response (SUBSCRIBE ACK) to and from the MQTT server 301 (S21).

Here, the subscription request (SUBSCRIBE) from the dongle 200 to the MQTT server 301 may be configured as a protocol as illustrated in Table 7 below.

TABLE 7

| Type | bit | 7 | 6 | 5 | 4 | 3 | 2 | 1 | 0 |
|---|---|---|---|---|---|---|---|---|---|
| Fixed header | byte 1 | | Message Type (8) | | | DUP (0) | Qos (1) | | RETAIN (0) |
| | byte 2 | | Remaining length (Variable header + Payload) | | | | | | |
| Variable header | byte 1 | | Packet ID MSB | | | | | | |
| | byte 2 | | Packet ID LSB | | | | | | |
| payload | byte 1 | | Topic Filter Length MSB | | | | | | |
| | byte 2 | | Topic Filter Length LSB | | | | | | |
| | byte 3.N | | Topic Filter | | | | | | |
| | byte N + 1 | | Reserved | | | | | | Qos |

In addition, the subscription response (SUBSCRIBE ACK) transmitted from the MQTT server 301 to the dongle 200 may be configured as a protocol as illustrated in Table 8 below.

TABLE 8

| Type | bit | 7 | 6 | 5 | 4 | 3 | 2 | 1 | 0 |
|---|---|---|---|---|---|---|---|---|---|
| Fixed header | byte 1 | | Message Type (9) | | | Reserved | | | |
| | byte 2 | | Remaining length (Variable header + Payload) | | | | | | |
| Variable header | byte 1 | | Packet ID MSB | | | | | | |
| | byte 2 | | Packet ID LSB | | | | | | |
| payload | byte 1 | | Return code | | | | | | |

Thereafter, the communication apparatus 200 for a vehicle may transmit and receive a publish request (PUBLISH) and a publish response (PUBLISH ACK) to and from the MQTT server 301 (S22).

Here, the publish request (PUBLISH) from the dongle 200 to the MQTT server 301 may be configured as a protocol as illustrated in Table 9 below.

TABLE 9

| Type | bit | 7 | 6 | 5 | 4 | 3 | 2 | 1 | 0 |
|---|---|---|---|---|---|---|---|---|---|
| Fixed header | byte 1 | | Message Type (3) | | DUP | Qos (1) | | RETAIN (0) | |
| | byte 2 | | Remaining length (Variable header + Payload) | | | | | | |
| Variable header | byte 1 | | Topic Name Length MSB | | | | | | |
| | byte 2 | | Topic Name Length LSB | | | | | | |
| | byte 3.N | | Topic Name | | | | | | |
| | byte N + 1 | | Packet ID MSB | | | | | | |
| | byte N + 2 | | Packet ID LSB | | | | | | |
| payload | byte N | | Application Message | | | | | | |

In addition, the publish response (PUBLISH ACK) transmitted from the MQTT server 301 to the dongle 200 may be configured as a protocol as illustrated in Table 10 below.

TABLE 10

| Type | bit | 7 | 6 | 5 | 4 | 3 | 2 | 1 | 0 |
|---|---|---|---|---|---|---|---|---|---|
| Fixed header | byte 1 | | Message Type (4) | | | Reserved | | | |
| | byte 2 | | Remaining length (Variable header + Payload) | | | | | | |
| Variable header | byte 1 | | Packet ID MSB | | | | | | |
| | byte 2 | | Packet ID LSB | | | | | | |

Thereafter, the user terminal device 400 may transmit a user registration and authentication request to the MQTT server 301 (S23), and the dongle 200 may transmit and receive the publish request (PUBLISH) and the publish response (PUBLISH ACK) to and from the MQTT server 301 (S24). Here, the user registration and authentication request may be a procedure for registering and authenticating the user before providing the connected service to the user subscribed to the service.

In addition, the dongle 200 may transmit a user registration and authentication request ($BBAUTHREQ) to the black box 100 (S25).

In this case, the black box 100 may transmit a user registration and authentication success response (AT@BBAUTH=1) to the dongle 200 (S26), and the dongle 200 may transmit and receive the publish request (PUBLISH) and the publish response (PUBLISH ACK) to and from the MQTT server 301 (S27).

Then, the MQTT server 301 may transmit that the user registration and authentication is successful to the user terminal device 400 (S28).

Here, the protocols of the publish request (PUBLISH) and the publish response (PUBLISH ACK) of S24 and S27 may be as illustrated in Tables 9 to 10 described above.

According to the processes of FIG. 5 described above, the registration of the black box 100 and/or the dongle 200 as the power of the black box is turned on may be performed, and the user registration and authentication may be performed.

Figure 6:
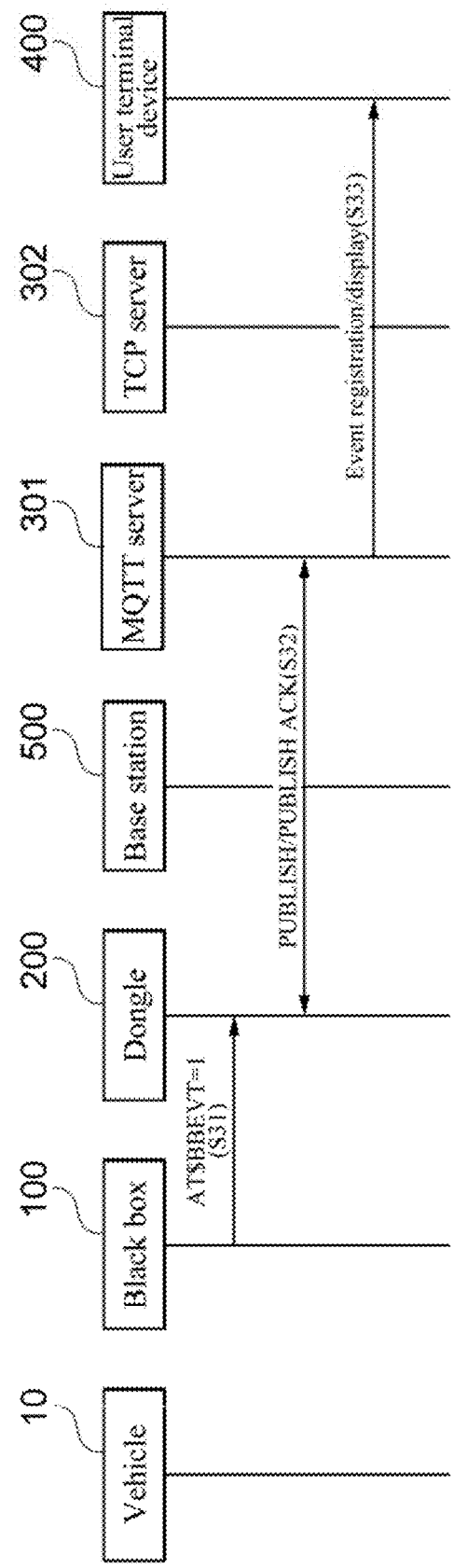
FIG. 6 is a timing diagram illustrating an operation scenario of a connected service system in an event registration process according to an exemplary embodiment of the present invention.

FIG. 6 is a timing diagram illustrating an operation scenario of a connected service system in an event registration process according to an exemplary embodiment of the present invention. Referring to FIG. 6, first, the black box 100 may notify the dongle 200 of an event registration request including an event occurrence notification and event data ("AT$BBEVT=1") (S31). Here, the event may include various events such as an event that may occur in a driving situation of the vehicle, an event that may occur during the operation process of the black box 100, and an event according to a request from the user terminal device 400. As an example, as illustrated in Table 15 below, the event according to the present invention may include various events such as an impact event, a black box power off event, a black box low voltage occurrence event, and a black box authentication completion event.

In this case, the communication apparatus 200 for a vehicle may transmit and receive a publish request (PUBLISH) and a publish response (PUBLISH ACK) for event registration the event to and from the MQTT server 301 (S22).

Here, a data format of MQTT PUBLISH of the publish request (PUBLISH) for event registration may be as illustrated in Tables 11 and 12 below.

Table 12 below is a description of Time, Latitude/Longitude, Battery/Fuel, Battery Percent, and Auth Number fields among the fields of the data format (payload) of the MQTT PUBLISH (Table 11).

TABLE 12

| Field | Description |
|---|---|
| Time | Based on UNIX Time Stamp (January 1, 1970, 0:0:0) : Second |
| Latitude Longitude | Convert Unit Value of Degree to Unit of 0.01 second (sec) (Cutting Below Decimal Point) – Latitude:127.103427*3600*100=45757233 / Longitude:37.323876*3600*100=13436595 |
| Battery / Fuel | Value * 10 (12.1 * 10 = 120) |
| Battery Percent | Current Remaining Voltage (%) / 0 ~ 100 / When There is no Current Remaining Voltage : 0x00 |
| Auth Number | The details of the Auth Number Field are as shown in FIG. 52. |

TABLE 11

| Description | Transmit Status Information from Cat.M1 Dongle to Server (Parking or Not, Impact or Not, Latitude, Longitude) | | | | |
|---|---|---|---|---|---|
| Direction | Client –> Server | | | | |
| Topic | /v1/cm1/c2s | | | | |
| Client ID | {uuid} | | | | |
| Qos | 1 | Retain | 0 | Packet ID | 1~65535 |

| Application Message | | | | | | | |
|---|---|---|---|---|---|---|---|
| No. | Offset | Byte | Type | Contents | Description | Value | Endian |
| 1 | 0 | 4 | unsigned int | Send Time | Send Time (second) | | Little |
| 2 | 4 | 4 | unsigned int | uuid | Terminal Unique Number | | Little |
| 3 | 8 | 4 | unsigned int | Date Time | Occurrence Time (second) | | Little |
| 4 | 12 | 1 | unsigned char | Drive Status | See Table 13 | | |
| 5 | 13 | 1 | unsigned char | Event Code | See Table 15 | | |
| 6 | 14 | 4 | unsigned int | Cell ID | Base Station Information | | Little |
| 7 | 18 | 2 | unsigned short | TAC | Tracking Area Code | | Little |
| 8 | 20 | 1 | unsigned char | GPS Status | GPS Status | 'A' or 'V' | |
| 9 | 21 | 4 | unsigned int | Latitude | WGS84 Latitude | | Little |
| 10 | 25 | 4 | unsigned int | Longitude | WGS8 4 Longitude | | Little |
| 11 | 29 | 1 | unsigned char | DriveX | Whether OBDII is installed (see Table 14) | | |
| 12 | 30 | 2 | unsigned short | Current Battery | Current Voltage Value | | Little |
| 13 | 32 | 1 | unsigned char | Battery Percent | Current Remaining Voltage | | |
| 14 | 33 | 2 | unsigned short | Low Battery | Low-Voltage Setting Value | | Little |
| 15 | 35 | 2 | unsigned short | Fuel | Driving Fuel Efficiency | | Little |
| 16 | 37 | 4 | unsigned int | Auth Number | Server Authentication Number | | Little |
| 17 | 41 | 1 | unsigned char | Event Division | See Table 16 | | |
| Total Len | 42 | | | | | | |

In addition, the content drive status of Table 11 described above may be configured as illustrated in Table 13 below. In Table 13 below, a normal mode may have the same meaning as the normal recording mode, which is one of the operation modes of the black box described above, and a parking mode may have the same meaning as the parking recording mode, which is one of the operation modes of the black box described above.

TABLE 13

| Code | Description |
| --- | --- |
| 11 | Start Driving/Normal Mode |
| 12 | Start Driving/Parking Mode |
| 21 | During Driving/Normal Mode |
| 22 | During Driving/Parking Mode |
| 31 | End Driving/Normal Mode |
| 32 | End Driving/Parking Mode |
| 41 | Start Dongle Update/Normal Mode |
| 42 | Start Dongle Update/Parking Mode |
| 51 | End Dongle Update/Normal Mode |
| 52 | End Dongle Update/Parking Mode |

In addition, the content "DriveX" in Table 11 may be configured as illustrated in Table 14 below. Here, the OBD (On Board Diagnostics) may refer to a diagnostic standard for checking and controlling the overall operating state of the vehicle.

TABLE 14

| Code | Description |
| --- | --- |
| 0 | OBDII is installed |
| 1 | OBDII is not installed |

In addition, the content Event Code in Table 11 may be configured as illustrated in Table 15 below.

TABLE 15

| Code | Description |
| --- | --- |
| 0 | Normal |
| 1 | Impact |
| 2 | Black Box Power OFF |
| 3 | Low Voltage |
| 4 | Authentication Completion |
| 5 | Start ON |
| 6 | Start OFF |
| 7 | Parking Location Request Response |
| 8 | Image Request Response |
| 9 | Live Image Request Response |
| 10 | Start Dongle Update |
| 11 | End Dongle Update (Success) |
| 12 | End Dongle Update (Failure) |
| 13 | Impact During Normal Mode (SOS) |
| 14 | Normal Mode Switching Reset |
| 15 | Image Count Initialization |

In Table 15 described above, "Normal" may indicate that no event occurred, "Impact" may indicate an occurrence of an impact event, "Black Box Power OFF" may indicate an occurrence of an event in which the power of the black box is turned off, "Low Voltage" may indicate an occurrence of an event in which a voltage value of the black box falls below a predetermined value or less, "Authentication Completion" may indicate an occurrence of a user's authentication completion event for the user terminal device, "Start ON" may indicate an occurrence of an event in which the engine of the vehicle is turned on, "Start OFF" may indicate an occurrence of an event in which the engine of the vehicle is turned off, and "Parking Location Request Response" may indicate an occurrence of a response event to a parking location request from the user terminal device.

In addition, "Image Request Response" may indicate an occurrence of a response event to an image request from the user terminal device. Here, the image request from the user terminal device may include an image request from the parking location of the vehicle, and an image request corresponding to the impact event or the movement event of the vehicle.

In addition, "Live Image Request Response" may indicate an occurrence of a response event to a live image request from the user terminal device, "Start Dongle Update" may indicate an occurrence of an update start event of the dongle 200, "End Dongle Update (Success)" may indicate an occurrence of a successful end event of the update of the dongle 200, "End Dongle Update (Failure)" may indicate an occurrence of a failure end event of the update of the dongle 200, "Impact During Normal Mode (SOS)" may indicate an occurrence of an emergency event in which an impact having a predetermined impact value or more is detected in the normal mode, "Normal Mode Switching Reset" may indicate an occurrence of an event in which the black box 100 switches from other modes to the normal mode, and "Image Count Initialization" may indicate an occurrence of an event in which the number of images that may be transmitted from the black box 100 is initialized. The update of the dongle 200 according to an exemplary embodiment of the present invention may be performed in an Over The Air (OTA) method, and may be performed when the distribution of the latest software for the dongle 200 is determined by the manufacturer of the dongle 200.

In addition, the content Event Division in Table 11 may be configured as illustrated in Table 16 below.

TABLE 16

| Code | Description |
| --- | --- |
| 1 | Including Image |
| 2 | Not Including Image |
| 3 | Low-Voltage Power Off |
| 4 | Time-out Power Off |
| 5 | User Power Off |
| 6 | Server Request Power Off |
| 7 | Start OFF Power Off |
| 8 | Black Box Ultra Low Power Mode (SUSPEND) |
| 9 | While Transmitting Image (Upon Requesting On-Demand) |
| 10 | Reboot (General) |
| 11 | Reboot (Start OFF) |

That is, according to the present invention, the black box 100 and/or the dongle 200 may generate event data including the time, the terminal unique number, the drive status, the event code, the location, and the driving fuel efficiency, and transmit the generated event data to the server.

If the MQTT server 301 receives the publish request (PUBLISH) for registering the event from the dongle 200, the MQTT server 301 may transmit the publish response (PUBLISH ACK) to the dongle 200.

On the other hand, when various commands for controlling the black box 100 are input from the user terminal device 400, in contrast to the above, the MQTT server 301 may transmit the publish request (PUBLISH) for registering the event to the dongle 200. In this case, as data transmitted from the MQTT server 301 to the dongle 200, a data format of the MQTT PUBLISH ACK may be as illustrated in Table 17 below.

TABLE 17

| Description | Transmit Black Box Control Command from Server to Cat.M1 Dongle (Authentication, Power OFF, Image Request) | | | | | | |
|---|---|---|---|---|---|---|---|
| Direction | Server –> Client | | | | | | |
| Topic | /v1/cm1/s2c/{uuid} | | | | | | |
| Qos | 0 | | Retain | 0 | Packet ID | 1~65535 | |

| Application Message | | | | | | | |
|---|---|---|---|---|---|---|---|
| No. | Offset | Byte | Type | Contents | Description | Value | Endian |
| 1 | 0 | 4 | unsigned int | Send Time | Send Time (second) | | Little |
| 2 | 4 | 4 | unsigned in | Tid | Transaction ID | | Little |
| 3 | 8 | 1 | unsigned char | Command Code | See Table 20 | | |
| 4 | 9 | 2 | unsigned short | External Code | See Table 19 | | Little |
| 5 | 11 | 4 | unsigned int | Auth Number | Server Authentication Number | | Little |
| 6 | 15 | 16 | byte[ ] | Reserved | See Tables 21 to 25 | | |
| Total Len | | 31 | | | | | |

The description of the Time, Tid, and Reserved fields among the fields in Table 17 is as illustrated in Table 18 below.

TABLE 18

| Field | Description |
|---|---|
| Time | Based on UNIX Time Stamp (January 1, 1970, 0:0:0) : Second |
| Tid | If not, Fill in with 0x00 and Transmit |
| Reserved | If Command Code is not 114 or 115, 0x20 is Transmitted. |

In addition, the content External Code in Table 17 may be configured as illustrated in Table 19 below.

TABLE 19

| Description | Operates as Follows according to Command Code |
|---|---|
| Command Code | Description |
| 201 | – Data Received in Black Box (Number) is Transmitted as It is |

In addition, the content Command Code in Table 17 may be configured as illustrated in Table 20 below.

TABLE 20

| Code | Description |
|---|---|
| 100 | Power Off |
| 102 | Authentication Request (Transmit Authentication Number) |
| 110 | Vehicle Location Inquiry |
| 111 | Image Request |
| 112 | LIVE Check Request |
| 113 | Motion Image Request |
| 114 | Change Dongle Settings |
| 115 | Set Traffic information |
| 116 | Dongle Initialization (RESET) Request / When Changing Service |
| 117 | Set Image Count |
| 118 | Remote Image Playback Request |
| 119 | Transmit Downloaded Data |
| 200 | Cat.M1 FOTA Request |
| 201 | External Device Command Request |
| 202 | Safe Driving Data Update Request |

In addition, the content reservation field (Reserved) of Table 17 may be configured as illustrated in Tables 21 to 25 below according to a value of the content command code.

TABLE 21

| Description | When Command Code is 114 | | | | | |
|---|---|---|---|---|---|---|
| No. | Offset | Byte | Type | Contents | Description | Endian |
| 1 | 0 | 2 | unsigned short | Image Time-out | Image Upload Time | Little |
| 2 | 2 | 2 | unsigned short | Image Write Time-out | Image Packet Upload Time | Little |
| 3 | 4 | 2 | unsigned short | Motion Image Time-out | Motion Image Upload Time | Little |
| 4 | 6 | 2 | unsigned short | TCP Write Time-out | TCP Write Retransmission Time | Little |
| 5 | 8 | 2 | unsigned short | TCP Retry Time-out | TCP Retry Reconnection Time | Little |

TABLE 21-continued

| 6 | 10 | 1 | unsigned char | TCP Write Time-out | TCP Write Retransmission Count |
|---|----|---|---------------|--------------------|-------------------------------|
| 7 | 11 | 1 | unsigned char | TCP Retry Count | TCP reconnection Count |
| 8 | 12 | 1 | unsigned char | Reset Time-out | Reset Initial Wait Time |
| Total Len | 13 | | | | |

TABLE 22

| Description | | | | When Command Code is 115 | | |
|---|---|---|---|---|---|---|
| No. | Offset | Byte | Type | Contents | Description | Endian |
| 1 | 0 | 2 | unsigned short | Traffic Day Pro | Traffic Information Day Use (min) | Little |
| 2 | 2 | 1 | unsigned char | Traffic Gather | Traffic Information Gather Period (sec) | |
| 3 | 3 | 1 | unsigned char | Traffic Report | Traffic Information Transmission Period (sec) | |
| Total Len | 4 | | | | | |

TABLE 23

| Description | | | | When Command Code is 117 | | |
|---|---|---|---|---|---|---|
| No. | Offset | Byte | Type | Contents | Description | Endian |
| 1 | 0 | 1 | unsigned char | Motion Image Max | Motion Image Count | |
| 2 | 1 | 1 | unsigned char | Park Image Max | Parking Image Count | |
| 3 | 2 | 1 | unsigned char | Live Image Max | Live Image Count | |
| Total Len | 3 | | | | | |

TABLE 24

| Description | | | | When Command Code is 118 | | |
|---|---|---|---|---|---|---|
| No. | Offset | Byte | Type | Contents | Description | Endian |
| 1 | 0 | 4 | unsigned int | Event Time | Impact Occurrence Time (sec) | Little |
| 2 | 4 | 1 | unsigned char | Play Type | | |
| Total Len | 5 | | | | | |

| Field | Description |
|---|---|
| Event Time | Based on UNIX Time Stamp (January 1, 1970, 0:0:0): Second |
| Play Type | Impact Image Playback Camera Type The details of the Play Type Field are as shown in FIG. 53. |

TABLE 25

| Description | | | | When Command Code is 202 | | |
|---|---|---|---|---|---|---|
| No. | Offset | Byte | Type | Contents | Description | Endian |
| 1 | 0 | 10 | unsigned char | Safe Guide Ver | Safe Driving Data Version | |
| 2 | 4 | 4 | unsigned int | Data Size | Data File Size (Byte) | Little |
| Total Len | 14 | | | | | |

| Field | Description |
|---|---|
| Safe Guide Ver | Ex > 19.08(T07) |

That is, according to the present invention, the MQTT server 301 may generate event registration request data including various black box control commands such as the black box power off control command, the vehicle location inquiry request, the image request, the live check request, and motion image request according to the request from the user terminal device 400, and transmit the generated event registration request data to the dongle 200.

If the dongle 200 receives the publish request (PUBLISH) for registering the event from the MQTT server 301, the dongle 200 may transmit the publish response (PUBLISH ACK) to the MQTT server 301.

Meanwhile, when the event is registered according to the above-described process, the MQTT server 301 may register the event with the user terminal device 400, and the user terminal device 400 may display the registered event through the display unit (S33).

Figure 7:
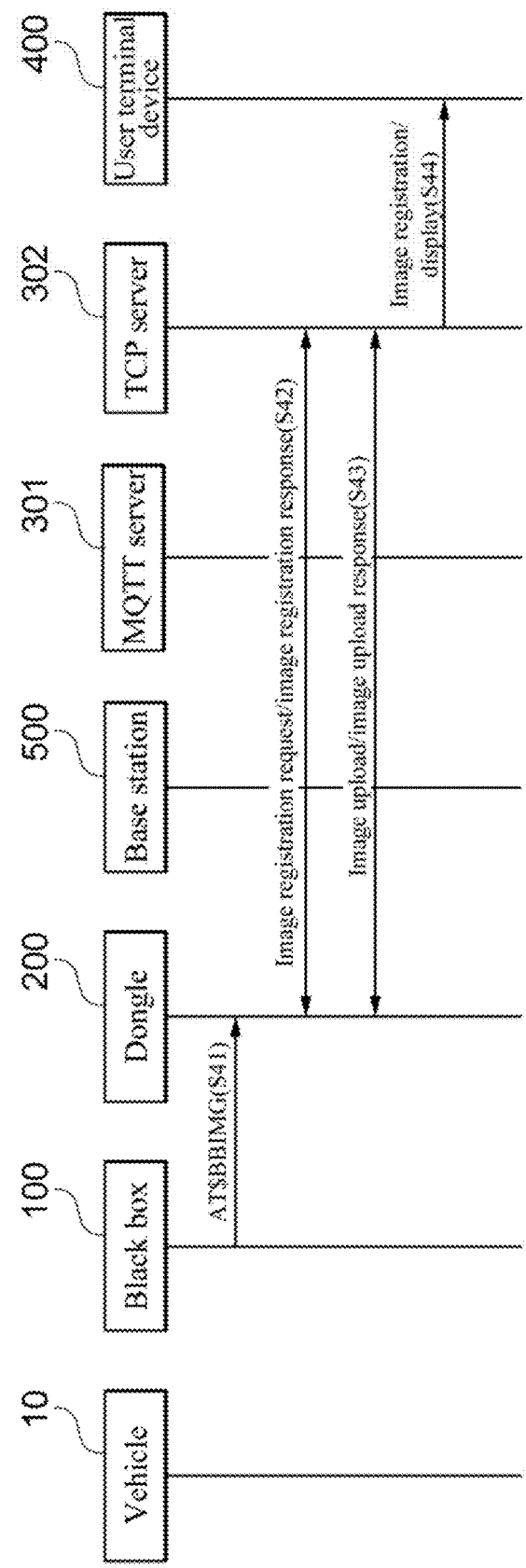
FIG. 7 is a timing diagram illustrating an operation scenario of a connected service system when uploading an image from a black box according to an exemplary embodiment of the present invention.

FIG. 7 is a timing diagram illustrating an operation scenario of a connected service system when uploading an image from a black box according to an exemplary embodiment of the present invention. Referring to FIG. 7, first, the black box 100 may transmit an image upload request including image data (AT$BBIMG) to the dongle 200 (S41).

In addition, the dongle 200 may transmit and receive an image registration request and an image registration response, which is a response to the image registration request, to and from the TCP server 302 (S42).

As an example, a data format of the image registration request transmitted from the dongle 200 to the TCP server 302 may be as illustrated in Table 26 below.

TABLE 26

| Description | Registration Request for Image Upload | | | | | | |
|---|---|---|---|---|---|---|---|
| Direction | Client -> Server | | | | | | |
| No. | Offset | Byte | Type | Contents | Description | Value | Endian |
| 1 | 0 | 2 | byte[ ] | STX | Packet Start | 0x02 0x0E | |
| 2 | 2 | 1 | unsigned char | Packet Type | | 0x53 | |
| 3 | 3 | 1 | unsigned char | Total Length | No. 4~No. 17 Length | | |
| 4 | 4 | 4 | unsigned int | Send Time | Send Time (second) | | Little |
| 5 | 8 | 4 | unsigned int | Tid | Transaction ID | | Little |
| 6 | 12 | 4 | unsigned int | uuid | Terminal Unique Number | | Little |
| 7 | 16 | 4 | unsigned int | Date Time | Occurrence Time (second) | | Little |
| 8 | 20 | 1 | unsigned char | Drive Status | See Table 13 | | |
| 9 | 21 | 1 | unsigned char | Event Code | See Table 15 | | |
| 10 | 22 | 1 | unsigned char | Event Position | See Table 34 | | |
| 11 | 23 | 4 | unsigned int | Cell ID | Base Station Information | | Little |
| 12 | 27 | 2 | unsigned short | TAC | Tracking Area Code | | Little |
| 13 | 29 | 1 | unsigned char | GPS Status | GPS Status | 'A' or 'V' | |
| 14 | 30 | 4 | unsigned int | Latitude | WGS84 Latitude | | Little |
| 15 | 34 | 4 | unsigned int | Longitude | WGS84 Longitude | | Little |
| 16 | 38 | 1 | char | Img Override | Whether There is New Image | 'Y' or 'N' | |
| 17 | 39 | 4 | unsigned int | Img Chunk Len | Image Division Criteria | | Little |
| 18 | 43 | 2 | byte[ ] | ETX | Packet End | 0x03 0x0F | |
| Total Len | | 45 | | | | | |

The description of the Tid and Img Chunk Len fields among the fields in Table 26 is as illustrated in Table 27 below.

TABLE 27

| Field | Description |
|---|---|
| Tid | If not, Fill in with 0x00 and Transmit |
| Img Chunk Len | Image Division Criteria (1,024 / 2,048 / 4,096) |

In the exemplary embodiment of the present invention, when the dongle 200 uploads the image to the TCP server 302, the image data to be transmitted is divided into chunks of units of shot time and transmitted for efficient traffic transmission. In the exemplary embodiment of the present invention, the chunk, which is a unit for upload, may mean a bundle of images corresponding to a certain size, a certain frame unit, and a certain number of frames. To this end, the TCP server 302 may perform scheduling for time and bandwidth to upload the image to each dongle 200 connected to the entire network for quality of service (QoS) management of the entire network. For example, the TCP server 302 may perform scheduling in consideration of an urgency of the image to be transmitted by the dongle 200, a size of the image, the degree of urgency according to the event type generated in the vehicle equipped with the dongle 200, and an available bandwidth of the network. Such scheduling may also be performed in the MQTT server 301, not the TCP server 302.

In addition, a data format of the response to the image registration request transmitted from the TCP server 302 to the dongle 200 may be as illustrated in Table 28 below.

TABLE 28

| Description | Registration Request Response for Image Upload | | | | | | |
|---|---|---|---|---|---|---|---|
| Direction | Server -> Client | | | | | | |
| No. | Offset | Byte | Type | Contents | Description | Value | Endian |
| 1 | 0 | 2 | byte[ ] | STX | Packet Start | 0x02 0x0E | |

TABLE 28-continued

| No. | Offset | Byte | Type | Contents | Description | Value | Endian |
|---|---|---|---|---|---|---|---|
| 2 | 2 | 1 | unsigned char | Packet Type | | 0x54 | |
| 3 | 3 | 1 | unsigned char | Total Length | No.4~No.7 Length | | |
| 4 | 4 | 2 | unsigned short | Code | See Table 37 | | Little |
| 5 | 6 | 4 | unsigned int | Image uuid | Image Classification ID | | Little |
| 6 | 10 | 4 | unsigned int | Img Chunk Len | Image Division Criteria | | Little |
| 7 | 14 | 1 | unsigned char | Img Chunk No | Image Completion Number | | |
| 8 | 15 | 2 | byte[ ] | ETX | Packet End | 0x03 0x0F | |
| Total Len | | 17 | | | | | |

That is, the image registration request according to the present invention may include event data such as a time corresponding to the image registration request, a drive status, an event code, and location information. Accordingly, the user receiving the connected service may be able to check event-related information in the user terminal device 400 as well as the event image. The TCP server 302 according to an exemplary embodiment of the present invention may perform scheduling for the data to be uploaded by the dongle 200 according to field information included in the image registration request message transmitted by the dongle 200.

Further, considering that the image is divided and transmitted according to the data transmission amount of the low-power wide-area communication, the data format according to the present invention may include information such as the image division criteria and the image completion number.

Meanwhile, the dongle 200 may transmit and receive an image upload request and an image upload response, which is a response to the image upload request, to and from the TCP server 302 (S43).

As an example, a data format of the image upload request transmitted from the dongle 200 to the TCP server 302 may be as illustrated in Table 29 below.

TABLE 29

Description Image Upload Request
Direction Client -> Server

| No. | Offset | Byte | Type | Contents | Description | Value | Endian |
|---|---|---|---|---|---|---|---|
| 1 | 0 | 2 | byte [ ] | STX | Packet Start | 0x02 0x0E | |
| 2 | 2 | 1 | unsigned char | Packet Type | | 0x55 | |
| 3 | 3 | 1 | unsigned char | Total Length | No. 4~No. 7 Length | | |
| 4 | 4 | 4 | unsigned int | Image uuid | Image Classification ID | | Little |
| 5 | 8 | 4 | unsigned int | Img Length | No. 8 Length | | Little |
| 6 | 12 | 1 | unsigned char | Img Chunk No | Image Number | | |
| 7 | 13 | 1 | unsigned char | Img Complete | Whether Image is Completed | 'Y' or 'N' | |
| 8 | 14 | n | binary | Image | Image | | |
| 9 | 14+ | 2 | byte [ ] | ETX | Packet End | 0x03 0x0F | |
| Total Len | | 16 + n | | | | | |

In addition, a data format of the response to the image upload request transmitted from the TCP server 302 to the dongle 200 may be as illustrated in Table 30 below.

TABLE 30

Description Image Upload Request Response
Direction Server -> Client

| No. | Offset | Byte | Type | Contents | Description | Value | Endian |
|---|---|---|---|---|---|---|---|
| 1 | 0 | 2 | byte [ ] | STX | Packet Start | 0x02 0x0E | |
| 2 | 2 | 1 | unsigned char | Packet Type | | 0x56 | |
| 3 | 3 | 1 | unsigned char | Total Length | No. 4~No. 5 Length | | |
| 4 | 4 | 2 | unsigned short | Code | See Table 37 | | Little |
| 5 | 6 | 1 | unsigned char | Image Count | Image Remaining Count | | |
| 6 | 7 | 2 | byte [ ] | ETX | Packet End | 0x03 0x0F | |
| Total Len | | 8 | | | | | |

| Field | Description |
|---|---|
| Image Count | Image Remaining Count − 1<br>0: During Image Transmission, where Dongle Ignores Corresponding Value<br>1: No Image Remaining Count<br>11: Image Remaining Count of 10 |

Here, the image upload request may include an upload image, and the image upload process may be repeated until the image upload is completed.

Meanwhile, when the image registration is completed, the TCP server 302 may notify the user terminal device 400 of the image registration, and the user terminal device 400 may display the received image through the display unit (S44).

A process in which S44 is performed in the user terminal device 400 will be described as follows as an example. When the TCP server 302 notifies the user terminal device 400 in the form of a push message that the image upload from the dongle 200 is completed, the user terminal device 400 displays the image upload completion in a pop-up form to the user through the display unit. If the user clicks the displayed pop-up message, the user terminal device 400 downloads the image uploaded to the TCP server 302 and displays the downloaded image to the user.

Figure 8:
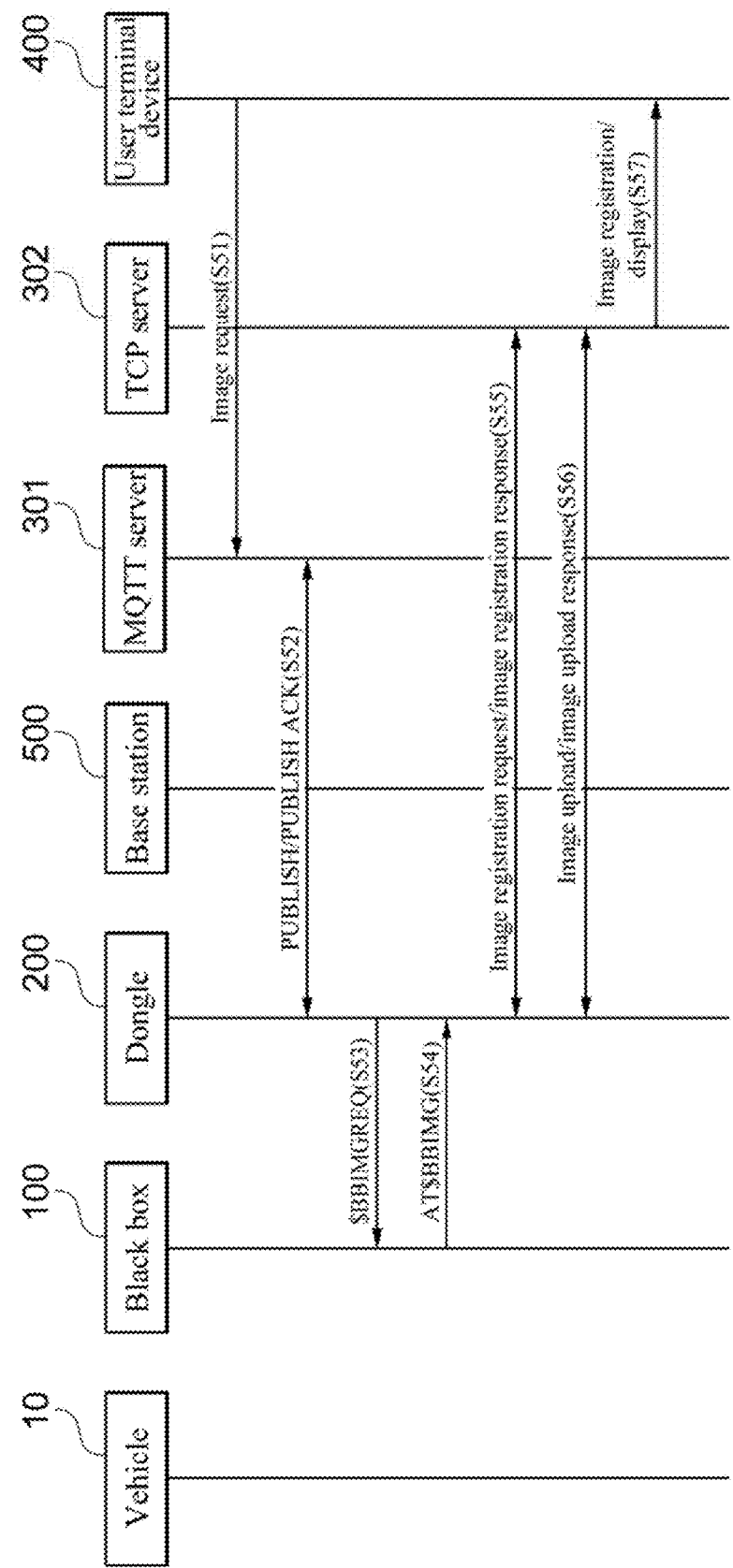
FIG. 8 is a timing diagram illustrating an operation scenario of a connected service system when an image is requested by a user terminal device according to an exemplary embodiment of the present invention.

FIG. 8 is a timing diagram illustrating an operation scenario of a connected service system when an image is requested by a user terminal device according to an exemplary embodiment of the present invention. Referring to FIG. 8, first, the user terminal device 400 may transmit an image request to the MQTT server 301 (S51). Here, an example of the image request from the user terminal device 400 may include a live image request requesting an image captured in real time in the black box 100 and a parking location image request requesting an image of a parking location of the vehicle.

Then, the MQTT server 301 may transmit and receive the publish request (PUBLISH) and the publish response (PUBLISH ACK) to and from the dongle 200 (S52). Here, the data format for the publish request (PUBLISH) may be as illustrated in Table 11, and the data format for the publish response (PUBLISH ACK) may be as illustrated in Table 17.

Then, the dongle 200 may transmit an image request ($BBIMGREQ) to the black box 100 (S53), and the black box 100 may transmit a response including an image (AT$B-BIMG) to the dongle 200 (S54).

In addition, the dongle 200 may transmit and receive an image registration request and an image registration response, which is a response to the image registration request, to and from the TCP server 302 (S55). Here, the data format for the image registration request may be as illustrated in Table 26. In addition, the data format of the response to the image registration request may be as illustrated in Table 28.

Thereafter, the dongle 200 may transmit and receive an image upload request and an image upload response, which is a response to the image upload request, to and from the TCP server 302 (S56). Here, the data format for the image upload request may be as illustrated in Table 29. In addition, the data format of the response to the image upload request may be as illustrated in Table 30.

Meanwhile, when the upload of the image is completed, the TCP server 302 may register the image in the user terminal device 400, and the user terminal device 400 may display the received image through the display unit (S57).

Figure 9:
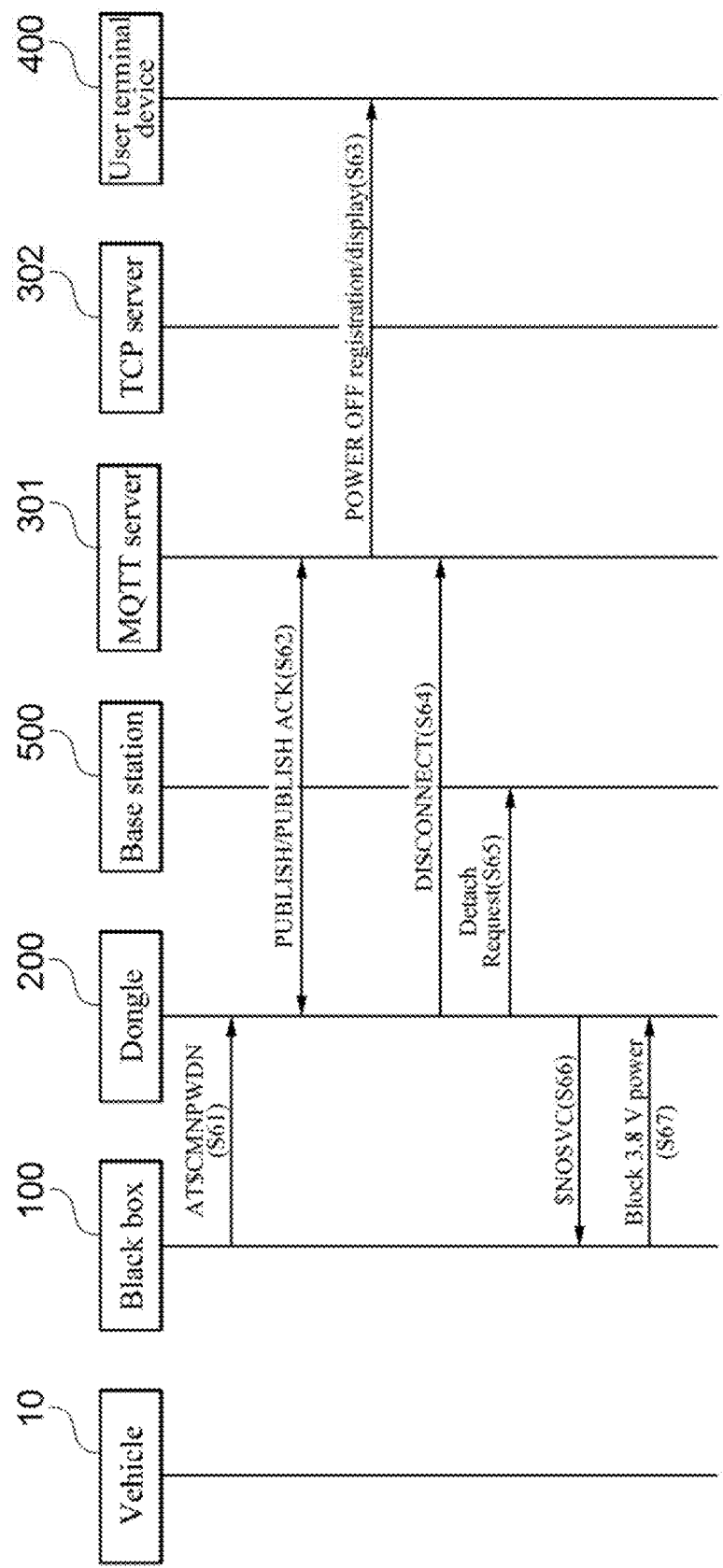
FIG. 9 is a timing diagram illustrating an operation scenario of a connected service system when a power off request is made in a black box according to an exemplary embodiment of the present invention.

FIG. 9 is a timing diagram illustrating an operation scenario of a connected service system when a power off request is made in a black box according to an exemplary embodiment of the present invention. Referring to FIG. 9, first, the black box 100 may transmit a power off request (AT$CMNPWDN) of the black box 100 to the dongle 200 (S61).

Then, the dongle 200 may transmit and receive the publish request (PUBLISH) and the publish response (PUBLISH ACK) to and from the MQTT server 301 (S62). Here, the data format for the publish request (PUBLISH) may be as illustrated in Table 11, and the data format for the publish response (PUBLISH ACK) may be as illustrated in Table 17.

Then, the MQTT server 301 may register the power off (POWER OFF) of the black box 100 in the user terminal device 400, and the user terminal device 400 may display that the power of the black box is turned off through the display unit (S63).

Then, the dongle 200 may disconnect a communication connection with the MQTT server 301 (S64), transmit a Detach Request to the base station 500, and perform a Detach procedure with the base station 500 (S65).

Here, a disconnect message transmitted from the dongle 200 to the MQTT server 301 may be configured as a protocol as illustrated in Table 31 below.

TABLE 31

| Type | bit | 7 | 6 | 5 | 4 | 3 | 2 | 1 | 0 |
|---|---|---|---|---|---|---|---|---|---|
| Fixed header | byte 1 | Message Type (14) | | | | | Reserved | | |
| | byte 2.N | Remaining length (0) | | | | | | | |

Meanwhile, if the communication connection of the dongle 200 is disconnected according to the process described above, the dongle 200 may transmit a power supply blocking request ($NOSVC) to the black box 100 (S66), and the black box 100 may block power supply to the dongle 200 (S67). In addition, in S67, the black box 100 may also notify the dongle 200 that operation power supply is blocked.

Figure 10:
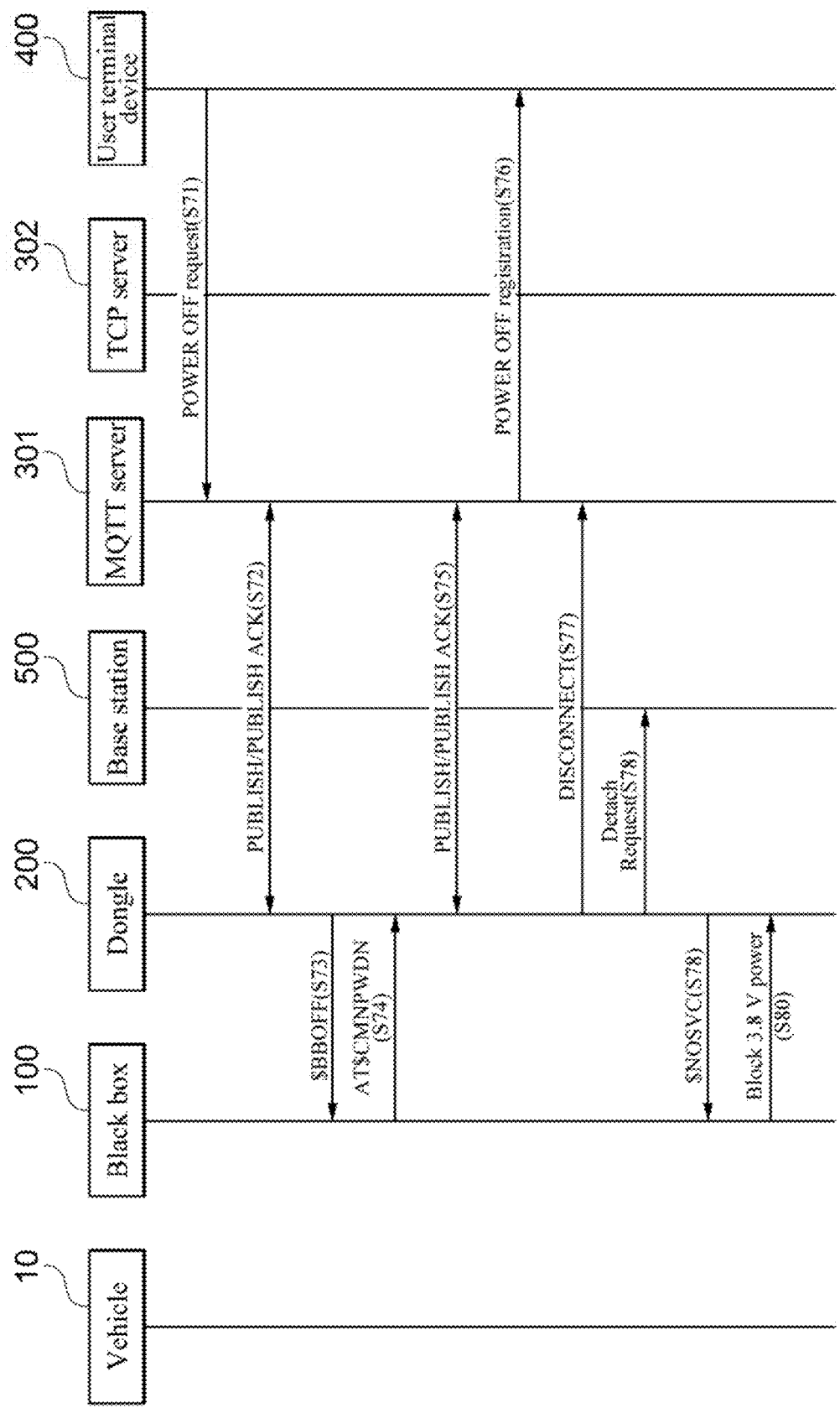
FIG. 10 is a timing diagram illustrating an operation scenario of a connected service system when a black box is powered off according to a request of a user terminal device according to an exemplary embodiment of the present invention.

FIG. 10 is a timing diagram illustrating an operation scenario of a connected service system when a black box is powered off according to a request of a user terminal device according to an exemplary embodiment of the present invention. Referring to FIG. 10, first, the user terminal device 400 may transmit a power off request of the black box 100 to the MQTT server 301 (S71). Then, the MQTT server 301 may transmit and receive the publish request (PUBLISH) and the publish response (PUBLISH ACK) to and from the communication apparatus 200 for a vehicle (S72). Here, the data format for the publish request (PUBLISH) may be as illustrated in Table 11, and the data format for the publish response (PUBLISH ACK) may be as illustrated in Table 17.

Then, the dongle 200 may transmit a black box power-off request ($BBOFF) to the black box 100 (S73), and the black box 100 may transmit a power off response (AT$CMNPWDN) indicating that the black box 100 is powered off to the dongle 200 (S74).

Then, the MQTT server 301 and the dongle 200 may transmit and receive the publish request (PUBLISH) and the publish response (PUBLISH ACK) (S75). Here, the data format for the publish request (PUBLISH) may be as illustrated in Table 11, and the data format for the publish response (PUBLISH ACK) may be as illustrated in Table 17.

Then, the MQTT server 301 may register the power off of the black box 100 in the user terminal device 400, and the user terminal device 400 may display that the power of the black box is turned off through the display unit (S76). At this time, in S76, the MQTT server 301 may notify the power off of the black box 100 to the user terminal device 400 through a push message, and the user terminal device 400 may display the power off of the black box 100 to the user through a pop-up message.

Then, the dongle 200 may disconnect the communication connection with the MQTT server 301 (S77), and transmit a Detach Request to the base station 500 (S78).

Then, the dongle 200 may transmit a power supply blocking request ($NOSVC) to the black box 100 (S79), and the black box 100 may block power supply to the dongle 200 (S80).

On the other hand, according to FIGS. 5 to 10 described above, by classifying the server 300 into the MQTT server 301 and the TCP server 302 from a protocol perspective, it has been described as an example that the event registration, the power off registration, and the like are performed through the MQTT server 301 and the image registration and upload are performed through the TCP server 302, but the present invention is not limited thereto, and according to another exemplary embodiment of the present invention, the processes described above may be performed without classifying the server.

Figure 11:
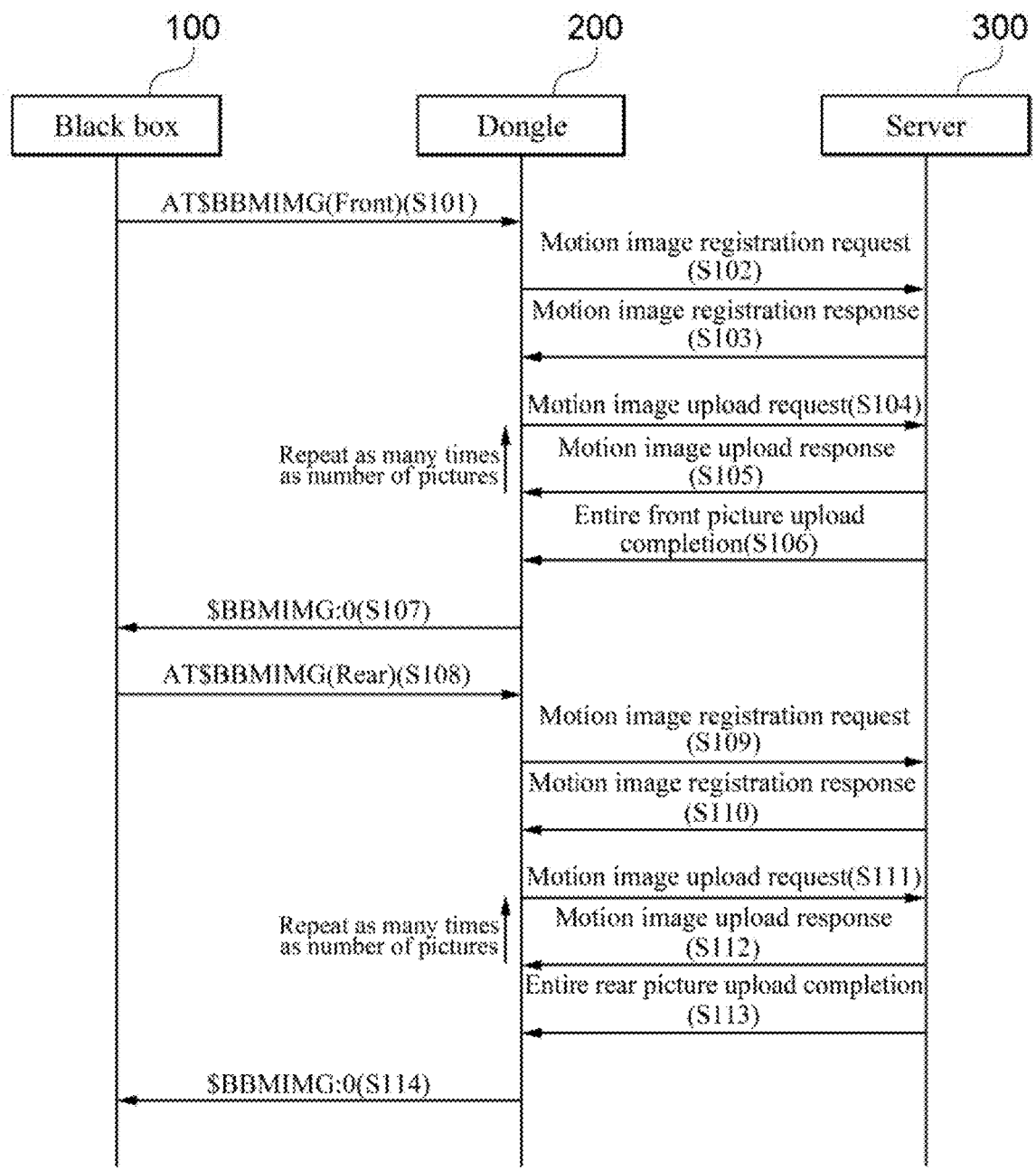
FIG. 11 is a timing diagram illustrating a motion image registration process according to an exemplary embodiment of the present invention.

FIG. 11 is a timing diagram illustrating a motion image upload process according to an exemplary embodiment of the present invention. Here, the motion image is generated by combining at least two images, not one image, to express the movement of an object in the image, and the image and the motion image may be different from each other.

Referring to FIG. 11, first, the black box 100 may transmit a motion image upload request (AT$BBMIMG) corresponding to a front capturing image to the dongle 200 (S101), and the dongle 200 may transmit a motion image registration request to the server 300 (S102).

Here, a data format of the motion image registration request transmitted from the dongle 200 to the server 300 may be as illustrated in Table 32 below.

TABLE 32

Description Registration Request Data for Motion Image Upload
Direction Client –> Server

| No. | Offset | Byte | Type | Contents | Description | Value | Endian |
|---|---|---|---|---|---|---|---|
| 1 | 0 | 2 | byte [ ] | STX | Packet Start | 0x02 0x0E | |
| 2 | 2 | 1 | unsigned char | Packet Type | | 0x57 | |
| 3 | 3 | 1 | unsigned char | Total Length | No. 4~No. 19 Length | | |
| 4 | 4 | 4 | unsigned int | Send Time | Send Time (second) | | Little |
| 5 | 8 | 4 | unsigned int | Tid | Transaction ID | | Little |
| 6 | 12 | 4 | unsigned int | uuid | Terminal Unique Number | | Little |
| 7 | 16 | 4 | unsigned int | Date Time | Occurrence Time (second) | | Little |

TABLE 32-continued

Description Registration Request Data for Motion Image Upload
Direction Client -> Server

| No. | Offset | Byte | Type | Contents | Description | Value | Endian |
|---|---|---|---|---|---|---|---|
| 8 | 20 | 1 | unsigned char | Drive Status | See Table 13 | | |
| 9 | 21 | 1 | unsigned char | Event Code | See Table 15 | | |
| 10 | 22 | 1 | unsigned char | Event Position | See Table 34 | | |
| 11 | 23 | 4 | unsigned int | Cell ID | Base Station Information | | Little |
| 12 | 27 | 2 | unsigned short | TAC | Tracking Area Code | | Little |
| 13 | 29 | 1 | unsigned char | GPS Status | GPS Status | 'A' or 'V' | |
| 14 | 30 | 4 | unsigned int | Latitude | WGS84 Latitude | | Little |
| 15 | 34 | 4 | unsigned int | Longitude | WGS84 Longitude | | Little |
| 16 | 38 | 1 | char | All Override | Whether Entire File is Completed | 'Y' or 'N' | |
| 17 | 39 | 4 | unsigned int | Img Chunk Len | Image Division Criteria | | Little |
| 18 | 43 | 1 | unsigned char | Img Count | Total Number of Images | | |
| 19 | 44 | 1 | unsigned char | Cam Channel | Number of Camera Channels | | |
| 20 | 45 | 2 | byte [ ] | ETX | Packet End | 0x03 0x0F | |
| Total Len | | 47 | | | | | |

The description of the All Override, Img Chunk Len, and Img Count fields among the fields in Table 32 is as illustrated in Table 33 below.

TABLE 33

| Field | Description |
|---|---|
| All Override | Whether There is New Entire Motion Image |
| Img Chunk Len | Image Division Criteria (1,024 / 2,048 / 4,096 ⊚) |
| Img Count | Total Number of Motion Image Files |

That is, since the motion image according to the present invention is generated by combining a plurality of images, the registration request for a motion image upload may further include "total number of images" information compared to the registration request for an image upload illustrated in Table 26.

In addition, the content Event Position in Table 32 may be configured as illustrated in Table 34 below.

TABLE 34

| Code | Description |
|---|---|
| 10 | Front Image |
| 20 | Rear Image |
| 30 | Left Image |
| 40 | Right Image |

Then, the server 300 may transmit a response to the motion image registration request to the dongle 200 (S103).

Here, a data format of the response to the image registration request transmitted from the server 300 to the dongle 200 may be as illustrated in Table 35 below.

TABLE 35

Description Registration Request Response Message for Motion Image Upload
Direction Server -> Client

| No. | Offset | Byte | Type | Contents | Description | Value | Endian |
|---|---|---|---|---|---|---|---|
| 1 | 0 | 2 | byte [ ] | STX | Packet Start | 0x02 0x0E | |
| 2 | 2 | 1 | unsigned char | Packet Type | | 0x58 | |
| 3 | 3 | 1 | unsigned char | Total Length | No. 4~No. 8 Length | | |
| 4 | 4 | 2 | unsigned short | Code | See Table 37 | | Little |

TABLE 35-continued

Description Registration Request Response Message for Motion Image Upload
Direction Server -> Client

| No. | Offset | Byte | Type | Contents | Description | Value | Endian |
|---|---|---|---|---|---|---|---|
| 5 | 6 | 4 | unsigned int | Image uuid | Image Classification ID | | Little |
| 6 | 10 | 4 | unsigned int | Img Chunk Len | Image Division Criteria | | Little |
| 7 | 14 | 1 | unsigned char | Img File No | Image File Completion | | |
| 8 | 15 | 1 | unsigned char | Img Chunk No | Image Completion Number | | |
| 9 | 16 | 2 | byte [ ] | ETX | Packet End | 0x03 0x0F | |
| Total Len | | 18 | | | | | |

The description of the Img Chunk Len, Img File No, and Img Chunk No fields among the fields in Table 35 is as illustrated in Table 36 below.

TABLE 36

| Field | Description |
|---|---|
| Img Chunk Len | Image Division Criteria (1,024 / 2,048 / 4,096 ⓐ) |
| Img File No | Image File Completion Number / 1 Copy is Received : 1 |
| Img Chunk No | Image Division Completion Number / Based on Img Chunk No Transmitted by Dongle |

That is, the registration request response for motion image upload according to the present invention may further include "image file completion" information compared to the registration request response for image upload illustrated in Table 28.

In addition, the content Code in Table 35 may be configured as illustrated in Table 37 below.

TABLE 37

| Code | Description |
|---|---|
| 0 | SUCCESS (Cat.M1 Pro Version) |
| 100 | NB-IoT Lite Version |
| 101 | NB-IoT Standard Version |
| 200 | Dongle Not Supported by Black Box (Service Not Supported) |
| 300 | Dongle Version Not Supported by Black Box (Required Dongle Upgrade) |

TABLE 37-continued

| Code | Description |
|---|---|
| 2400 | BAD REQUEST |
| 2401 | Please Log in Again |
| 2403 | ACCESSDENIED |
| 2500 | SERVER ERROR |
| 2501 | Not SubScribe |
| 2502 | Period of Use Remains Less Than 12 Months |
| 2510 | Fail to Regist |
| 2511 | Invalid UUID |
| 2512 | NOT Image Init Request |
| 2513 | Already Saved Imaged |
| 2900 | UNKNOWN ERROR |
| 2901 | NOT FOUND USERINFO |
| 2902 | NOT FOUND NBIOT_INFO |
| 2903 | ALREADY EXISTS EMAIL |
| 2904 | Invalid Exception |

Thereafter, the dongle 200 may transmit a motion image upload request to the server 300 (S104). Here, a data format of the motion image upload request transmitted from the dongle 200 to the server 300 may be as illustrated in Table 38 below.

TABLE 38

Description Motion Image Upload Request
Direction Client -> Server

| No. | Offset | Byte | Type | Contents | Description | Value | Endian |
|---|---|---|---|---|---|---|---|
| 1 | 0 | 2 | byte [ ] | STX | Packet Start | 0x02 0x0E | |
| 2 | 2 | 1 | unsigned char | Packet Type | | 0x59 | |
| 3 | 3 | 1 | unsigned char | Total Length | No. 4~No. 9 Length | | |

TABLE 38-continued

| | | | Description Motion Image Upload Request Direction Client -> Server | | | | |
|---|---|---|---|---|---|---|---|
| No. | Offset | Byte | Type | Contents | Description | Value | Endian |
| 4 | 4 | 4 | unsigned int | Image uuid | Image Classification ID | | Little |
| 5 | 8 | 4 | unsigned int | Img Length | No. 11 Length | | Little |
| 6 | 12 | 1 | unsigned char | Img File No | Image File Number | | |
| 7 | 13 | 1 | unsigned char | All Complete | Whether All are Completed | 'Y' or 'N' | |
| 8 | 14 | 1 | unsigned char | Img Chunk No | Image Number | | |
| 9 | 15 | 1 | unsigned char | Img Complete | Whether Image is Completed | 'Y' or 'N' | |
| 10 | 16 | n | binary | Image | Image | | |
| 11 | 16+ | 2 | byte [ ] | ETX | Packet End | 0x03 0x0F | |
| Total Len | | 18 + n | | | | | |

That is, since the motion image according to the present invention is generated by combining the plurality of images, the motion image upload request may further include information on an image file number and whether all are completed compared to the registration request for image upload illustrated in Table 29.

Then, the server 300 may transmit a response to the motion image upload request to the dongle 200 (S105). Here, a data format of the response to the image upload request transmitted from the server 300 to the dongle 200 may be as illustrated in Table 39 below.

TABLE 39

| | | | Description Motion Image Upload Request Response Direction Server -> Client | | | | |
|---|---|---|---|---|---|---|---|
| No. | Offset | Byte | Type | Contents | Description | Value | Endian |
| 1 | 0 | 2 | byte [ ] | STX | Packet Start | 0x02 0x0E | |
| 2 | 2 | 1 | unsigned char | Packet Type | | 0x60 | |
| 3 | 3 | 1 | unsigned char | Total Length | No. 4~No. 5 Length | | |
| 4 | 4 | 2 | unsigned short | Code | See Table 37 | | Little |
| 5 | 6 | 1 | unsigned char | Image Count | Image Remaining Count | | |
| 6 | 7 | 2 | byte [ ] | ETX | Packet End | 0x03 0x0F | |
| Total Len | | 9 | | | | | |

When the number of times the dongle 200 may upload the image to the server 300 is limited, the Image Count field among the fields in Table 39 may be used for counting the limited number of times. For example, if the service subscribed by the user may upload the image only 10 times per day (total number of times of uploads per day=10), the server 300 may count the number of times of images uploaded by the dongle 200, and may transmit the uploadable number of times after subtracting the counted number of times from the total number of times of uploads per day to the dongle 200 through the Image Count field. Through this, the black box 100 may display to the user the number of times of uploads of the current image among the total number of times of uploads per day, or the uploadable number of times.

The description of the Image Count field among the fields in Table 39 is as illustrated in Table 40 below.

TABLE 40

| Field | Description |
|---|---|
| Image Count | Image Remaining Count − 1 0 : During Image Transmission, where Dongle Ignores |

TABLE 40-continued

| Field | Description |
|---|---|
| | Corresponding Value 1 : No Image Remaining Count 11 : Image Remaining Count of 10 |

In this case, S104 to S105 may be repeatedly performed as many times as the number of pictures to be transmitted to the server 300. A plurality of pictures transmitted to the server 300 may be used to generate a motion image for the front of the vehicle.

In addition, if the number of images required to generate a motion image for the front of the vehicle has been sufficiently uploaded, the server 300 may notify the dongle 200 that the upload of the entire front picture has been completed (S106), and the dongle 200 may transmit a motion image upload completion response ($BBMIMG:0) for the front to the black box 100 (S107).

In addition, the black box 100 may transmit a motion image upload request (AT$BBMIMG) for a rear capturing image to the dongle 200 (S108), and the dongle 200 may transmit a motion image registration request for the rear capturing image to the server 300 (S109). Then, the server 300 may transmit a response to the motion image registration request to the dongle 200 (S110). Here, a data format of the motion image upload request in S109 may be as illustrated in Table 32, and the response to the motion image registration request in S110 may be as illustrated in Table 35.

Thereafter, the dongle 200 may transmit a motion image upload request to the server 300 (S111). Here, a data format of the motion image upload request transmitted from the dongle 200 to the server 300 may be as illustrated in Table 38.

Then, the server 300 may transmit a response to the motion image upload request to the dongle 200 (S112). Here, a data format of the response to the motion image upload request transmitted from the server 300 to the dongle 200 may be as illustrated in Table 39.

In this case, S111 and S112 may be repeatedly performed as many times as the number of pictures to be transmitted to the server 300. A plurality of pictures transmitted to the server 300 may be used to generate a motion image for the rear of the vehicle.

In addition, the server 300 may notify the dongle 200 that the upload of the entire rear picture has been completed (S113), and the dongle 200 may transmit a motion image upload completion response ($BBMIMG:0) for the rear to the black box 100 (S114).

In FIG. 11, as images for motion image registration, only the images for the front and rear of the vehicle are described as an example, but the present invention is not limited thereto. For example, the image for motion image registration according to the present invention may be an image captured in any direction such as in front, rear, left, or right of the vehicle, and may also be an image captured according to a control command received from the user terminal device 400.

Meanwhile, although not illustrated in the above-described drawings, the connected service system 1000 according to an exemplary embodiment of the present invention may also transmit data to another external device. In this case, a data format of another external device interworking request transmitted from the dongle 200 to the server 300 for interworking with another external device may be as illustrated in Table 41 below.

TABLE 41

Description Black Box External Device Interlocking Data Transmission
Direction Client -> Server

| No. | Offset | Byte | Type | Contents | Description | Value | Endian |
|---|---|---|---|---|---|---|---|
| 1 | 0 | 2 | byte [ ] | STX | Packet Start | 0x02 0x0E | |
| 2 | 2 | 1 | unsigned char | Packet Type | | 0x61 | |
| 3 | 3 | 2 | unsigned short | Total Length | No. 4~No. 7 Length | | Little |
| 4 | 5 | 4 | Unsigned int | uuid | Terminal Unique Number | | Little |
| 5 | 9 | 1 | unsigned char | Data No | Data Number | | |
| 6 | 10 | 1 | unsigned char | All Complete | Whether All are Completed | 'Y' or 'N' | |
| 7 | 11 | n | binary | Data | External Device Data | | |
| 8 | 11+ | 2 | byte [ ] | ETX | Packet End | 0x03 0x0F | |
| Total Len | | 13 + n | | | | | |

In addition, a data format of a response to another external device interworking request transmitted from the server 300 to the dongle 200 may be as illustrated in Table 42 below.

TABLE 42

Description Black Box External Device Interlocking Data Transmission Response
Direction Server -> Client

| No. | Offset | Byte | Type | Contents | Description | Value | Endian |
|---|---|---|---|---|---|---|---|
| 1 | 0 | 2 | byte [ ] | STX | Packet Start | 0x02 0x0E | |
| 2 | 2 | 1 | unsigned char | Packet Type | | 0x62 | |

TABLE 42-continued

Description Black Box External Device Interlocking Data Transmission Response
Direction Server -> Client

| 3 | 3 | 2 | unsigned short | Total Length | No. 4~No. 5 Length | | Little |
|---|---|---|---|---|---|---|---|
| 4 | 5 | 2 | unsigned short | Code | See Table 37 | | Little |
| 5 | 7 | n | binary | Data | Downloaded Data | | |
| 6 | 7+ | 2 | byte [ ] | ETX | Packet End | 0x03 0x0F | |
| Total Len | 9+ | | | | | | |

| Field | Description |
|---|---|
| Data | Download data (Binary)/Max 1 KB (1,024 Byte) |

In addition, although not illustrated in the above-described drawings, the connected service system 1000 according to an exemplary embodiment of the present invention may also transmit ADAS data.

In addition, a safe driving data version transmission format transmitted from the dongle 200 to the server 300 may be as illustrated in Table 43 below.

TABLE 43

Description Black Box Safe Driving Data Version Transmission
Direction Client -> server

| No. | Offset | Byte | Type | Contents | Description | Value | Endian |
|---|---|---|---|---|---|---|---|
| 1 | 0 | 2 | byte [ ] | STX | Packet Start | 0x02 0x0E | |
| 2 | 2 | 1 | unsigned char | Packet Type | | 0x63 | |
| 3 | 3 | 1 | unsigned char | Total Length | No. 4~No. 5 Length | | |
| 4 | 4 | 4 | Unsigned int | uuid | Terminal Unique Number | | Little |
| 5 | 8 | 10 | string | Safe Guide Ver | Safe Driving Version | | |
| 6 | 18 | 2 | byte [ ] | ETX | Packet End | 0x03 0x0F | |
| Total Len | 20 | | | | | | |

Among the fields in Table 43, the Safe Guide Ver field is a field including a safe driving data version. The server 300 may provide safe driving data of the black box 100 in an OTA manner by comparing the safe driving data version of the black box 100 transmitted through the dongle 200 and the latest version of the safe driving data version, and the black box 100 may update the safe driving data received from the server 300 with the latest version data.

The safe driving data may be data for a safety guide required for road driving and route driving guidance, and may include, for example, new road generation, traffic light generation, specific area setting such as a school zone, traffic regulation revision, new speed limit section information, and the like.

Among the fields in Table 43, Safe Guide Ver may be utilized as illustrated in Table 44 below.

TABLE 44

| Field | Description |
|---|---|
| Safe Guide Ver | Ex> 19.08 (T07) |

In Table 44, the Safe Guide Ver field indicates that the safe driving data currently stored in the black box 100 is data that expires after 2019.08. That is, the Safe Guide Ver field may be set to notify when the safe driving data stored in the black box 100 is updated.

In addition, a data format of a safe driving data version transmission response transmitted from the server 300 to the dongle 200 may be as illustrated in Table 45 below.

TABLE 45

Description Black Box Safe Driving Data Version Transmission Response
Direction Server -> Client

| No. | Offset | Byte | Type | Contents | Description | Value | Endian |
|---|---|---|---|---|---|---|---|
| 1 | 0 | 2 | byte [ ] | STX | Packet Start | 0x02 0x0E | |
| 2 | 2 | 1 | unsigned char | Packet Type | | 0x64 | |
| 3 | 3 | 1 | unsigned char | Total Length | No. 4 Length | | |
| 4 | 4 | 2 | unsigned short | Code | Server Response Code | | Little |
| 5 | 6 | 2 | byte [ ] | ETX | Packet End | 0x03 0x0F | |
| | Total Len | 8 | | | | | |

In addition, although not illustrated in the above-described drawings, the connected service system 1000 according to an exemplary embodiment of the present invention may transmit and receive traffic information. In this case, a header of a data format for traffic information request transmitted from the dongle 200 to the server 300 may be configured as illustrated in Table 46 below.

TABLE 46

Description Cat.M1 Dongle Traffic Information Header
Direction Client -> Server

| No. | Offset | Byte | Type | Contents | Description | Value | Endian |
|---|---|---|---|---|---|---|---|
| 1 | 0 | 1 | unsigned char | Log Version | | 0x02/ 0x12 | Little |
| 2 | 1 | 1 | unsigned char | Function Flag | | 0x00 | Little |
| 3 | 2 | 1 | unsigned char | Body Count | 1~255 | | Little |
| 4 | 3 | 1 | unsigned int | Reserved | | 0x00 | Little |
| 5 | 4 | 4 | unsigned int | Device Number | | | Little |
| 6 | 8 | 4 | unsigned int | Time Stamp | | | Little |
| 7 | 12 | 4 | unsigned int | Latitude | WGS84 | | Little |
| 8 | 16 | 4 | unsigned int | Longitude | WGS84 | | Little |
| | Total Len | 20 | | | | | |

The description of the Log Version, Function Flag, Device Number, Time Stamp, Latitude, and Longitude fields among the fields in Table 46 is as illustrated in Table 47 below.

TABLE 47

| Field | Description |
|---|---|
| Log Version | 0x02 : Existing Interworking Standard<br>0x12 : ADAS Additional Interworking Standard |
| Function Flag | The details of the Function Flag Field are as shown in FIG. 54. |
| Device Number | Terminal Phone Number (CTN)<br>Ex> 012-1234-5678 -> 12345678 is converted to number and unsigned |

TABLE 47-continued

| Field | Description |
|---|---|
| Time Stamp | Transmit as integer<br>Based on UNIX Time Stamp (January 1, 1970, 0:0:0) : Second |
| Latitude Longitude | Convert Unit Value of Degree to Unit of 0.01 second (sec) (Cutting Below Decimal Point)<br>Latitude 127.103427 * 3600 * 100 = 45757233<br>Longitude 37.323876 * 3600 * 100 = 13436595 |

In addition, an ADAS data format body transmitted from the dongle 200 to the server 300 may be as illustrated in Table 48 below.

TABLE 48

| | | | | Description Cat.M1 Dongle ADAS Data Format Body Direction Client -> Server | | | |
|---|---|---|---|---|---|---|---|
| No. | Offset | Byte | Type | Contents | Description | Value | Endian |
| 1 | 0 | 2 | signed short | Latitude Diff. | | | Little |
| 2 | 2 | 2 | signed short | Longitude Diff | | | Little |
| 3 | 4 | 1 | unsigned char | Time Stamp Diff | | | |
| 4 | 5 | 1 | unsigned char | HDOP | 0~250 | | |
| 5 | 6 | 1 | unsigned char | Course | 0~179 | | |
| 6 | 7 | 1 | unsigned char | Speed | 0~255 Km/h | | |
| 7 | 8 | 1 | unsigned char | ADAS Event | Log Version: 0x12 | | |
| Total Len | | 9 | | | | | |

The description of the Latitude/Longitude, Time Stamp Diff, HDOP, Course, Speed, and ADAS Event fields among the fields in Table 48 is as illustrated in Table 49 below.

TABLE 49

| Field | Description |
|---|---|
| Latitude Longitude | Value Changed Based on Latitude/Longitude of Header Header Latitude/Longitude = 45757997/13435657 Current Latitude/Longitude = 45757986/13435605 Body Latitude/Longitude Calculation = 45757986 − 45757997 = −11 / 13435605 − 13435657 = 52 |
| Time Stamp Diff | Value Changed Based on Time Stamp Value of Header |
| HDOP | Actual HDOP (0.0 to 50.0) Value X 5 (Multiplication 5) |
| Course | Actual Course (0 to 359) value / 2 (Division 2) |
| Speed | Unit in Km/h, but Fixed to 255 in Case of 255 Km/h or More |
| ADAS Event | The details of the ADAS Event Field are as shown in FIG. 55. |

In addition, referring to Tables 48 and 49, according to an exemplary embodiment of the present invention, the ADAS data message transmitted from the dongle 200 to the server 300 includes difference information between the previously generated location information and the time stamp and the currently generated location information and the time stamp, not full information of location information and time stamp information in header information of the ADAS data message in order to minimize a size of the transmitted message. That is, if there is location information and time stamp information in which the ADAS data message to be transmitted from the dongle 200 to the server 300 is previously generated, and a new ADAS data message is generated by a specific event, the dongle 200 may reduce data usage compared to the existing data usage by transmitting only a difference (Latitude diff/Longitude diff) between the previously generated location information and the newly generated location information and difference (Time Stamp Diff) information between the previously generated time stamp and the newly generated time stamp to the server 300.

In addition, the body of the ADAS data format transmitted from the dongle 200 to the server 300 may include ADAS event information. Here, only the lane departure warning system (LDWS) and the front vehicle collision warning system (FCWS, uFCWS) are described as examples of the ADAS event information, but the ADAS event information may further include a front vehicle start alarm (FVSA), a traffic light change alarm (TLCA), a pedestrian detection and collision alarm (PDCA), and the like.

According to the protocol of the present invention, the data usage may be reduced to be suitable for the low-power wide-area communication by optimizing data compared to a conventional method. That is, according to the present invention, by changing the existing Jason method to the Binary method, and transmitting data that used an average of 200 bytes for all events in the existing header as TCP-based raw data to zero the data, the data usage may be reduced to be suitable for the low-power wide-area communication. Table 50 below is a table for explaining an improvement effect according to the protocol according to the present invention.

TABLE 50

| Classification | Existing NB-IOT Method | NB-IOT Method According to Present Invention |
|---|---|---|
| Communication Usage When Switching from Normal Mode to Parking Mode (Standard: 125 times/month) | 482 KB | 226 KB (Saving 53%) |
| Impact Event Communication Usage (Standard: 625 impacts/month) | 225 KB | 39 KB (Saving 83%) |
| Impact Event Communication Usage (Standard: 625 impacts/month) | 6.91 MB | 3.16 MB (Saving 54%) |
| Other Communication Usages (Power off 60 times/month, Battery Voltage Value 150 times/month) | 88 KB | 16 KB (Saving 82 KB) |
| TOTAL | 7.69 MB | 3.43 MB (Saving 55%) |

Meanwhile, the connected system 1000 according to an exemplary embodiment of the present invention may provide the connected service according to the present invention based on the above-described protocol. The connected service may be performed by, when a connected service application is executed in the user terminal device 400, the user terminal device 400 accessing the server 300 to acquire various data (e.g., data acquired by the image capturing apparatus 100 for a vehicle) stored in the server 300 and generating various user interfaces based on the acquired data to display the various user interfaces on a screen.

Hereinafter, an implementation example of the connected service according to an exemplary embodiment of the present invention will be described in more detail with reference to the subsequent drawings.

Figure 12A:
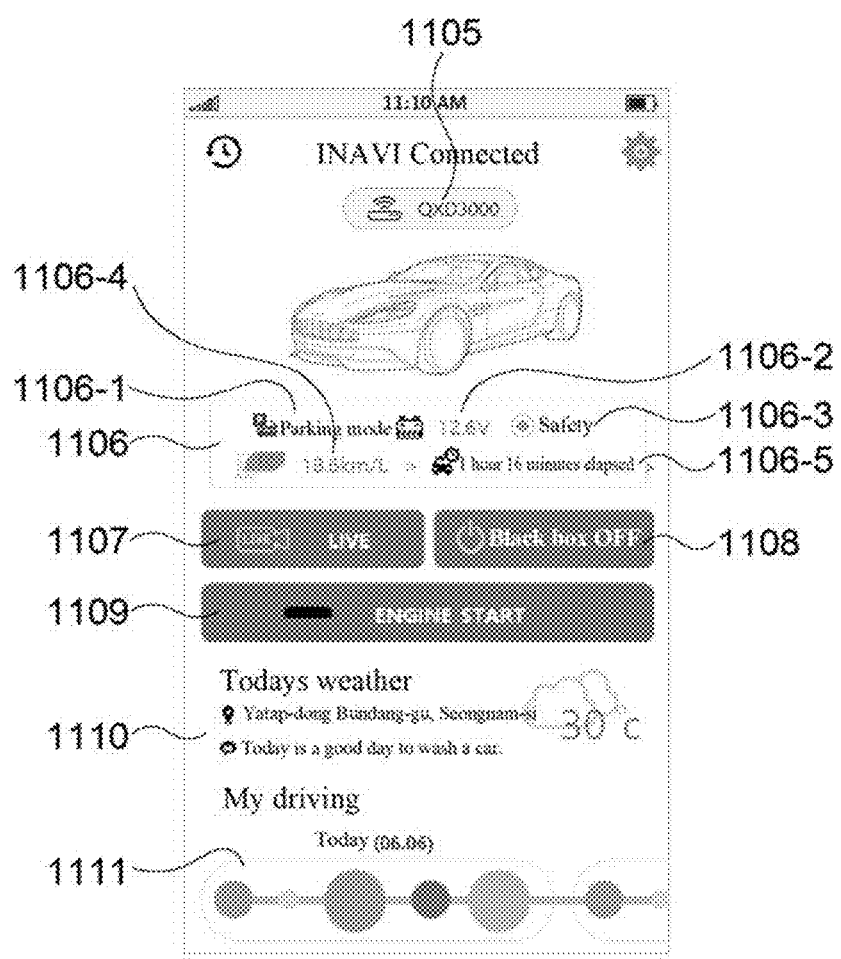
FIGS. 12A to 12C are diagrams illustrating a main user interface according to an exemplary embodiment of the present invention.
Figure 12B:
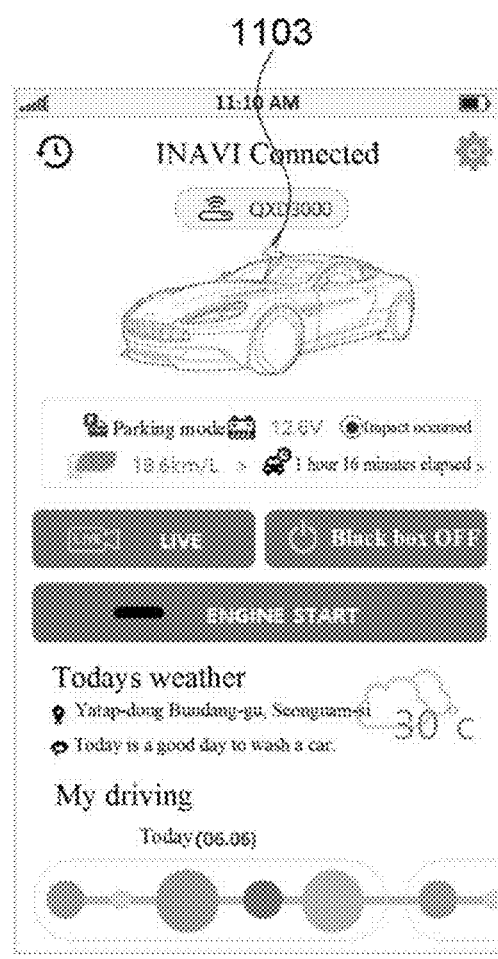
Figure 12C:
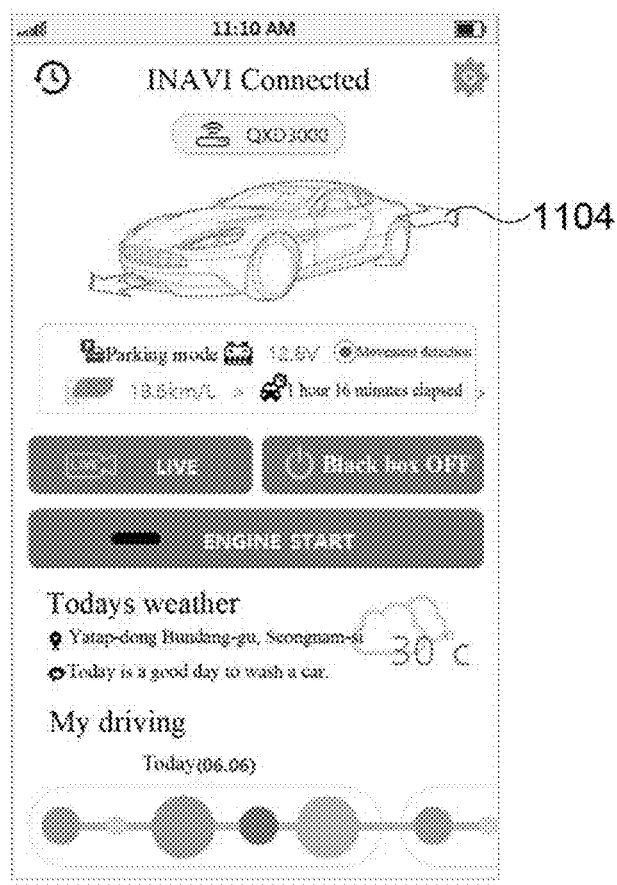

FIGS. 12A to 12C are diagrams illustrating a main user interface according to an exemplary embodiment of the present invention. Here, the main user interface is an interface displayed when the connected service application according to the present invention is first executed, and the interface may be configured by the user terminal device 400 receiving, from the server 300, the data transmitted from the black box 100 and the dongle 200 to the server 300 according to the processes described above with reference to FIGS. 5 to 11. As an example, the user terminal device 400 displays an executable object for providing information about user content to a user on the display unit in the form of user experience (UX), and receives and provides data corresponding to an input from the server 300 when a selection for the executable object displayed on the display unit is input by the user. For example, if the application for providing a connected service according to an exemplary embodiment of the present invention is installed on the user terminal device 400, the user terminal device 400 executes the application by the user inputting an execution command (click, voice control, and the like) for the application. In addition, the user terminal device 400 requests various data selected by the user from the UX screen provided to the user to the server 300, and receives and provides the requested data to the user. Through such a method, the user terminal device 400 may display a notification about various events such as information of the black box 100 which is remotely separated, a vehicle impact notification, a vehicle movement detection notification, and images captured by the black box 100.

Specifically, referring to FIG. 12A, a main user interface 1101 may display connection status information of the black box 100 connected to the server 300, a vehicle image, and an event notification icon for the vehicle. At this time, a screen illustrated in FIG. 12A may be displayed after authentication is completed through a registration procedure for the black box 100 and the user of the user terminal device 400.

Referring to FIGS. 12A to 12C, as an example, in the UX screen of the application provided to the user, an operation mode of the black box 100 may be displayed to be visually distinguished as a border color of a vehicle image object. As an example, when the operation mode of the black box 100 is in the parking mode and in the normal mode, the border color of the vehicle image object may be changed and displayed differently. As another example, the user may also visually distinguish each operation mode by using representative text indicating the operation mode of the black box 100. For example, in the case of the parking mode, an alphabet "P" may be displayed on the vehicle image, and in the case of the normal mode, an alphabet "N" may be displayed on the vehicle image.

As another example, the border color of the vehicle image object may also display a positive/negative state of the vehicle. As an example, the border color of the vehicle image object may be displayed in a red color in various dangerous situations, such as when there is an impact on the vehicle, when a movement of the vehicle is detected, or when a danger is detected during the ADAS function. However, the border color of the vehicle image object may be displayed in a green color when the vehicle is parked or in a safe situation.

As another example, when an impact event occurs while parking or driving the vehicle, the application may display an impact notification icon 1103 on the vehicle image as a visual object informing the occurrence of the impact event on the vehicle, as illustrated in FIG. 12B. In this case, the visual object may be modified and displayed according to the magnitude of an impact value received from the server 300. For example, a size of an icon may be changed, or different icons or a color of the icon may be changed and displayed. As another example, when the impact event occurs while parking or driving the vehicle, the application may display the occurrence of the event in the form of generating vibration on the vehicle image. For example, the magnitude of the vibration of the vehicle image may also be adjusted and displayed according to the degree or frequency of occurrence of the event. At this time, as a method of displaying the vibration of a vehicle image, the vibration may be displayed by vibrating the vehicle image in the left and right or up and down directions to move the vehicle image, and may also be displayed by a vibration animation method.

As another example, when a movement of the vehicle is detected while parking the vehicle, a visual object (e.g., an arrow icon 1104) informing a movement event of the vehicle may be displayed on the vehicle image as illustrated in FIG. 12C. In this case, a movement direction of the vehicle may be displayed by a corresponding arrow based on the direction and/or size of the impact value received from the server 300.

Meanwhile, a region 1105 of the main user interface 1101 may display information (product name, and the like) of the black box 100 connected to a smartphone, and connection status information of the black box 100 as a visual object.

In addition, a region 1106 of the main user interface 1101 is a region for displaying vehicle status information, and may display the current vehicle's mode (parking mode/driving mode) information, the vehicle's battery status information (e.g., a vehicle's battery current value and a drivable distance), and secondary battery information (e.g., display a percentage of remaining battery) when a secondary battery is mounted, as visual objects.

Specifically, a region 1106-1 may display a current vehicle's mode, for example, a normal mode and a parking mode.

In addition, a region 1106-2 may display the vehicle's battery status information (e.g., the vehicle's battery current value).

In addition, a region 1106-3 may display current status information of the black box and/or the vehicle. For example, the region 1106 may display various information such as vehicle safety, vehicle impact occurrence, vehicle movement detection, a need to check the connection status of the black box communication, a black box ultra-low power mode, black box communication module update, and the like, as visual objects.

In addition, a region 1106-4 may display driving fuel efficiency information and a corresponding icon. As an example, when an average fuel efficiency of the vehicle is higher than a preset value, the average fuel efficiency of the vehicle and an "ECO" icon may be displayed. If the user selects the "ECO" icon, the user terminal device 400 may display a detailed fuel efficiency statistics screen.

In addition, a region 1106-5 may display parking elapsed time information and a corresponding icon. Here, the parking elapsed time may mean a time difference from a time when the vehicle is parked to a current time. If the user selects the parking elapsed time icon, the user terminal device 400 may display a user interface displaying the last parking location of the vehicle. Here, the user interface displaying the last parking location may be as illustrated in FIGS. 15 to 17.

If there is no information on the last parking location of the vehicle, the user terminal device 400 may display location information set as a default in the region 1106.

Figure 23A:
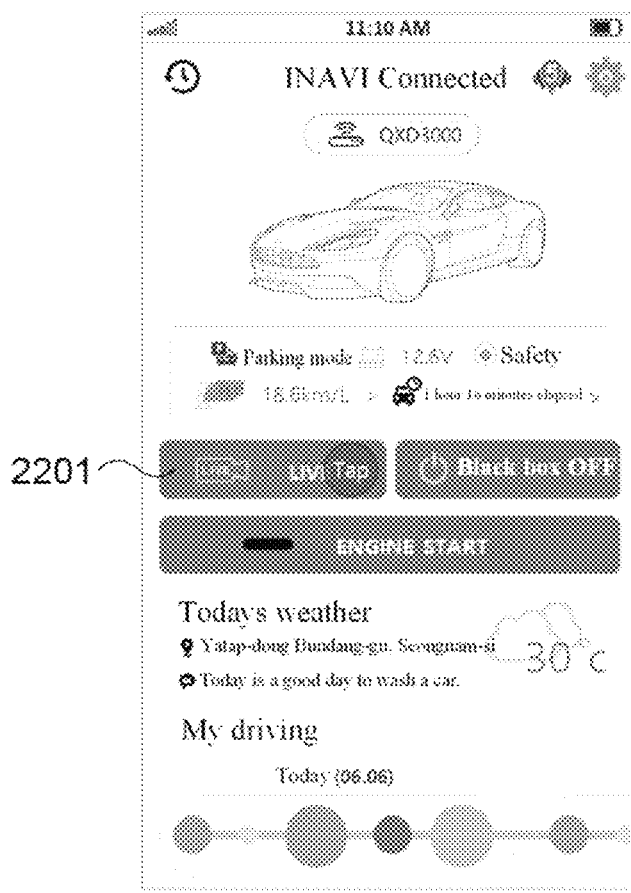
FIGS. 23A to 23C are diagrams illustrating a user interface when inputting a live command according to an exemplary embodiment of the present invention.
Figure 23B:
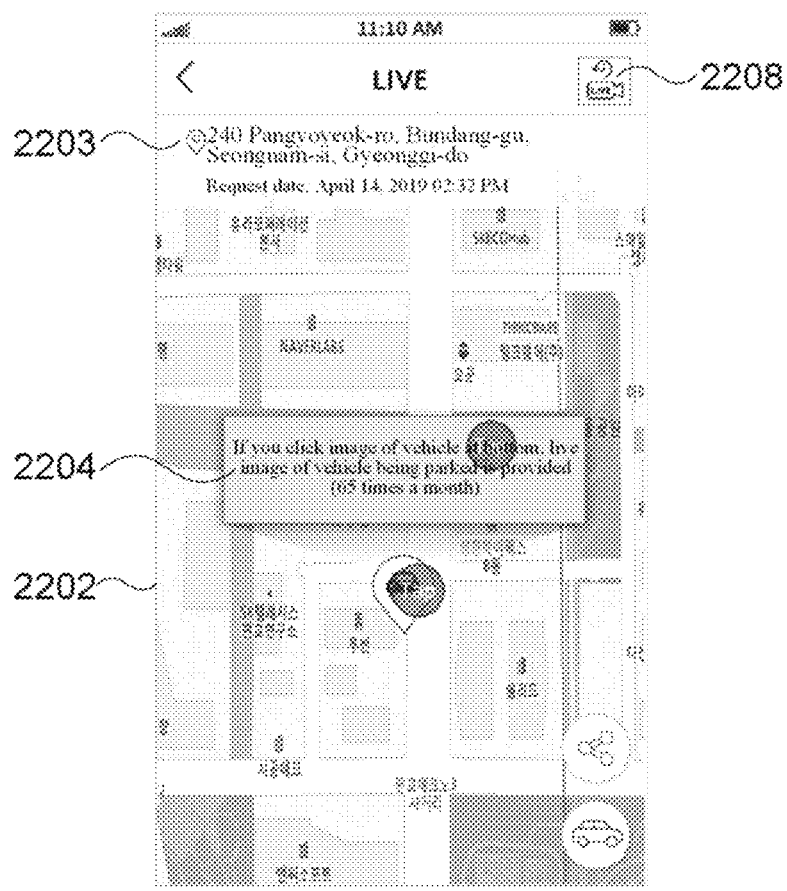
Figure 23C:
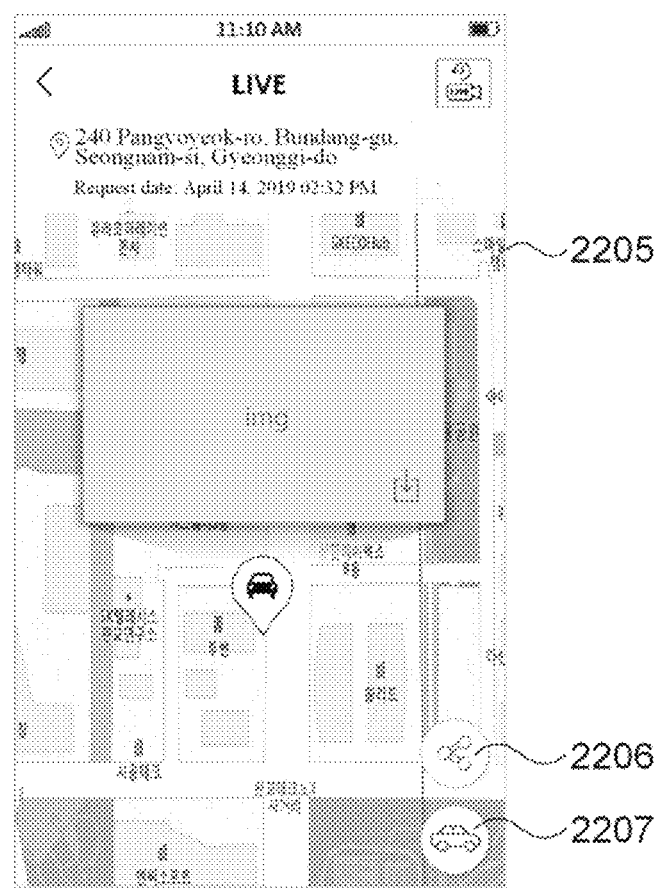

Meanwhile, a region 1107 is a live button, and if the region 1107 is selected, the user terminal device 400 may request a real-time capturing image to the black box 100 through the server 300, and may display a user interface displaying an image captured in real time in the black box 100 received through the server 300 according to the request. Here, the user interface displaying the real-time image may be as illustrated in FIGS. 23A to 23C.

In addition, a region 1108 is a black box off button, and if the region 1108 is selected, the user terminal device 400 may generate a control signal for powering off the black box 100 and transmit the control signal to the server 300.

In addition, a region 1109 is a button of turning on/off an engine of the vehicle, and the ON/OFF state of the vehicle's start may be displayed by whether an LED of the region 1109 is turned on/off. If the region 1109 is selected, the user terminal device 400 may generate a control signal for turning on/off the engine of the vehicle and transmit the control signal to the server 300.

In addition, a region 1110 is a weather information display region, and may display phrases related to an address, weather, and a vehicle, a temperature, and a weather icon based on the location of the user terminal device 400. Here, the phrase related to the vehicle may mean a useful phrase related to the vehicle based on a current weather, such as "Today is a good day to wash a car."

In addition, a region 1111 is a display region of my driving information, and may display a driving accumulation record for a predetermined period (e.g., the last 7 days). If there is a day when the driving has not been performed for a predetermined period, the display region 1111 of my driving information may display the remaining driving information except for information on the corresponding day. The my driving information displayed in the region 1111 is a visual display of the driving accumulation record of the vehicle, and may be referred to as driving history information, and may be displayed as a visual object (e.g., a size of a circle) capable of distinguishing between many and few accumulated driving distances for each date.

Here, the driving information displayed through the region 1111 may include at least one of event information generated while driving the vehicle, such as sudden deceleration, sudden acceleration, over-speed, forward collision warning, and lane departure warning. In addition, the driving information displayed for each date in the region 1111 may display a visual object corresponding to the number of times of events occurring on the corresponding date. For example, as the number of times of events that occurred is larger, a larger size circle may be displayed, and as the number of times of events that occurred is smaller, a relatively smaller size circle may be displayed.

In addition, the driving information may be displayed in the order of the sudden deceleration, the sudden acceleration, the over-speed, the forward collision warning, and the lane departure warning, and each circle of the region 1111 may be an icon representing the sudden deceleration/sudden acceleration/over-speed/front collision warning/lane departure warning from left to right. Here, different colors may be mapped to the region 1111 for each driving information.

In addition, a date expression method in the region 1111 may be provided in a time order, such as today/yesterday/2 days ago/3 days ago/4 days ago/5 days ago/6 days from the left.

If there is no driving information, the region 1111 may be provided with a phrase such as "There is no driving record. Start driving."

Meanwhile, when the driving information of a specific date is selected, the user terminal device 400 may display a user interface that displays driving information of the selected date in detail.

On the other hand, in the region 1111, a criterion for providing the size of the circle according to the driving record may represent the number of times of events in a total of three sizes. As an example, the first number of times or more (e.g., 5 times) may be displayed by the largest circle, the second number of times (e.g., between 2 and 4 times) may be displayed by a medium circle, and the third number of times (e.g., less than 1 time) may be displayed by the smallest circle.

However, the circular display of driving information in the region 1111 is only an example of the present invention, but the present invention is not limited thereto. For example, the driving information may also be displayed through other polygons such as squares or visual bubbles such as balloons. According to another exemplary embodiment of the present invention, the driving record information may be displayed while maintaining the above criteria through a rod shaped method (e.g., a large rod/medium rod/small rod), not the circular method.

Figure 13A:
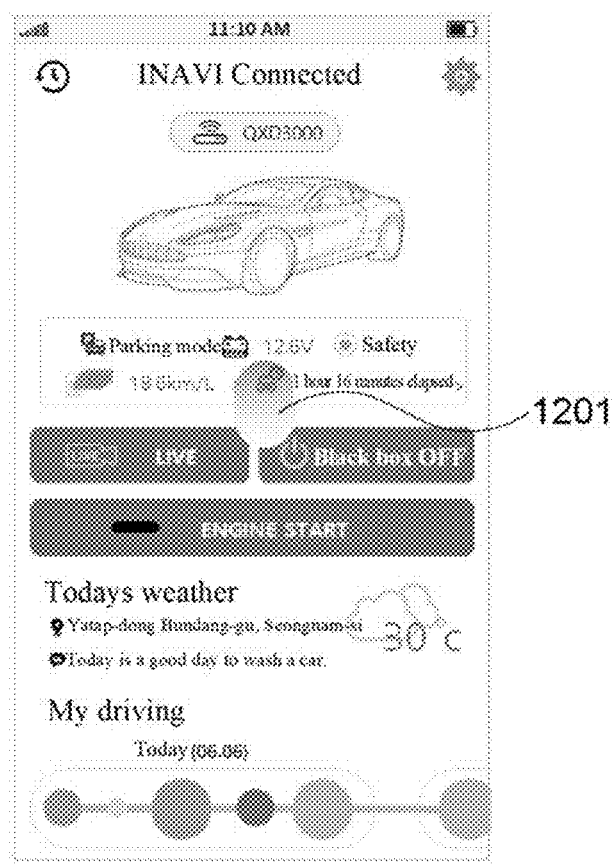
FIGS. 13A to 13C are user interface diagrams illustrating a refresh process of the main user interface according to an exemplary embodiment of the present invention.
Figure 13B:
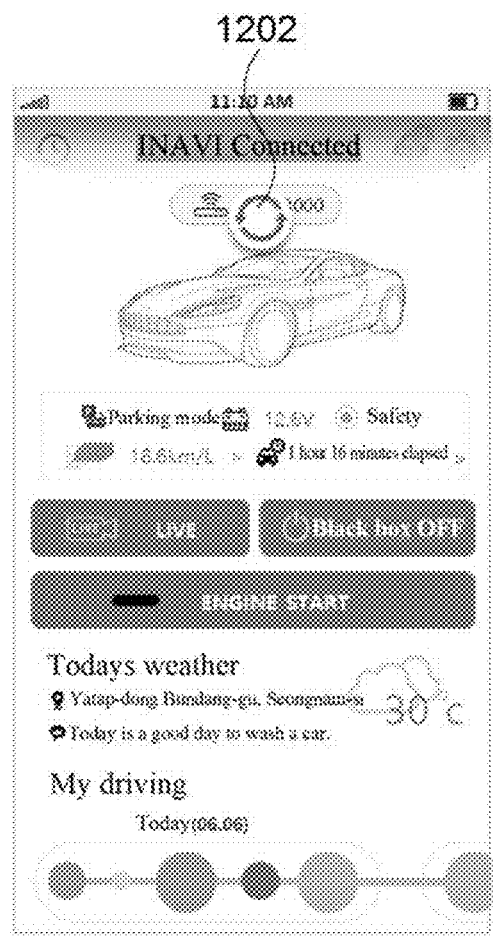
Figure 13C:

FIGS. 13A to 13C are user interface diagrams illustrating a refresh process of the main user interface according to an exemplary embodiment of the present invention. As illustrated in FIG. 13A, the user may input an up and down flick operation 1201 that descends top to bottom through the main user interface.

In this case, the user terminal device 400 may display an icon 1202 indicating that the main user interface is being refreshed as illustrated in FIG. 13B.

In addition, if the refresh is completed, the user terminal device 400 may update and display information displayed on the main user interface with information of a current time point as illustrated in FIG. 13C.

Figure 14A:
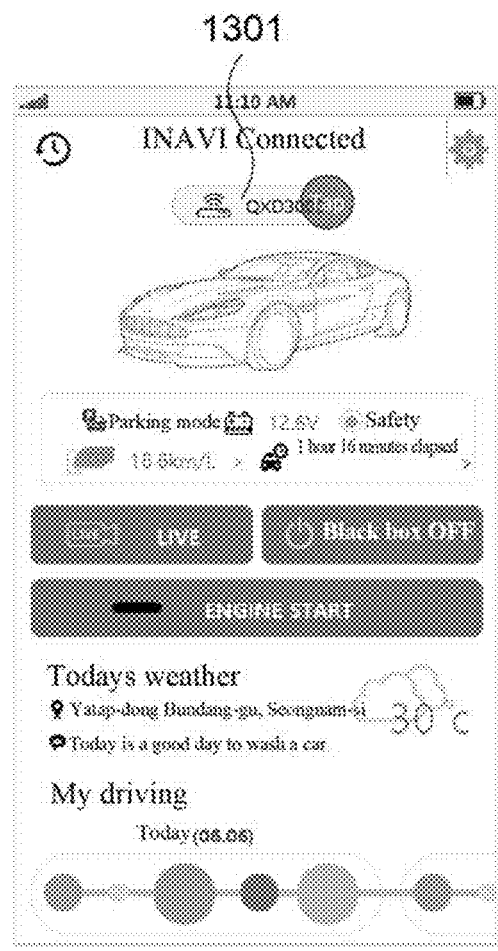
FIGS. 14A to 14B are user interface diagrams illustrating a black box registration process through the main user interface according to an exemplary embodiment of the present invention.
Figure 14B:
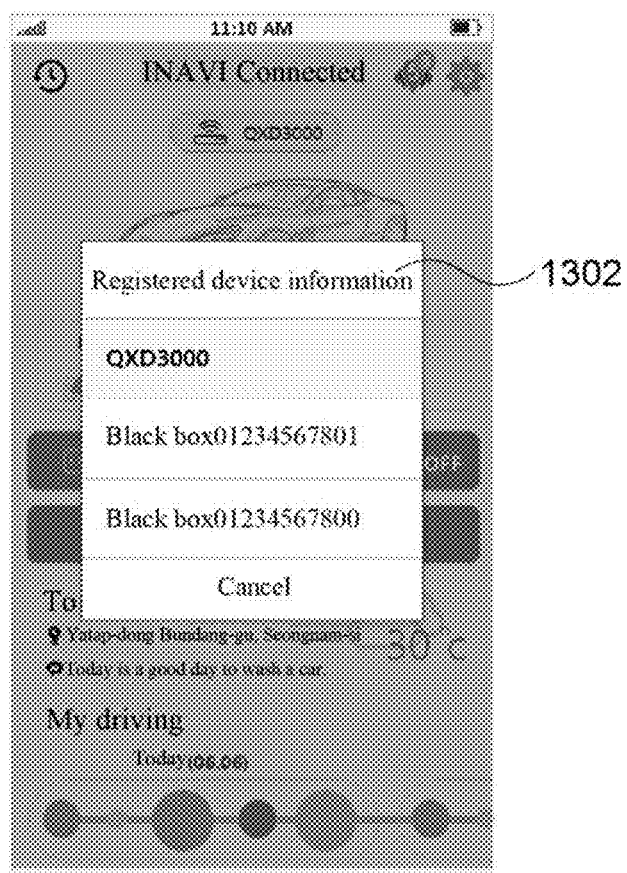

FIGS. 14A to 14B are user interface diagrams illustrating a black box registration process through the main user interface according to an exemplary embodiment of the present invention. As illustrated in FIG. 14A, the user may select a region 1301 displaying information of the connected black box. In this case, the user terminal device 400 may display a registered black box list 1302 as a pop-up window as illustrated in FIG. 14B, and may display a currently connected black box "QXD 3000" at the top. Here, the display through the pop-up window may be performed only when there are two or more registered devices.

If the user selects a device other than the currently connected image capturing apparatus in the black box list 1302, the pop-up window may be closed after connecting to the device selected by the user.

Figure 15A:
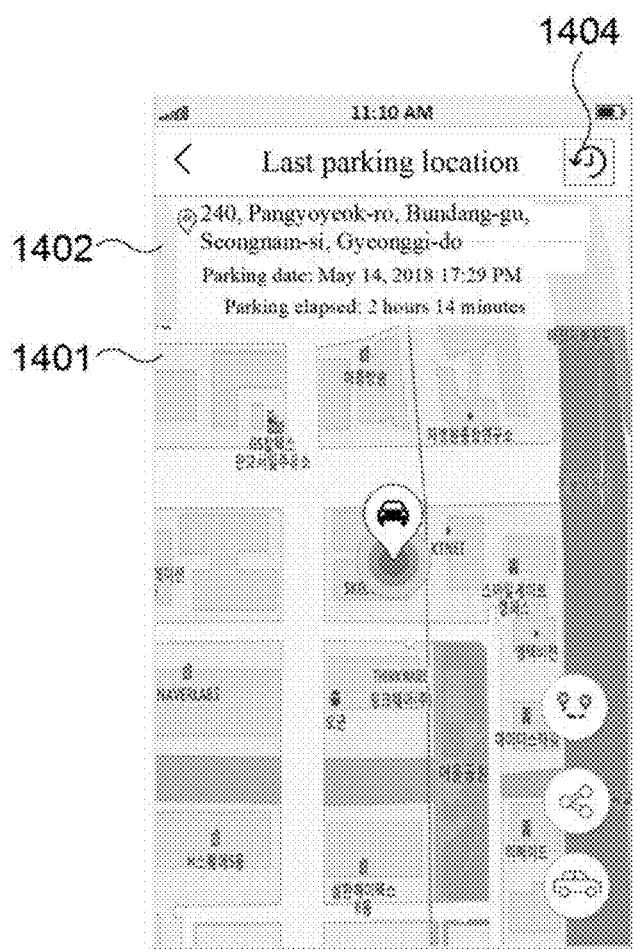
FIGS. 15A to 15B are diagrams illustrating a user interface of a last parking location according to an exemplary embodiment of the present invention.
Figure 15B:
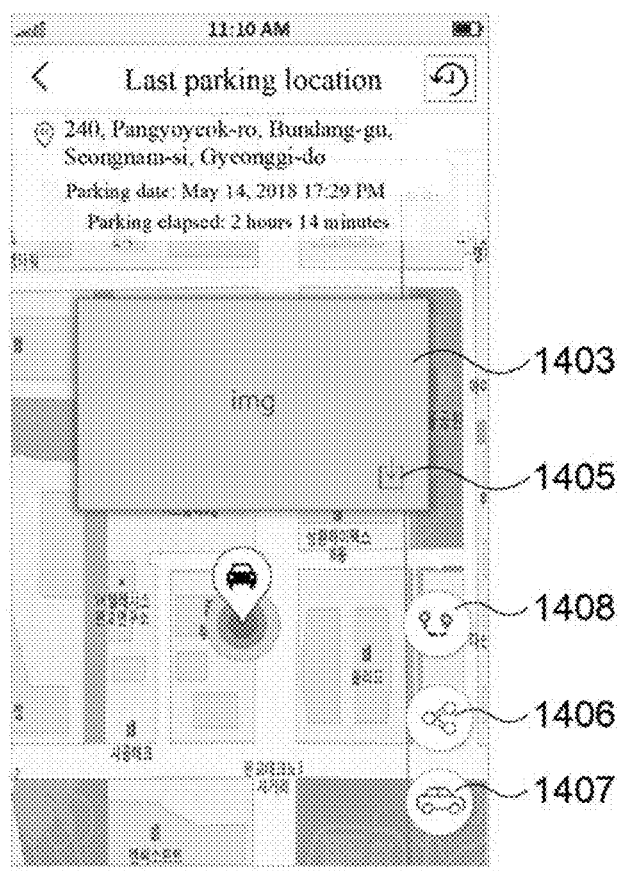
Figure 16:
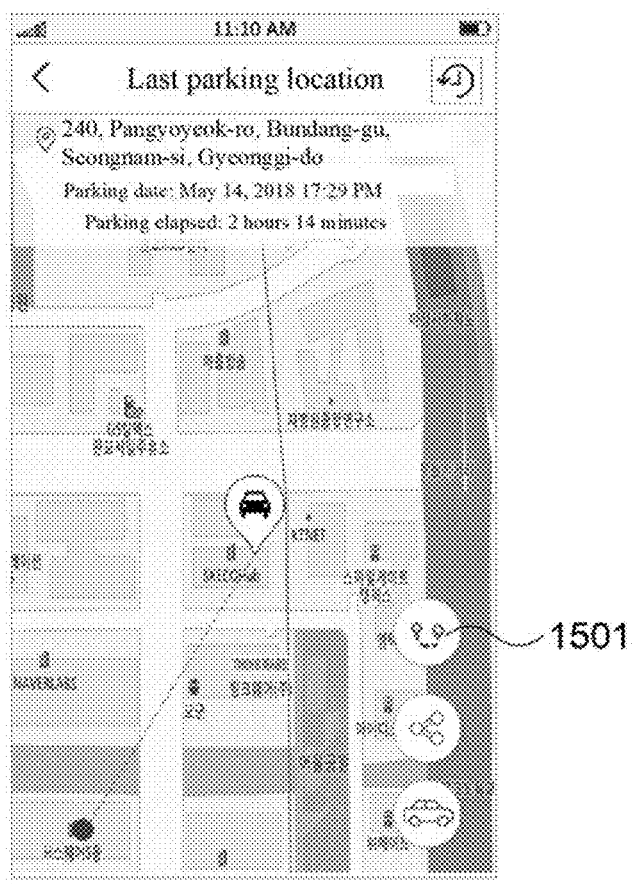
FIG. 16 is a diagram illustrating a user interface displaying a user's current location and a last parking location according to an exemplary embodiment of the present invention.

FIGS. 15A to 15B are diagrams illustrating a user interface of a last parking location according to an exemplary embodiment of the present invention. If a parking elapsed time icon 1106-5 illustrated in FIG. 12A is selected, the user terminal device 400 may display a user interface 1401 that displays the last parking location of the vehicle on a map, as illustrated in FIG. 15A. FIG. 15A illustrates that the last parking location of the vehicle is displayed on the map in the form in which a vehicle icon is included in the form of a visual bubble. In addition, in an upper region 1402 of the user interface 1401, parking location, parking time, and parking elapsed time information of the vehicle may be displayed.

In addition, as illustrated in FIG. 15B, the user interface 1401 may provide the last parking location and an image 1403 for the last parking location. Here, the image 1403 for the last parking location may be an image captured at a predetermined time point during a switching period when the black box 100 is switched from the normal mode to the parking mode according to the starting off after the parking of the vehicle is completed.

In addition, the map displayed on the user interface 1401 may receive various touch inputs such as tap/drag/zoom in/zoom out/rotation from the user.

Meanwhile, a region 1404 is a parking history button, and when the region 1404 is selected, a parking history user interface may be displayed. This will be described below with reference to FIG. 16.

In addition, a region 1405 is an image download button, and when the region 1405 is selected, a corresponding image may be stored in the user terminal device 400.

In addition, a region 1408 is a button that displays a current location of the user and the last parking location of the vehicle, and when the region 1408 is selected, the current location of the user and the last parking location of the vehicle may be displayed on the map. This will be described below with reference to FIG. 16.

In addition, a region 1406 may be a shared button, and a region 1407 may be a vehicle location display button. This will be described below with reference to FIGS. 17 and 18.

Meanwhile, when there is no last parking location of the vehicle, the user terminal device 400 may display a default location on the user interface 1401. Alternatively, when there is a past parking location but no last parking location, the user terminal device 400 may display a previous parking location on the user interface 1401.

FIG. 16 is a diagram illustrating a user interface displaying a user's current location and a last parking location according to an exemplary embodiment of the present invention. Referring to FIG. 16, if the user selects a region 1501, the user terminal device 400 displays the current location of the user and the last parking location of the vehicle on the map, and may display a relationship between both locations by connecting the current location of the user and the last parking location of the vehicle in a straight line (dotted line).

In addition, when displaying the straight line connecting the current location of the user to the last parking location of the vehicle, the user terminal device 400 may control a scale of the map so that the last parking location of the vehicle and the current location of the user are displayed on one screen.

In addition, although not illustrated in FIG. 16, the user terminal device 400 may calculate a straight line distance between the current location of the user and the last parking location of the vehicle and a distance via a driveable road at the same time as the straight line display, and may also display the calculated distance on the screen. In addition, the user terminal device 400 may perform route guidance from the current location of the user to the last parking location of the vehicle by interworking with a navigation application.

Figure 17A:
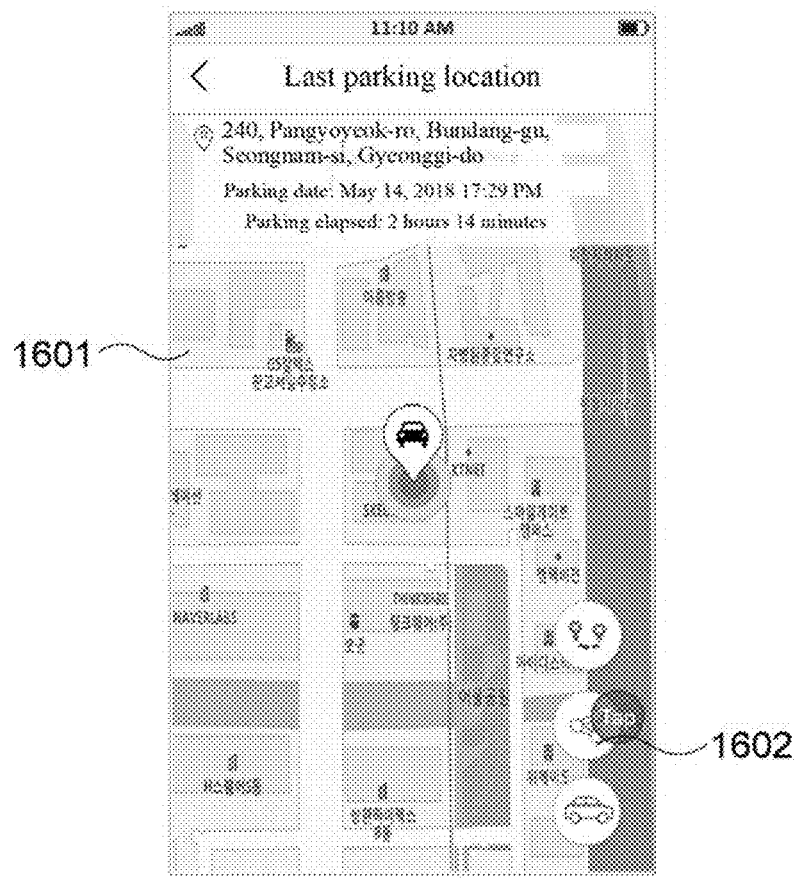
FIGS. 17A to 17C are user interface diagrams illustrating a process for sharing a last parking location image according to an exemplary embodiment of the present invention.
Figure 17B:
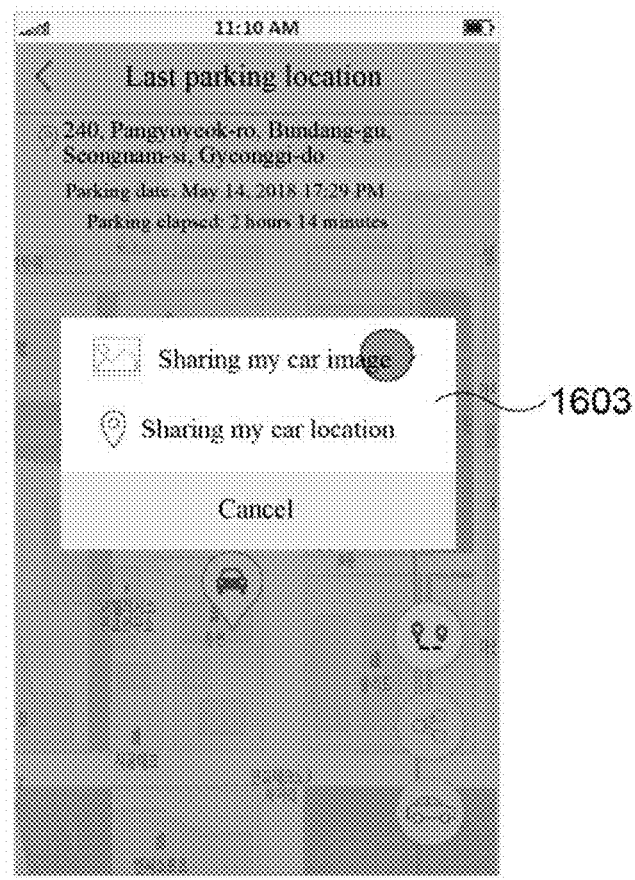
Figure 17C:
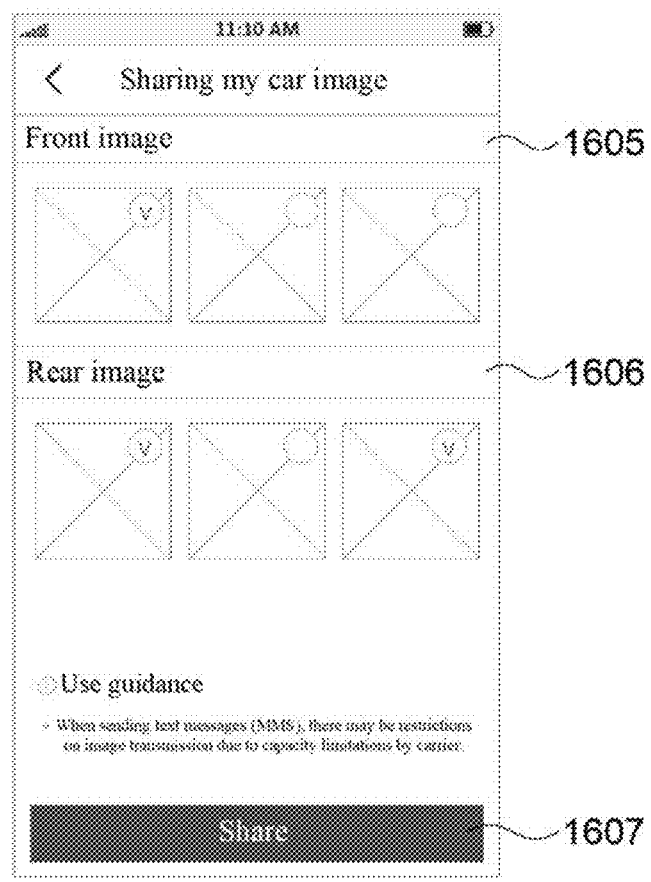

FIGS. 17A to 17C are user interface diagrams illustrating a process for sharing a last parking location image according to an exemplary embodiment of the present invention. As illustrated in FIG. 17A, when a region 1602 corresponding to a share button is selected in a user interface 1601, the user terminal device 400 may display a sharing type selection pop-up window 1603 as illustrated in FIG. 17B.

If the user selects "Share my car image" in the sharing type selection pop-up window 1603, the user terminal device 400 may display a shareable image list screen illustrated in FIG. 17C. Here, the shareable image list screen may include a front image list 1605 and a rear image list 1606, and the user may select an image to share from the displayed shareable image list screen.

If the user selects an image to share and selects a share button 1607, the user terminal device 400 may display a shareable social network service (SNS) list or a contact list.

Figure 18A:
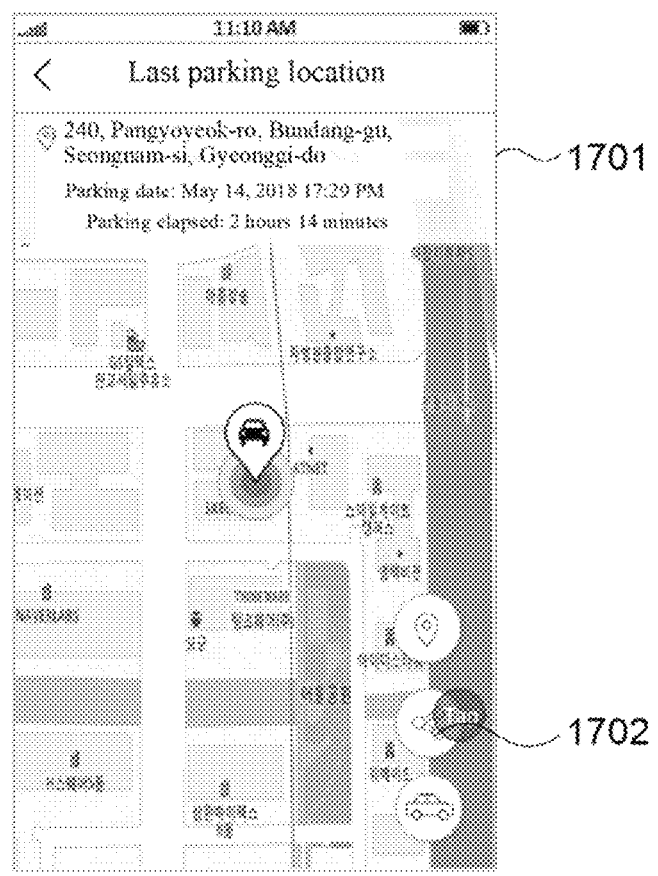
FIGS. 18A to 18E are user interface diagrams illustrating a process for sharing a last parking location according to an exemplary embodiment of the present invention.
Figure 18B:
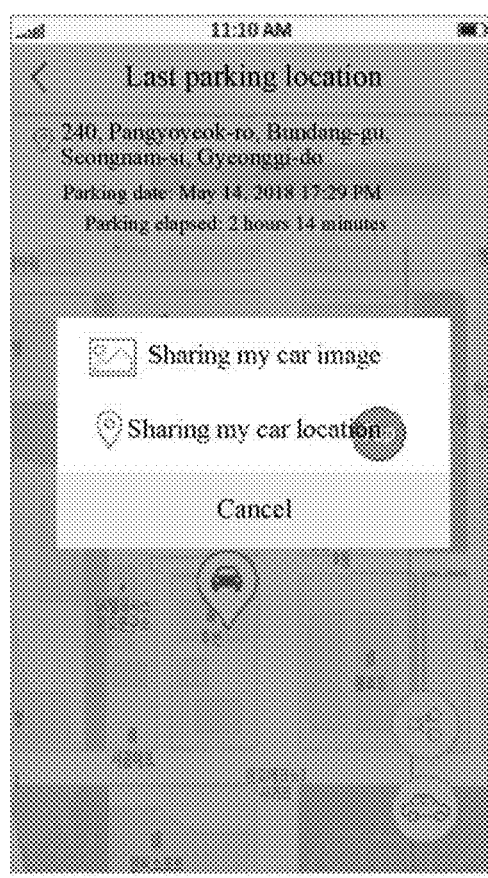

FIGS. 18A to 18E are user interface diagrams illustrating a process for sharing a last parking location according to an exemplary embodiment of the present invention. As illustrated in FIG. 18A, when a share button 1702 is selected in a user interface 1701, the user terminal device 400 may display a sharing type selection pop-up window 1703 as illustrated in FIG. 18B.

Figure 18C:
Figure 18D:
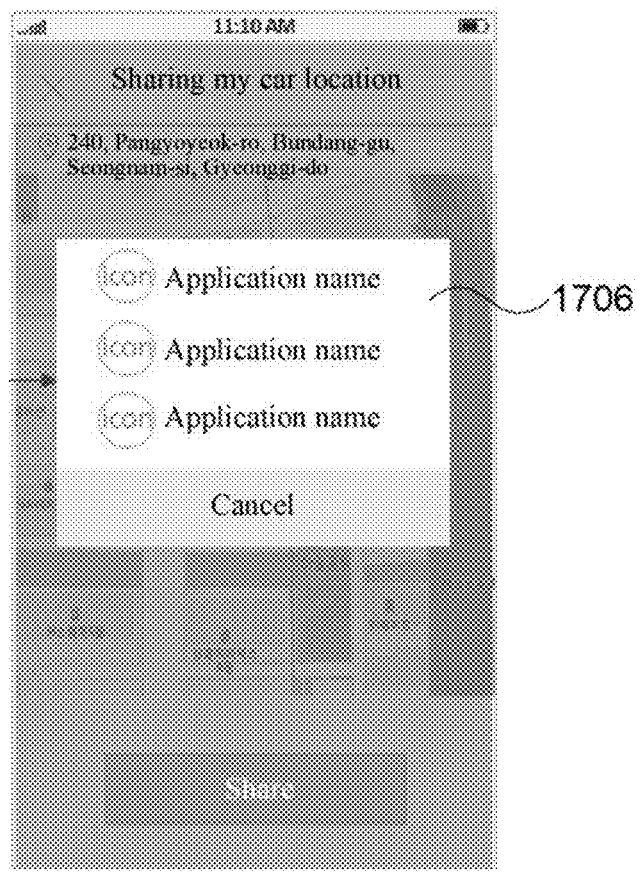

If the user selects "Share my car location" in the sharing type selection pop-up window 1703, the user terminal device 400 may display a screen for sharing the last parking location of my car illustrated in FIG. 18C. Here, in FIG. 18C, the last location of my car may be displayed in the center of the map, and an address of the last parking location may be displayed at the top of the screen. In this case, if the user selects "Share" 1705, the user terminal device 400 may display a shareable application list 1706 illustrated in FIG. 18D. Here, the shareable application is a list of applications that may share location information among applications installed in the user terminal device 400, and in the list 1706, icons and application names may be displayed.

If the user selects an application from the shareable application list 1706, the user terminal device 400 may generate sharing information and share the sharing information through the selected application.

Figure 18E:
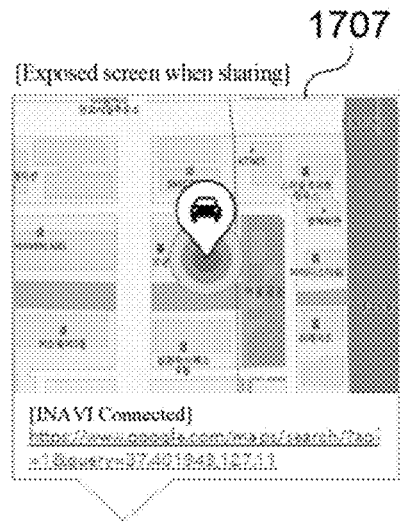

In this case, the sharing information displayed when sharing the last parking location may be as illustrated in FIG. 18E. That is, sharing information 1707 may include an image displaying the last parking location of the vehicle on a map, and a link URL of the corresponding map.

As an example, when the sharing information 1707 is shared through a message, a terminal device of another user may display the sharing information through the message, and when another user selects the sharing information, the last parking location of the user may be displayed on the map.

Figure 19A:
FIGS. 19A to 21B are diagrams illustrating a user interface for managing parking history according to an exemplary embodiment of the present invention.
Figure 19B:
Figure 19C:
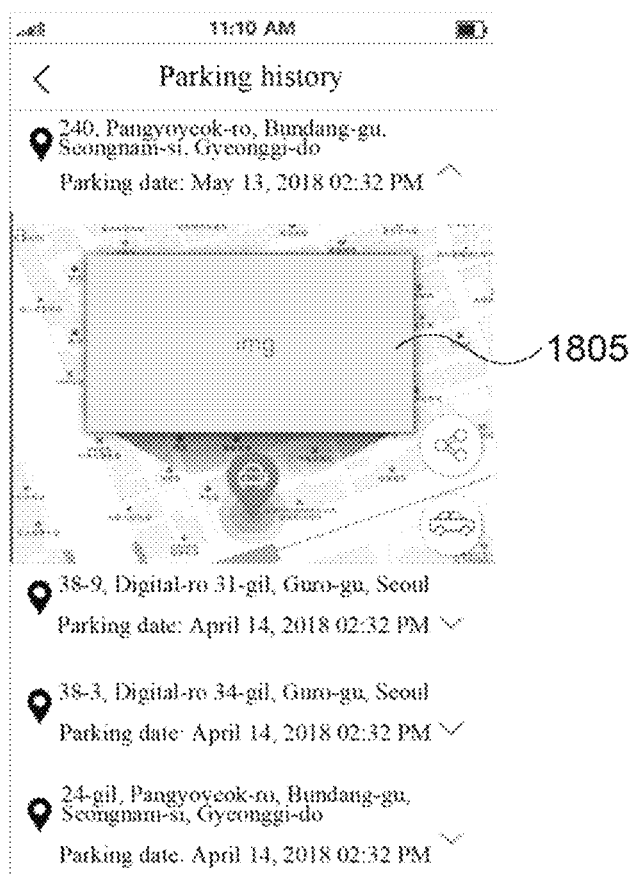

FIGS. 19A to 19C are diagrams illustrating a user interface for managing parking history according to an exemplary embodiment of the present invention. A region 1802 displayed on a user interface 1801 of FIG. 19A is a parking history button, and if the user selects the region 1802, the user terminal device 400 may display a user interface 1803 as illustrated in FIG. 19B.

The user interface 1803 may provide parking location information and parking date and time information in the latest parking record order. In this case, the user interface 1803 may not provide the last parking location information displayed on the user interface 1801 as a parking history.

If one parking history is selected in the user interface 1803, a map user interface 1805 may be displayed to be unfolded at the bottom of the selected parking history as illustrated in FIG. 19C. In this case, the map user interface 1805 may display a parking location image corresponding to the selected parking history and a parking location on the map. Here, the touch interaction on the map may be applied in the same way as the map interaction described above.

Figure 20A:
Figure 20B:

FIGS. 20A to 20B are diagrams illustrating a user interface for managing parking history according to an exemplary embodiment of the present invention. Referring to FIG. 20A, in a user interface 1901 indicating the parking history list, when the user maintains a touch and inputs left flicking to move from left to right, a delete button 1902 for a parking history to which the left flicking is input may be activated as illustrated in FIG. 19B. If the user selects the delete button 1902, the parking history selected in the parking history list may be deleted.

Figure 21A:
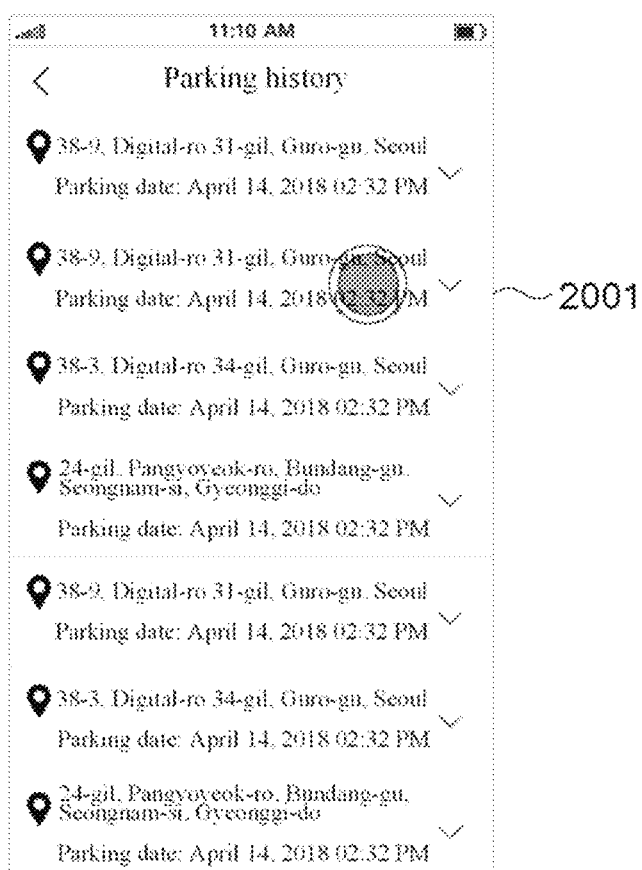
Figure 21B:

FIGS. 21A to 21B are diagrams illustrating a user interface for managing parking history according to an exemplary embodiment of the present invention. Referring to FIG. 21A, in a user interface 2001 indicating the parking history list, when the user inputs a touch & hold command to maintain a touch for a predetermined time after inputting a touch, the user terminal device 400 may display a parking history list editing user interface 2003 as illustrated in FIG. 21B.

If the user selects a whole button in the user interface 2003, checkboxes of all lists are selected, and if the whole button is selected again in the state in which all the lists are selected, the checkboxes of all the lists may be deselected.

In addition, when the user selects a checkbox in the user interface 2003, the corresponding check box is checked and a delete button may be activated at the bottom. In addition, when the user selects a list delete button, the selected list may be deleted.

Figure 22A:
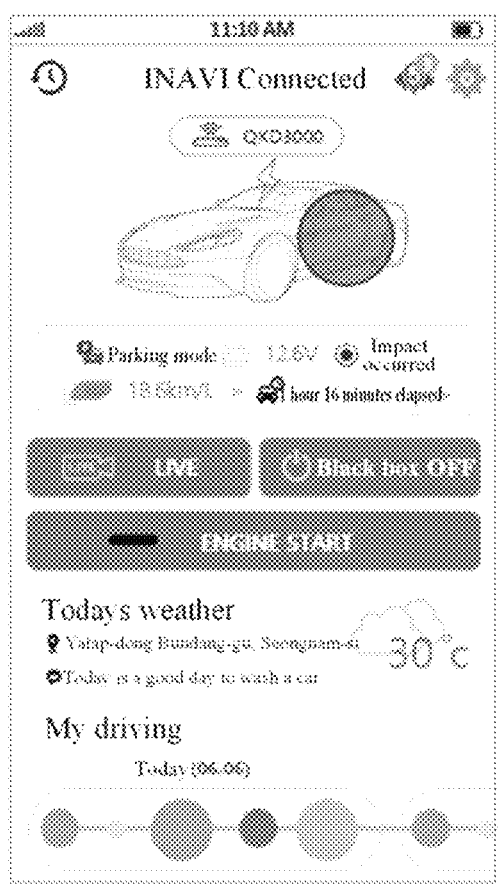
FIGS. 22A to 22D are diagrams illustrating a user interface in a situation of an impact event of the vehicle or a movement event of the vehicle according to an exemplary embodiment of the present invention.
Figure 22B:

FIGS. 22A to 22D are diagrams illustrating a user interface in a situation of an impact event of the vehicle or a movement event of the vehicle according to an exemplary embodiment of the present invention. As illustrated in FIG. 22A, the main user interface may display an impact notification icon notifying the occurrence of an impact event for the vehicle when an impact event occurs while parking or driving the vehicle on the image of the vehicle. Alternatively, as illustrated in FIG. 22B, when a movement of the vehicle is detected while parking the vehicle, the main user interface may display a visual object (e.g., an arrow icon) notifying the movement event of the vehicle on the image of the vehicle.

Figure 22C:
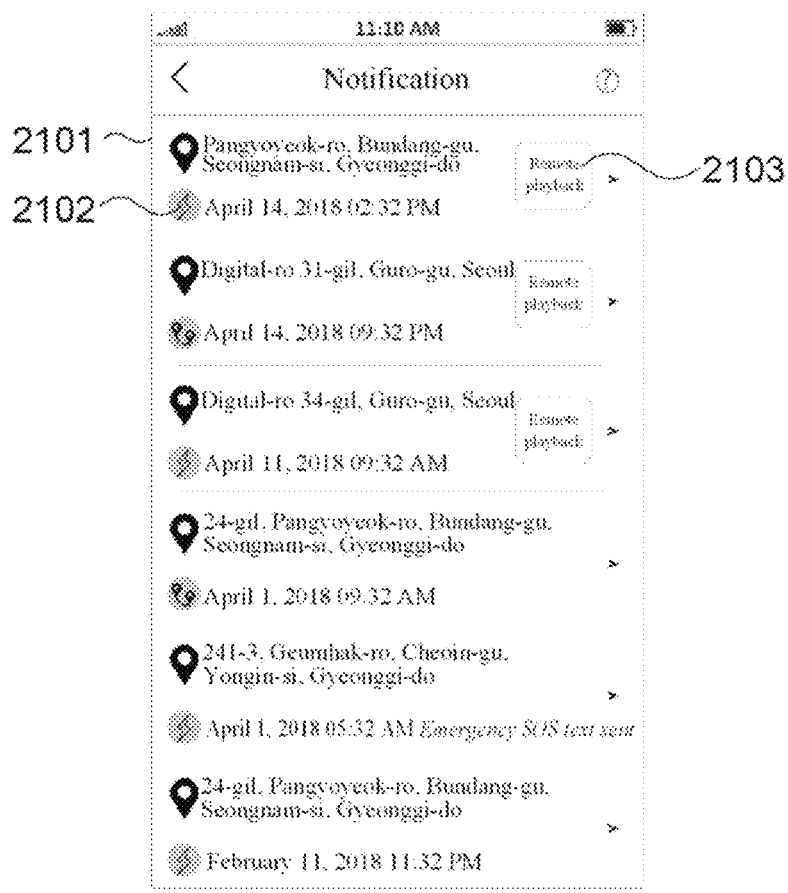

If the user selects a vehicle image object in the main user interface, the user terminal device 400 may display an event history list 2101 as illustrated in FIG. 22C. Here, the event history list 2101 may display event information for each event, and the event information may display an event location, an event date, and an event time.

In addition, the event history list 2101 may position and display information on the latest occurrence event at the top.

In addition, the event history list 2101 may display an event type icon 2102. Here, the event type icon 2102 may display an impact event during parking, a movement event during parking, and an impact event during driving to be distinguished by different icons.

In addition, the event history list 2101 may include a region 2103 corresponding to a remote playback button. Here, the region 2103 may provide a notification that occurred within a predetermined period from a current time point. Here, the "remote play" may be a function to provide an image corresponding to the selected notification in the black box 100, not the user terminal device 400.

However, the "remote playback" is not limited thereto, and may be implemented to provide the image corresponding to the selected notification in the user terminal device 400. In this case, considering the size of a user data storage space allocated to the server 300, a data transmission rate, and the like, it is possible to provide image information for an event that occurred during a predetermined period.

If the region 2103 is selected in a situation in which the operation mode of the black box 100 is a normal recording mode, the black box 100 may play the corresponding image after the end of the normal recording mode. Alternatively, if the region 2103 is selected in a situation in which the operation mode of the black box 100 is a parking recording mode, the remote playback in the black box 100 may not be possible.

Figure 22D:
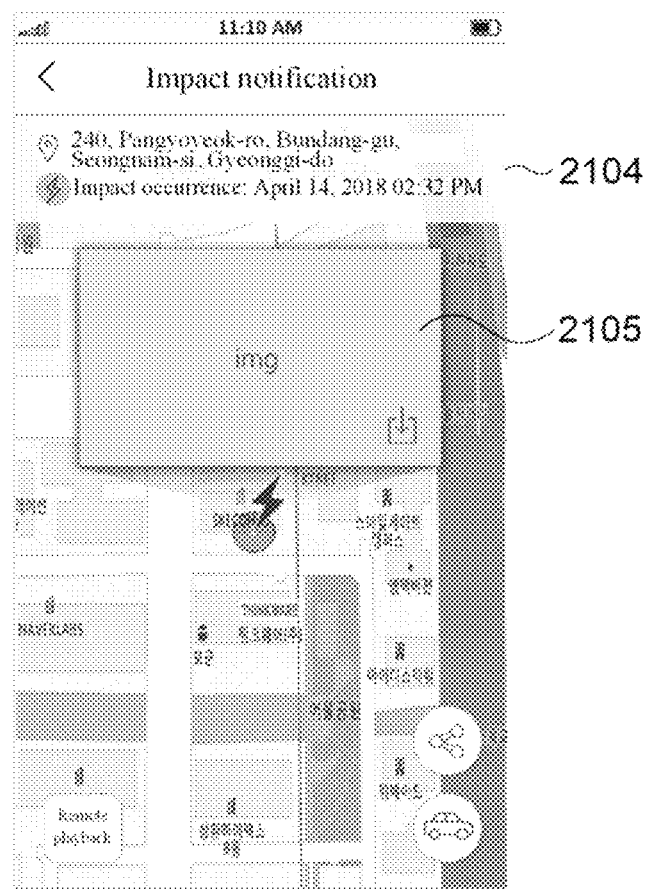

Meanwhile, when one event is selected by the user in the event history list 2101, the user terminal device 400 may display a user interface 2104 as illustrated in FIG. 22D.

If the event is the impact event, the user interface 2104 may display impact occurrence location and impact occurrence time information in an upper region. Alternatively, if the event is the movement event during parking, the user interface 2104 may display movement detection location and movement detection time information in the upper region.

In addition, the user interface 2104 may display an image 2105 captured at the event location. Here, the image 2105 may be a motion image generated by combining at least two images between a predetermined time before the event occurrence and a predetermined time after the event occurrence. At this time, in order to visually indicate that the event has occurred, the image 2105 may be displayed to vibrate left and right or up and down to move, or may be displayed using a vibration animation method. The image 2105 may be displayed using various visual design elements such as a rectangle, square, circle, water drop, bubble, and the like.

In addition, an image download button may be provided in one region of the image 2105. If the user selects the image download button, the corresponding image may be stored in the user terminal device 400.

In addition, the user interface 2104 may display an event occurrence location on a map, and the map may receive a touch interaction such as tap/drag/zoom in/zoom out/rotation.

FIGS. 23A to 23C are diagrams illustrating a user interface when inputting a live command according to an exemplary embodiment of the present invention. As illustrated in FIG. 23A, a main user interface may include a region 2201 corresponding to a live button. Here, the live button may be a button that requests an image captured in real time from the black box 100 of a vehicle being parked.

If the user selects the region 2201 corresponding to the live button in the main user interface, a user interface 2202 as illustrated in FIG. 23B may be displayed.

Here, the user interface 2202 may include a region 2203 displaying parking information at the top, and in the region 2203, the last parking location and a live command request time point may be displayed.

In addition, the user interface 2202 may display a pop-up window 2204 related to providing the live image. Here, the pop-up window 2204 related to providing the live image may be located on the top of the current vehicle location displayed on the map.

Since the amount of data is limited due to the characteristics of low-power wide-area wireless communication, the number of times the live image may be used may be predetermined, and the pop-up window 2204 may display information on the number of times of possible live images. As an example, the pop-up window 2204 may display information on the number of uses of live images that the user may use when the number of times of live images that the user may still use remains, and may provide a phrase such as "the number of uses of the month has been exceeded" when the number of uses of the live images has been exceeded.

Meanwhile, when the pop-up window 2204 is selected, the user terminal device 400 may display a live image 2205 as illustrated in FIG. 23C. Here, the live image 2205 is an image captured in real time in the black box 100 operating in the parking recording mode, and may be a motion image generated by combining at least two images after a request time point through the live image button 2201 or a video acquired in real time from the black box 100 upon request. If the user selects a download button 2206 disposed in one region of the live image 2205, the corresponding image may be stored in the user terminal device 400.

Meanwhile, the user interface 2202 may include a share button 2206 that operates in the same manner as the above-described share button and a vehicle location display button 2207 that operates in the same manner as the above-described vehicle location display button.

Meanwhile, the user interface 2202 may include a live image history region 2208 at the top. If the user selects the live image history region 2208, the user terminal device may display a live image history management user interface. This will be described in more detail with reference to FIGS. 24A to 24B.

Figure 24A:
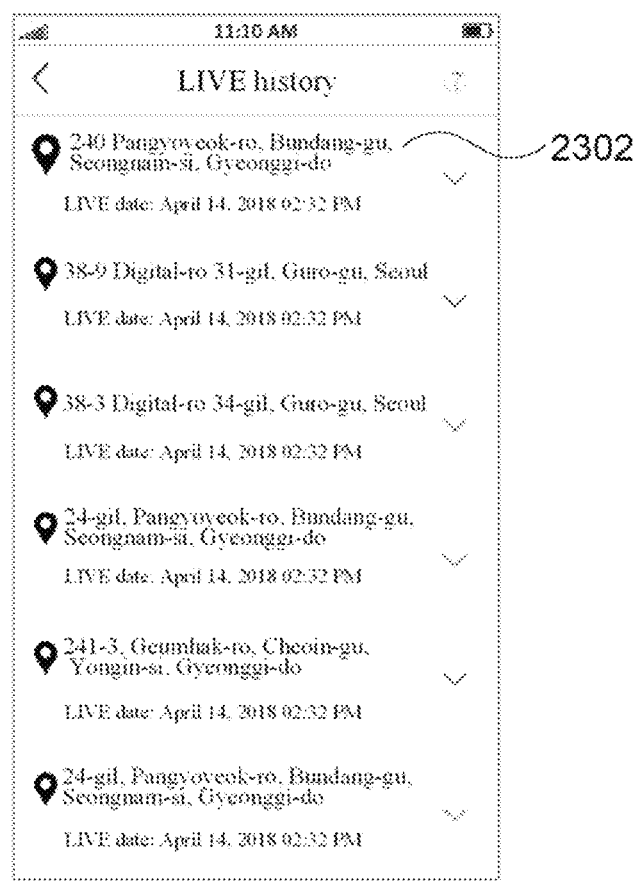
FIGS. 24A to 24B are user interface diagrams illustrating live history image management according to an exemplary embodiment of the present invention.
Figure 24B:

FIGS. 24A to 24B are user interface diagrams illustrating live history image management according to an exemplary embodiment of the present invention. If the user selects the region 2208 illustrated in FIG. 23B, the user terminal device may display a live image history management user interface as illustrated in FIG. 24A. Here, live requested location and time information may be displayed on a live image history list.

If the user selects one from the live image history list and then selects a more viewing object 2302 on the right, a user interface including a live image, a map, and a location corresponding to the selected list may be displayed at the bottom of the selected list as illustrated in FIG. 24B.

Figure 25A:
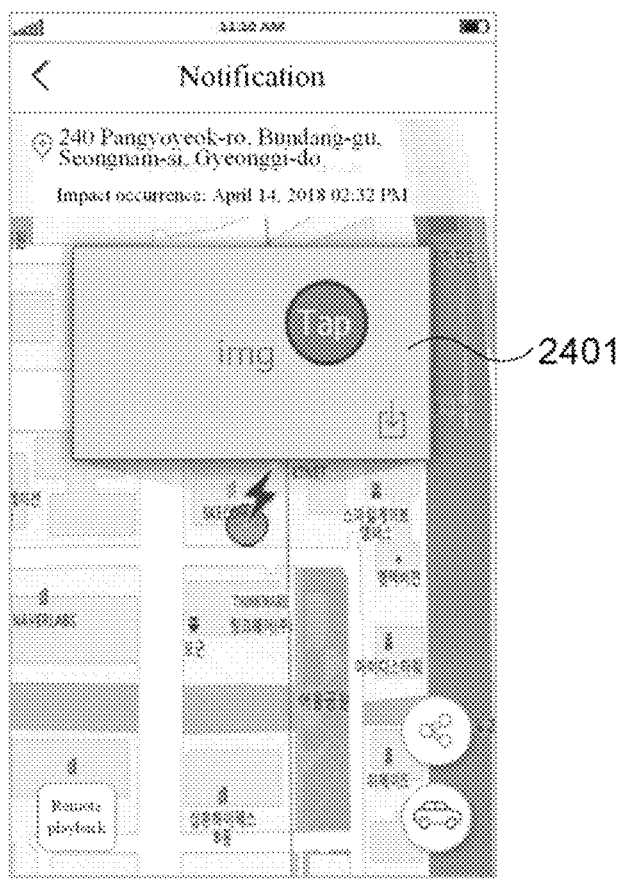
FIGS. 25A to 25F are user interface diagrams illustrating a method for switching an image display according to an exemplary embodiment of the present invention.

FIGS. 25A to 25F are user interface diagrams illustrating a method for switching an image display according to an exemplary embodiment of the present invention. As described above, if the last parking location request, the live image request, the event confirmation request, or the like is input from the user, the user terminal device 400 may display a user interface including a map indicating the location of the vehicle and an image captured in the black box 100, as illustrated in FIG. 25A.

Figure 25B:
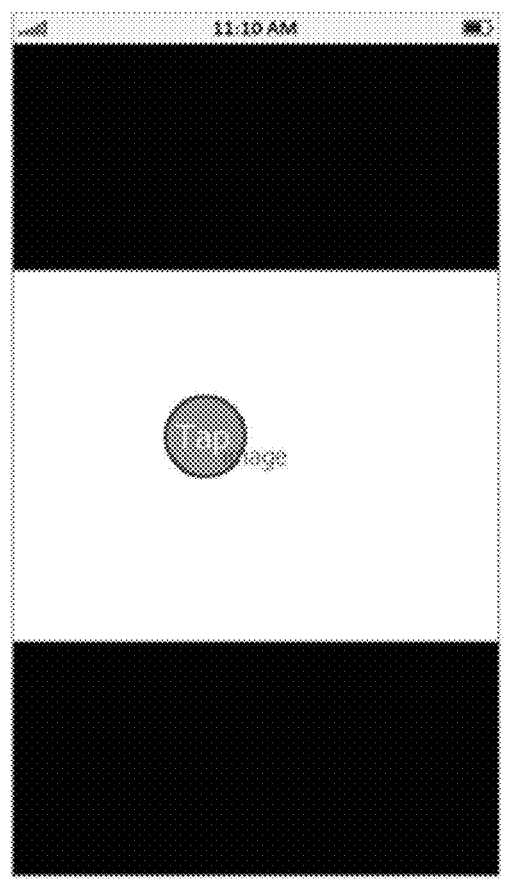
Figure 25C:
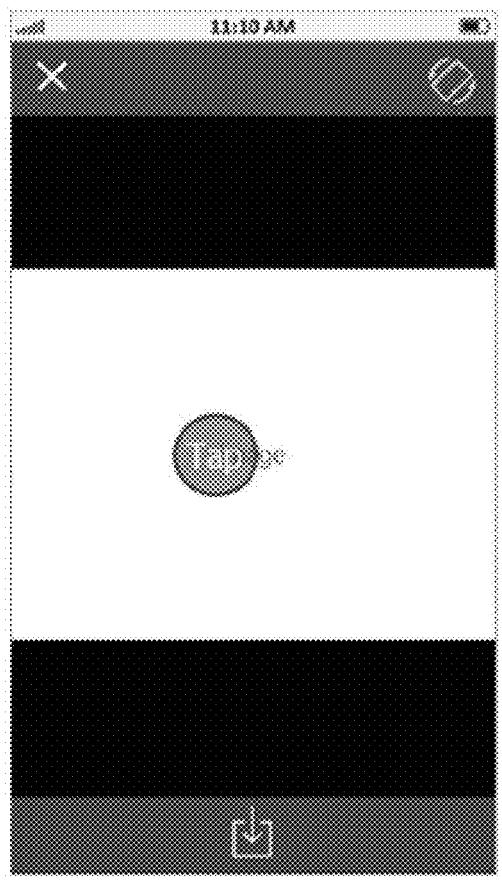

If the user touches the image 2401, the user terminal device 400 may display an image viewing screen illustrated in FIG. 25B. In addition, when the user touches the image viewing screen illustrated in FIG. 25B, the user terminal device 400 may display a screen capable of receiving various user inputs, such as screen closing, screen switching, and image download, as illustrated in FIG. 25C.

Figure 25D:
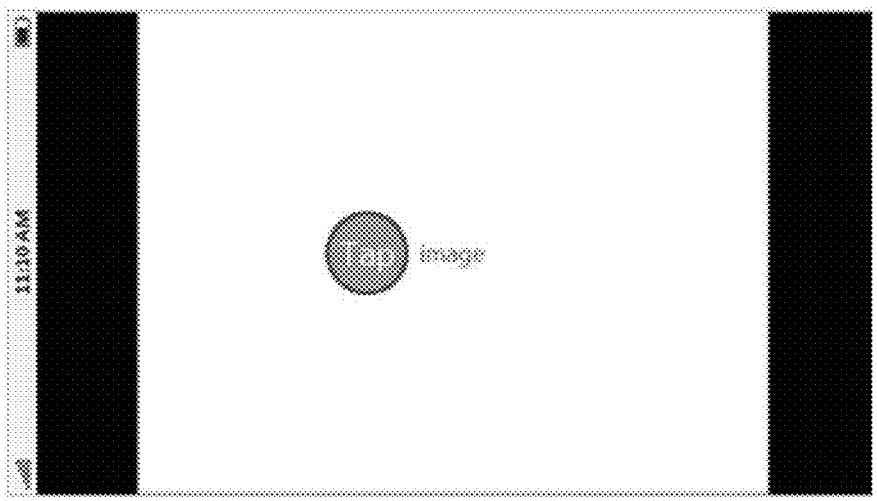
Figure 25E:
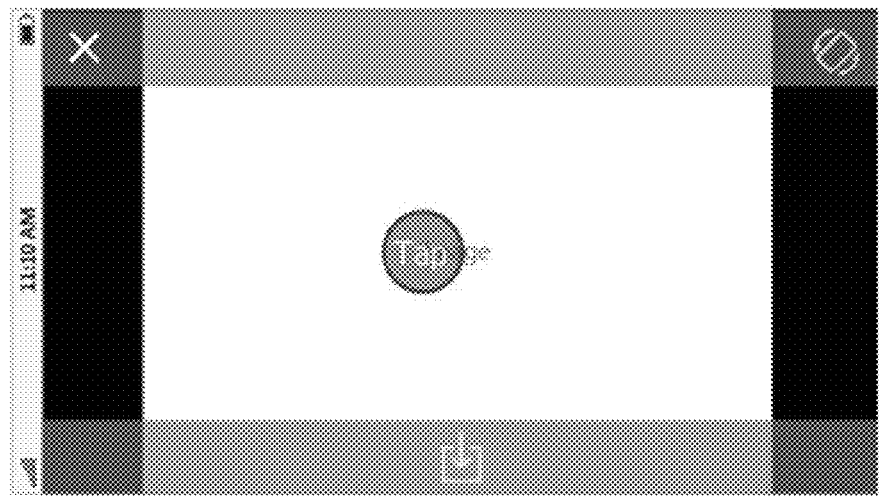

In addition, when the user rotates the terminal device 400 from a vertical direction to a horizontal direction in a state in which the image viewing screen illustrated in FIG. 25B is displayed, the user terminal device 400 may rotate and enlarge the image viewing screen as illustrated in FIG. 25D to display the image viewing screen. Alternatively, when the user selects a screen switch icon disposed in the upper right in a state in which the image viewing screen illustrated in FIG. 25C is displayed, the user terminal device 400 may rotate and enlarge the image viewing screen as illustrated in FIG. 25E to display the image viewing screen.

Figure 25F:
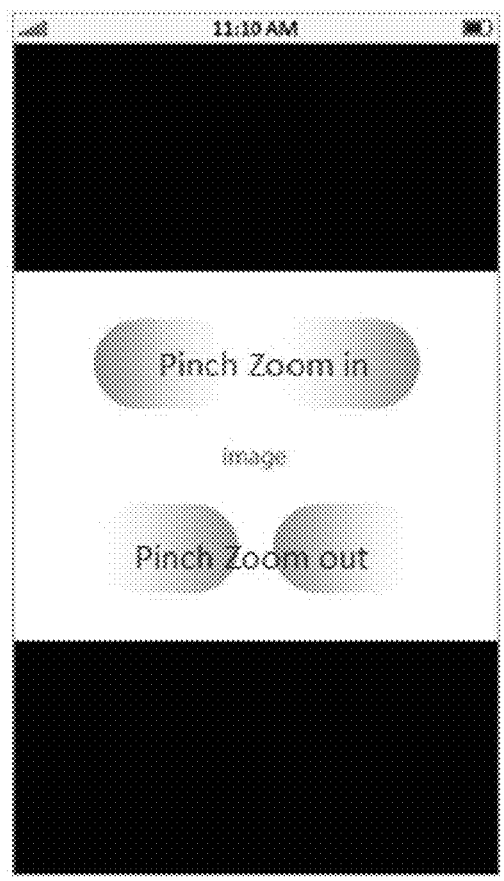

Meanwhile, each image displayed on the image viewing screen may receive various user operations. As an example, as illustrated in FIG. 25F, the image may be enlarged or reduced according to a pinch zoom in/out operation of the user. That is, if the user inputs the pinch zoom in operation that selects two points of the image and collects the two points inward, the image may be reduced, and if the user inputs the pinch zoom out operation that selects the two points of the image and spreads the two points outward, the image may be enlarged.

Figure 26A:
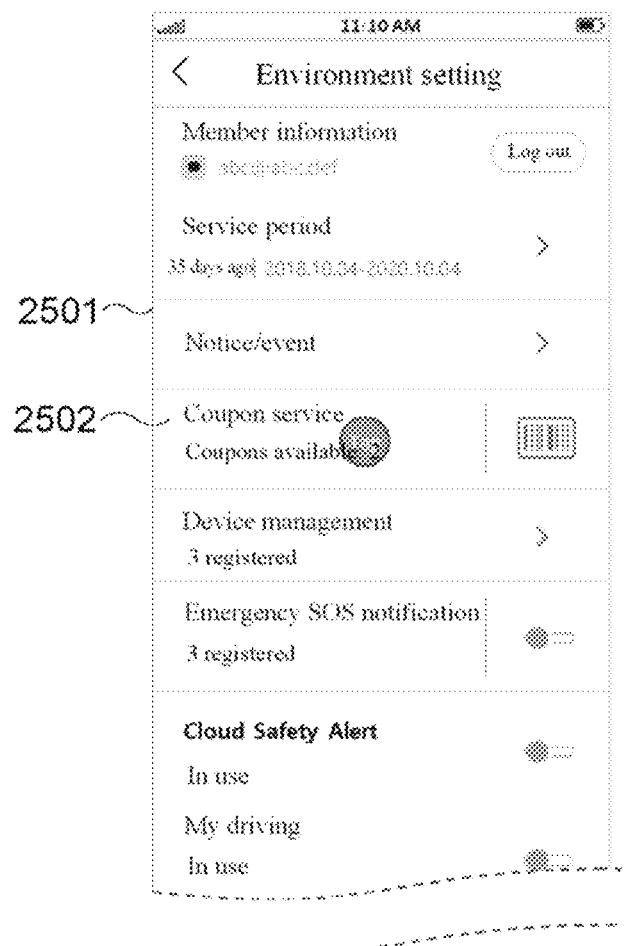
FIGS. 26A to 26B are diagrams illustrating an environment setting user interface according to an exemplary embodiment of the present invention.
Figure 26B:
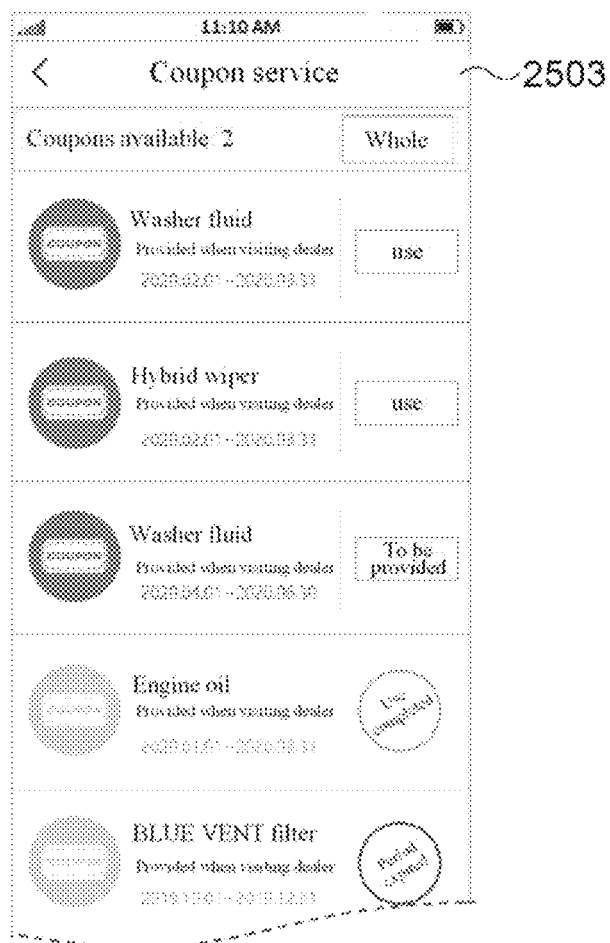

FIGS. 26A to 26B are diagrams illustrating an environment setting user interface according to an exemplary embodiment of the present invention. Referring to FIG. 26A, an environment setting user interface 2501 may include a member information region, a service period region, a notice/event region, a coupon service region, a device management region, an emergency SOS notification region, a cloud safety alert region, and a my driving region.

Here, the coupon service region may display information on the number of coupons available to the user. In addition, when a coupon service confirmation region 2502 of the environment setting user interface 2501 is selected, the user terminal device 400 may display a coupon list 2503 as illustrated in FIG. 26B.

Here, the coupon list 2503 may display coupons assigned to the user, the coupon list 2503 may be configured with a plurality of coupon items, and each coupon item may display a coupon icon, a coupon name (e.g., washer fluid, wiper, etc.), a coupon provision condition (e.g., provided when visiting a dealer, etc.), a coupon usage period, and a coupon status. Here, the coupon status may include "Use" indicating that the coupon is currently available, "To be provided" indicating that the coupon is to be provided, "Use completed" indicating that the coupon has been used, and "Period expired" indicating that the coupon has expired.

In addition, the arrangement order of the coupon items may be displayed from top to bottom in the order of available, to be available, to be provided, use completed, and period expired.

In addition, whether to activate information displayed on the coupon item may be adjusted according to the status of the coupon. As an example, the currently available coupons may be displayed by activating all text and all icons.

In addition, coupons to be provided may be displayed by activating all text and all icons, but deactivating only a "to be provided button". In addition, coupons of which use has completed may be displayed by deactivating all text and icons except for the "use completed stamp icon". In addition, coupons of which use period has expired may be displayed by deactivating all text and icons except for a "period expired stamp icon".

According to the present invention, the user may perform payment using the coupon through a user terminal device 400 before visiting the dealer or in the vehicle.

Figure 27B:
Figure 27C:
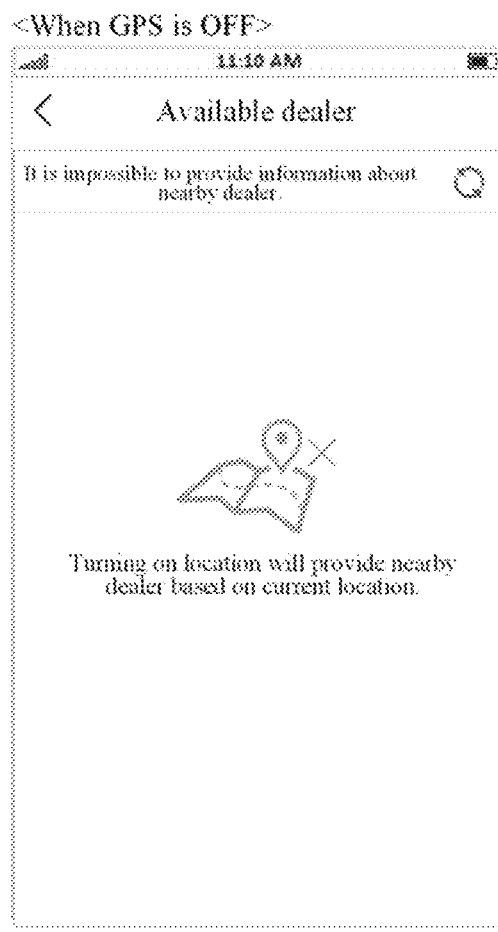

FIGS. 27A to 27C are diagrams illustrating a user interface illustrating a coupon usage process according to an exemplary embodiment of the present invention. When the user selects the use of a specific coupon from a coupon list 2601 illustrated in FIG. 27A, the user terminal device 400 may display a coupon available dealer list 2602 as illustrated in FIG. 27B.

Here, the number of dealers exposed in the coupon available dealer list 2602 may be displayed up to 10 in a close order within a predetermined radius (e.g., around 50 km) based on the user's current location.

If there is no available dealer within the predetermined radius based on the user's current location, the user terminal device 400 may display at least one of the nearest dealers out of the predetermined radius.

In addition, in each dealer item of the coupon available dealer list 2602, a dealer name, an address, a phone number, a route guidance button, and distance information based on the current location may be displayed. If the user selects the phone number, a call application may be called in a state in which the corresponding number is pre-inputted.

In addition, if the user selects the route guidance button, the user terminal device 400 may display a route guidance screen guiding a route from the current location to the dealer. This will be described in more detail with reference to FIGS. 28A to 28C.

Figure 28A:
FIGS. 28A to 28C are diagrams illustrating a user interface for guiding a route to a coupon available dealer according to an exemplary embodiment of the present invention.
Figure 28B:
Figure 28C:
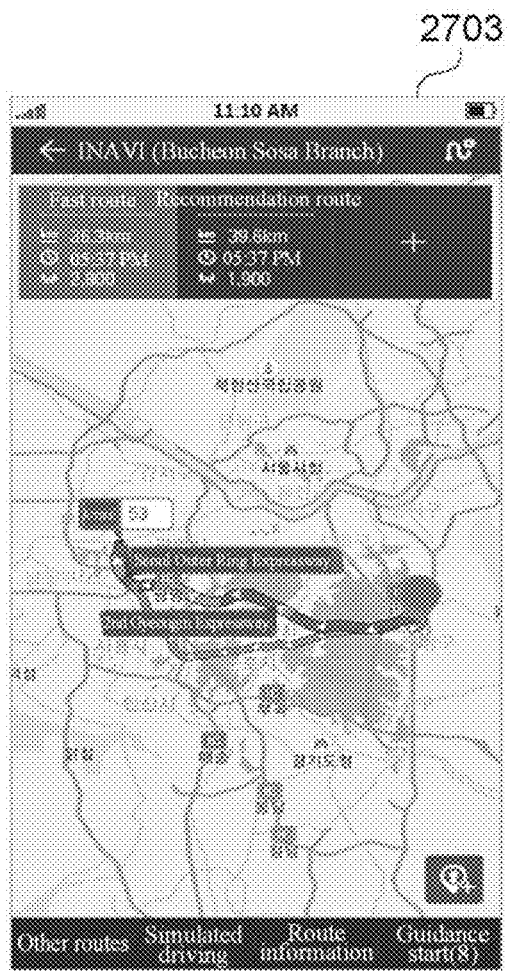

FIGS. 28A to 28C are diagrams illustrating a user interface for guiding a route to a coupon available dealer according to an exemplary embodiment of the present invention. Referring to FIG. 28A, if the user selects a route guidance button from a coupon available dealer list 2701, the user terminal device 400 may display a user interface 2702 indicating a location of a dealer on a map as illustrated in FIG. 28B.

If the user selects "Find directions" in the user interface 2702, the user terminal device 400 may display a user interface 2703 as illustrated in FIG. 28C. Here, the user interface 2703 may be a search route guidance user interface that displays a plurality of routes (e.g., a recommendation route and a fast route) from a user's current location to a selected dealer. If the user selects one of the plurality of routes in the user interface 2703, the user terminal device 400 may display a route guide screen guiding to the selected route.

Figure 29A:
FIGS. 29A to 29B are user interface diagrams illustrating an emergency SOS notification setting process according to an exemplary embodiment of the present invention.
Figure 29B:
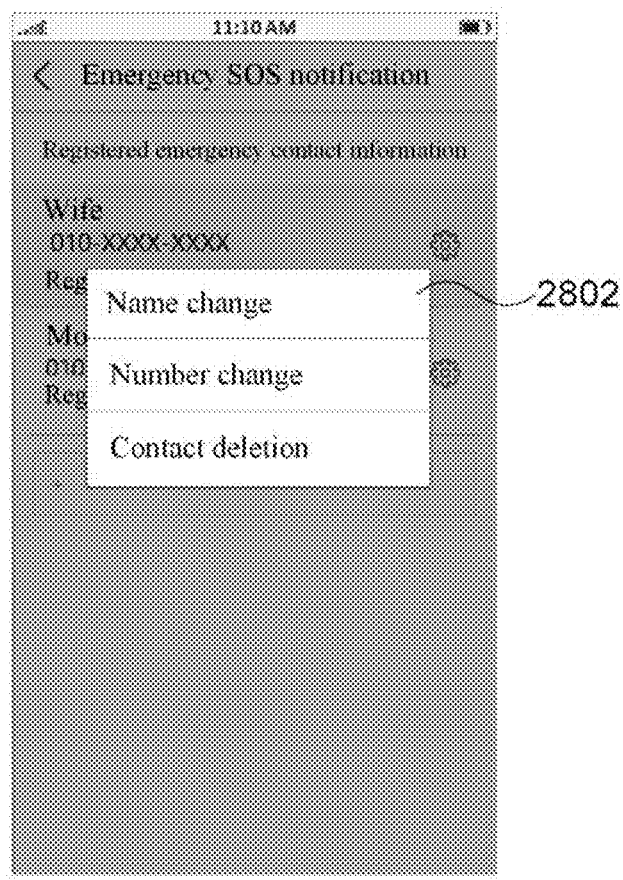

FIGS. 29A to 29B are user interface diagrams illustrating an emergency SOS notification setting process according to an exemplary embodiment of the present invention. If the user selects an "emergency SOS notification region" in an environment setting user interface illustrated in FIGS. 29A to 29B, the user terminal device 400 may display an emergency contact management user interface 2801 illustrated in FIG. 29A. Here, the emergency contact management user interface 2801 may display pre-registered emergency contact information.

If the user selects a setting icon of the user interface 2801, the user terminal device 400 may display a list pop-up window 2802 illustrated in FIG. 29B. In addition, the user may input a command such as a name change, a number change, or a contact deletion through the list pop-up window 2802.

Figure 30A:
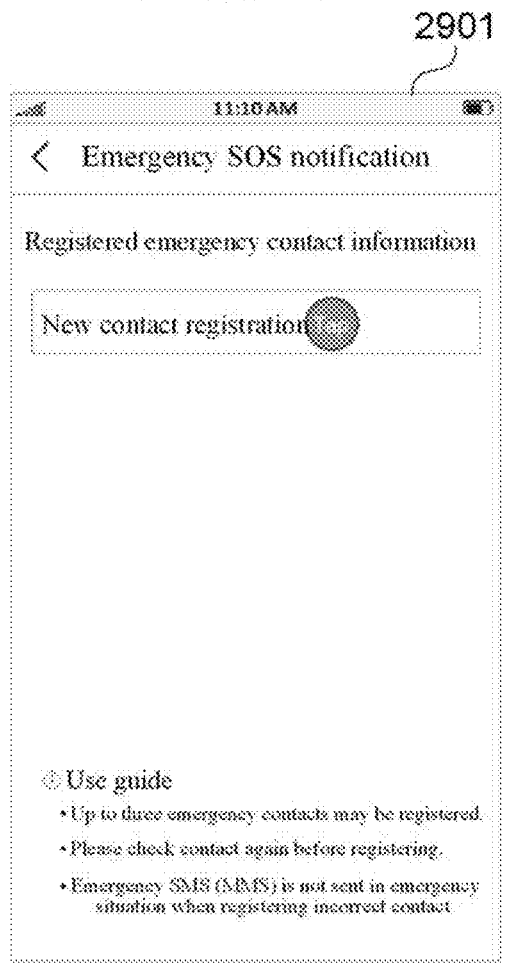
FIGS. 30A to 30C are user interface diagrams illustrating an emergency SOS contact registration process according to an exemplary embodiment of the present invention.
Figure 30B:
Figure 30C:
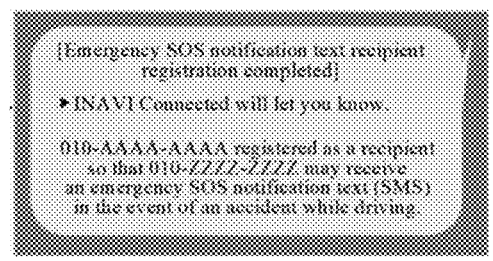

FIGS. 30A to 30C are user interface diagrams illustrating an emergency SOS contact registration process according to an exemplary embodiment of the present invention. Referring to FIGS. 30A to 30C are user interface diagrams, if there is no pre-registered emergency contact information, the user terminal device 400 may display a user interface 2901 as illustrated in FIG. 30A. If the user selects a "new contact registration" region of a user interface 2901, the user terminal device 400 may display a user interface 2902 for SOS contact direct input as illustrated in FIG. 30B.

That is, the user interface 2902 for SOS contact direct input may include an emergency contact name and phone number input region, and when the user selects "register", the corresponding contact may be registered as an SOS contact.

In this case, the user terminal device 400 may generate a message to be transmitted to the emergency SOS contact for confirmation of a newly registered emergency SOS contact, and may transmit the generated message to a terminal device corresponding to the registered emergency SOS contact. In this case, the terminal device corresponding to the emergency SOS contact may receive and display a text message as illustrated in FIG. 30C.

Meanwhile, according to the emergency SOS contact registration process of FIGS. 30A to 30C are user interface diagrams described above, it has been described as an example that the user directly inputs the contact name of the user and the contact thereof, but is not limited thereto. According to another exemplary embodiment of the present invention, the "connected service application" may display a list of pre-registered contacts by interworking with a pre-installed contact application on the user terminal device 400, and the user may register the emergency SOS contact by selecting at least one contact to be registered as the emergency SOS contact from the pre-registered contact list.

Figure 31A:
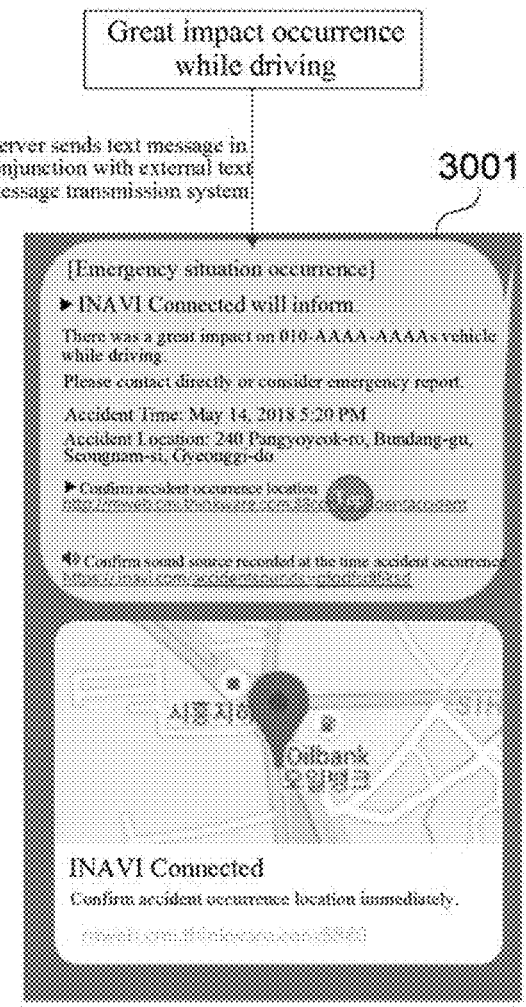
FIGS. 31A to 31B are user interface diagrams illustrating a processing scenario when an emergency situation occurs according to an exemplary embodiment of the present invention.
Figure 31B:
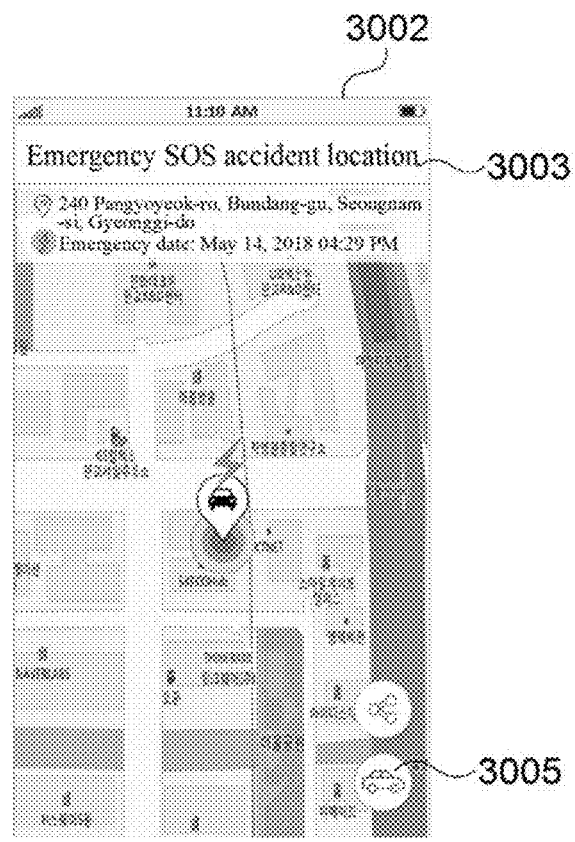

FIGS. 31A to 31B are user interface diagrams illustrating a processing scenario when an emergency situation occurs according to an exemplary embodiment of the present invention. Here, the emergency situation according to the present invention means a more serious emergency situation than the occurrence of a general impact event or a movement event, and may mean, for example, an accident event occurrence situation corresponding to an impact occurrence greater than a predetermined impact value.

If the impact value greater than a predetermined impact value is detected in the black box 100, the black box 100 may transmit an emergency situation event to the server 300, and the server 300 may inform the user terminal device 400 that it is the emergency situation. In this case, the user terminal device 400 may detect a pre-registered emergency SOS contact and create an emergency notification message to be transmitted to the emergency SOS contact. In addition, the user terminal device 400 may transmit the created emergency situation notification message to a pre-registered emergency SOS contact.

FIG. 31A is an example of an emergency notification message transmitted to an emergency SOS contact. Referring to FIG. 31A, an emergency situation notification message 3001 may include an emergency comment, a driver's phone number, an accident time and location, a URL capable of confirming an accident occurrence location, a sound source URL recorded in an accident process, and a link address for confirming an accident image.

In addition, the emergency situation notification message 3001 may further include a preview of the accident occurrence location, and when selecting a preview, it is possible to enter a map screen that displays the preview in detail.

If the recipient of the emergency situation notification message selects a URL that may confirm the accident occurrence location included in the message, the terminal device may display a user interface 3002 indicating an accident location as illustrated in FIG. 31B. Here, the user interface 3002 may include a region 3003 that displays vehicle location of a time point at which the impact occurs and time information that the impact occurs. In addition, the user interface 3002 may include a map region that displays the location of the vehicle where the impact has occurred on the map. In addition, the user interface 3002 may include a vehicle location display button 3005.

On the other hand, if the recipient of the emergency situation notification message selects the recorded sound source URL included in the message, the terminal device may playback the sound source recorded in the accident process.

In addition, if the recipient of the emergency situation notification message selects the URL for confirming the emergency situation image included in the message, the terminal device may access a URL address through a communication network and playback the image obtained in the emergency situation.

Figure 32:
FIG. 32 is a diagram illustrating an example of a push notification according to an exemplary embodiment of the present invention.

FIG. 32 is a diagram illustrating an example of a push notification according to an exemplary embodiment of the present invention. According to an exemplary embodiment of the present invention, the user terminal device 400 may receive notifications of various events from the server 300, and may display the received notification information on the screen in the form of a push message.

As an example, referring to FIG. 32, the push notification may include various notifications such as a "notification of impact occurrence while driving", a "notification of impact image upload completion", a "notification of vehicle movement detection", a "notification of recommendation of popular places around a destination", a "notification of weather/atmosphere information", a "notification of battery low-voltage", a "notification of switching to driving state", a "notification of parking impact occurrence", and a "notification of black box power on/off.

Here, the "notification of impact occurrence while driving" means a notification that is displayed when an impact occurs to a vehicle while driving. If the user selects the "notification of impact occurrence while driving", the user terminal device 400 may execute the connected service application and display the impact notification history screen illustrated in FIG. 22C.

In addition, the "notification of impact image upload completion" means a notification that is displayed when the impact image upload is completed.

In addition, the "notification of vehicle movement detection" means a notification that is displayed when the vehicle movement detection occurs while parking. If the user selects the "notification of vehicle movement detection", the user terminal device 400 may execute the connected service application and display the impact notification history screen illustrated in FIG. 22C.

In addition, the "notification of popular places around a destination" means a notification that is displayed when the vehicle arrives at the destination. If the user selects the "notification of popular places around a destination", the user terminal device 400 may execute the connected service application and display the popular places around the user's destination. In this case, the popular places may be popular places selected based on preference information pre-registered for the user.

In addition, the "notification of parking impact occurrence" means a notification that is displayed when a parking impact occurs. If the user selects the "notification of parking impact occurrence", the user terminal device 400 may execute the connected service application and display the impact notification history screen illustrated in FIG. 22C.

In addition, the "notification of weather/atmosphere information" may mean a notification that guides a surrounding weather and/or atmosphere status. Here, the "notification of weather/atmosphere information" may be displayed as a phrase that guides the surrounding weather and/or atmosphere status.

Specifically, the "notification of weather/atmosphere information" may be displayed when it is detected that a surrounding fine dust concentration is not good. As an example, when the surroundings of the vehicle have a fine dust concentration corresponding to "bad" or higher, the notification may be displayed in the form of a phrase such as "The fine dust concentration is bad. Close the window tightly and switch an air conditioner to indoor circulation".

In addition, the "notification of weather/atmosphere information" may be displayed when it is detected that a surrounding yellow dust concentration is not good. As an example, when the surroundings of the vehicle have a yellow dust concentration corresponding to "bad" or higher, a corresponding notification may be displayed, and the notification may be displayed in the form of a phrase/sentence.

In addition, the "notification of weather/atmosphere information" may be displayed when the air has improved after a notification of a warning of fine dust/yellow dust in the area while driving. As an example, if the air has improved after the notification of the warning of fine dust in the area while driving, the notification may be provided in a text form, such as "The surrounding air has become pleasant. Please open the window to ventilate the indoor air". As another example, if the air in the area is good while driving the vehicle, the notification may be provided in a text form, such as "The surrounding air is pleasant. Please open the window to ventilate the indoor air."

In addition, the "notification of weather/atmosphere information" may generate and provide a notification based on current time information and driving/parking status information of the vehicle. As an example, if the black box is in the parking mode and there is news that it is raining before a user's work time (here, the work time may be a result value learned through learning about the user's work time), the notification may be provided in the form of a guide phrase such as "There is news that it is raining today, so be sure to bring a small umbrella and pay more attention to safe driving". In addition, if there is news that it is snowing, the notification may be provided in the form of a guide phrase such as "There is news that it is snowing today, so be sure to bring a small umbrella and pay more attention to safe driving". In addition, if there is news that it is raining and snowing, the notification may be provided in the form of a guide phrase such as "There is news that it is raining and snowing today, so be sure to bring a small umbrella and pay more attention to safe driving".

As another example, if the black box is switched from the driving mode to the parking mode after starting off on weekdays, and there is news that it is raining, the notification may be provided in the form of a guide phrase such as "There is news that it is raining, so we recommend indoor parking today". In addition, if there is news that it is snowing, the notification may be provided in the form of a guide phrase such as "There is news that it is snowing, so we recommend indoor parking today".

As another example, if the black box is in parking mode before a user's weekend start-on time (where the time may be a value learned according to a user's weekend behavior pattern) and there is no news that it is snowing or raining within 7 days from the day, the notification may be provided in the form of a guide phrase such as "There is no news that it will be raining for a while. This weekend is a good day to wash the car" or "There is no news that it will be snowing and raining for a while. This weekend is a good day to wash the car".

In addition, the "notification of vehicle battery low voltage" is to notify the vehicle battery low voltage, and if the user selects the "notification of vehicle battery low voltage", the user terminal device 400 may execute the connected service application and display the main user interface.

In addition, the "notification of black box power off" is to notify the black box power off, and if the user selects the "notification of black box power off", the user terminal device 400 may execute the connected service application and display the main user interface.

Here, the case in which the "notification of black box power off" is notified may include a case in which the black box 100 becomes a low voltage block setting value and is automatically turned off, a case in which the user arbitrarily turns off the black box, a case in which the black box is turned off by unplugging a power cord of the black box, and a case in which the power is turned off by a timer setting.

In addition, the "notification of black box power on" is to inform that the power of the black box is turned on, and if the user selects the "notification of black box power on", the user terminal device 400 may execute the connected service application and display the main user interface.

Additionally, although not illustrated in FIG. 32, the push notification according to an exemplary embodiment of the present invention may further include "notification of membership use completion".

The "notification of membership use completion" is to notify a coupon service usage history through a mobile barcode, and if the user selects the "notification of membership use completion", the user terminal device 400 may execute the connected service application and display a membership usage history screen.

FIGS. 33A to 33F are diagrams illustrating a user interface for a remote playback request in a normal recording mode state of a black box according to an exemplary embodiment of the present invention. The user may select a "remote playback button" in an event history list 3201 illustrated in FIG. 33A or in an event impact notification user interface 3202 illustrated in FIG. 33B. Here, the remote playback button 3202 may be a button that receives a user input requesting a black box to play an image corresponding to an event selected in the event history list 3201 or an event displayed on the user interface 3202.

Figure 33A:
FIGS. 33A to 33F are diagrams illustrating a user interface for a remote playback request in a normal recording mode state of a black box according to an exemplary embodiment of the present invention.
Figure 33B:
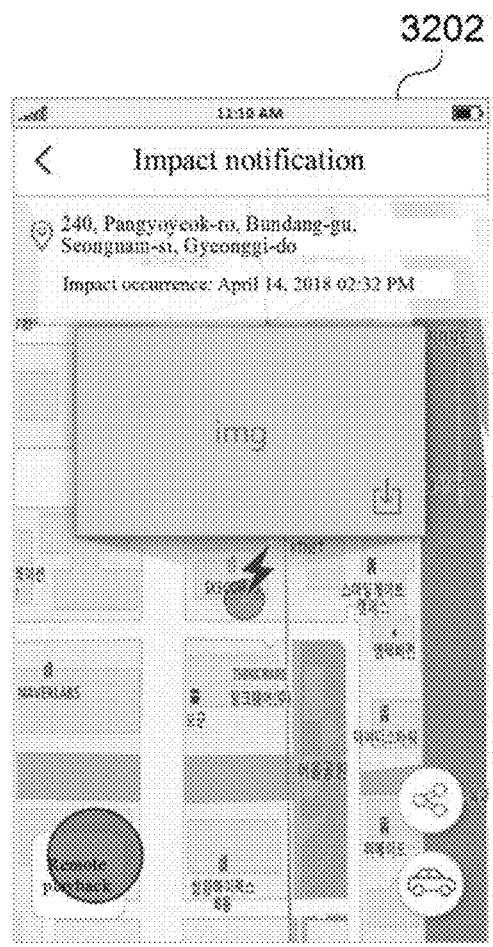
Figure 33C:
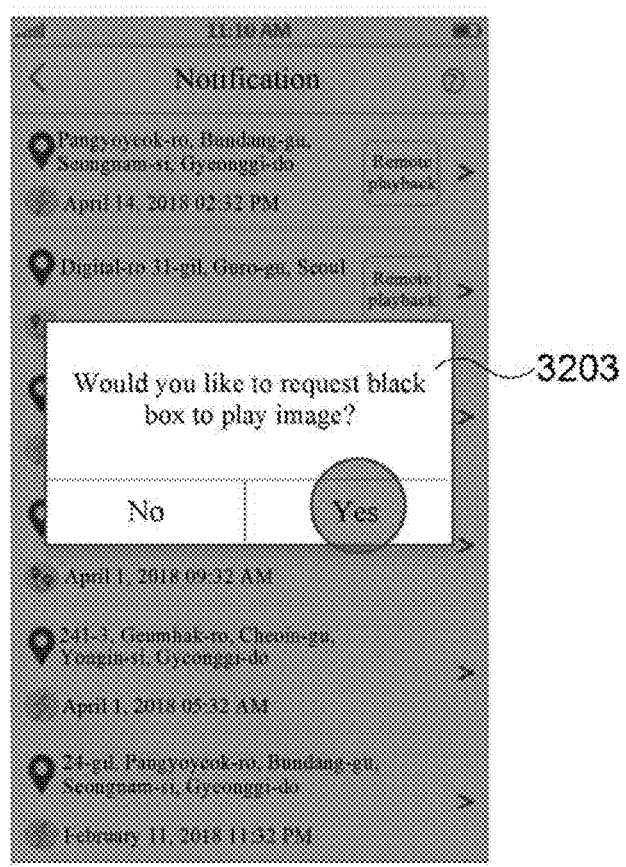
Figure 33D:
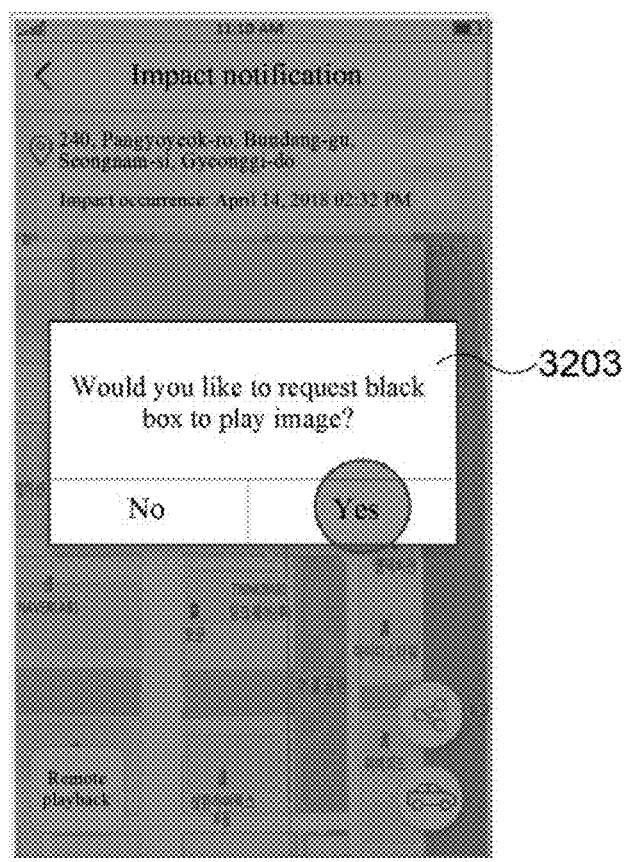

If the operation mode of the black box 100 is the normal recording mode state, the user terminal device 400 may display a pop-up window 3203 inquiring whether to request the black box 100 to play the corresponding image, as illustrated in FIG. 33C or FIG. 33D.

Figure 33E:
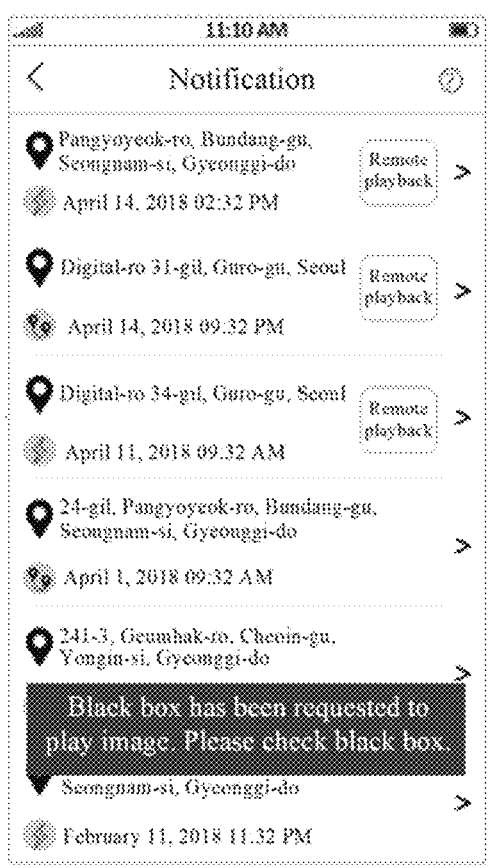
Figure 33F:
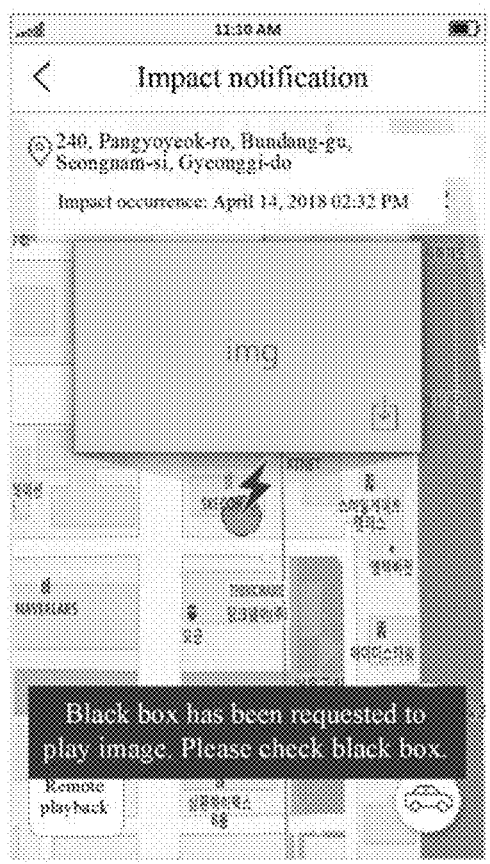

If the user selects "Yes" in the pop-up window 3203, the user terminal device 400 may display a message 3204 guiding that the playback of the corresponding image is requested to the black box as illustrated in FIG. 33E or FIG. 33F.

Figure 34:
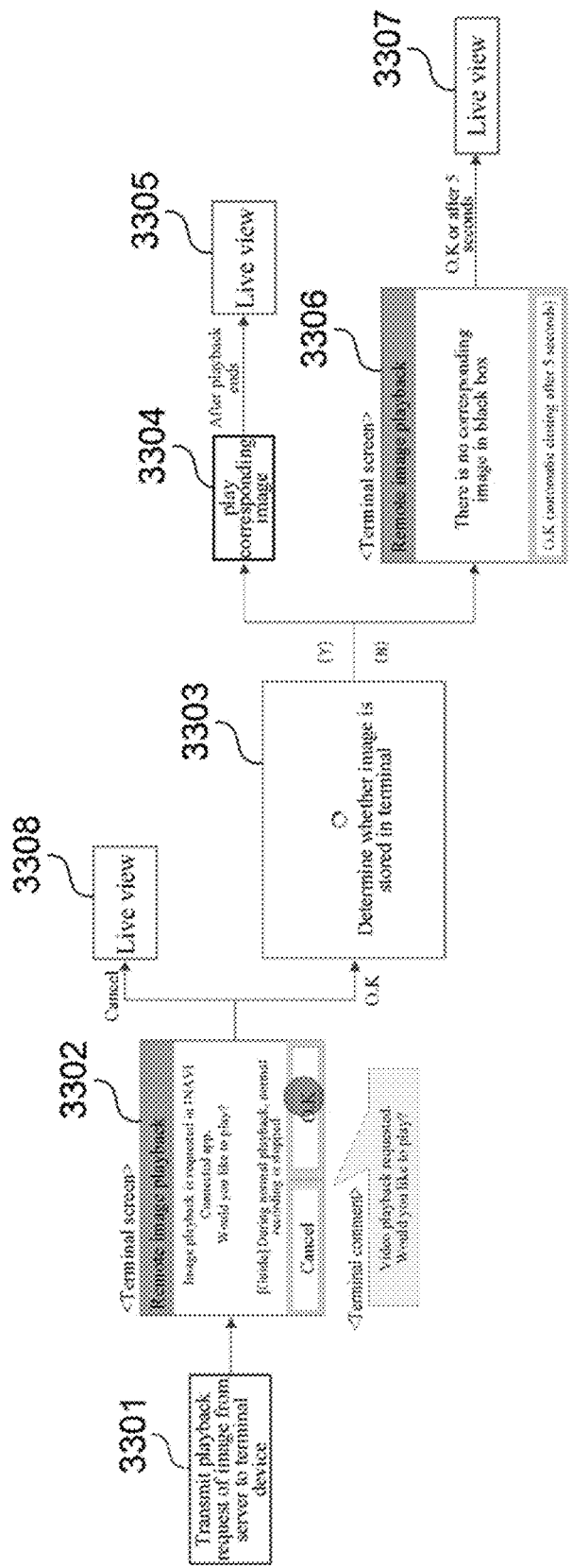
FIG. 34 is a diagram illustrating a remote playback scenario in the normal recording mode state of the black box according to an exemplary embodiment of the present invention.

FIG. 34 is a diagram illustrating a remote playback scenario in the normal recording mode state of the black box according to an exemplary embodiment of the present invention. Referring to FIG. 34, when the user requests the remote playback of the image through the user interface illustrated in FIGS. 33A to 33F, the server 300 may transmit the playback request of the corresponding image to the black box 100 (3301).

In this case, the black box 100 may display a pop-up window 3302 indicating that image playback is requested in the connected service application of the user terminal device 400, and simultaneously output a voice informing the image playback request.

If the user selects "Cancel" in the pop-up window 3302, the black box 100 may display a live view image corresponding to the image currently being captured through a camera.

However, when the user selects "OK" in the pop-up window 3302, the black box 100 may determine whether the image requested by the user terminal device 400 is stored in the black box 100 (3303), and may play the corresponding image (3304) if there is the corresponding image (3303: Y). In addition, after the playback of the corresponding image ends, the black box 100 may display a live view image (3305).

However, if there is no corresponding image (3303: N), a pop-up window 3306 indicating that there is no corresponding image may be displayed, and the user may select OK in the pop-up window 3306 or display the live view image after a preset time elapses (3307).

Figure 35:
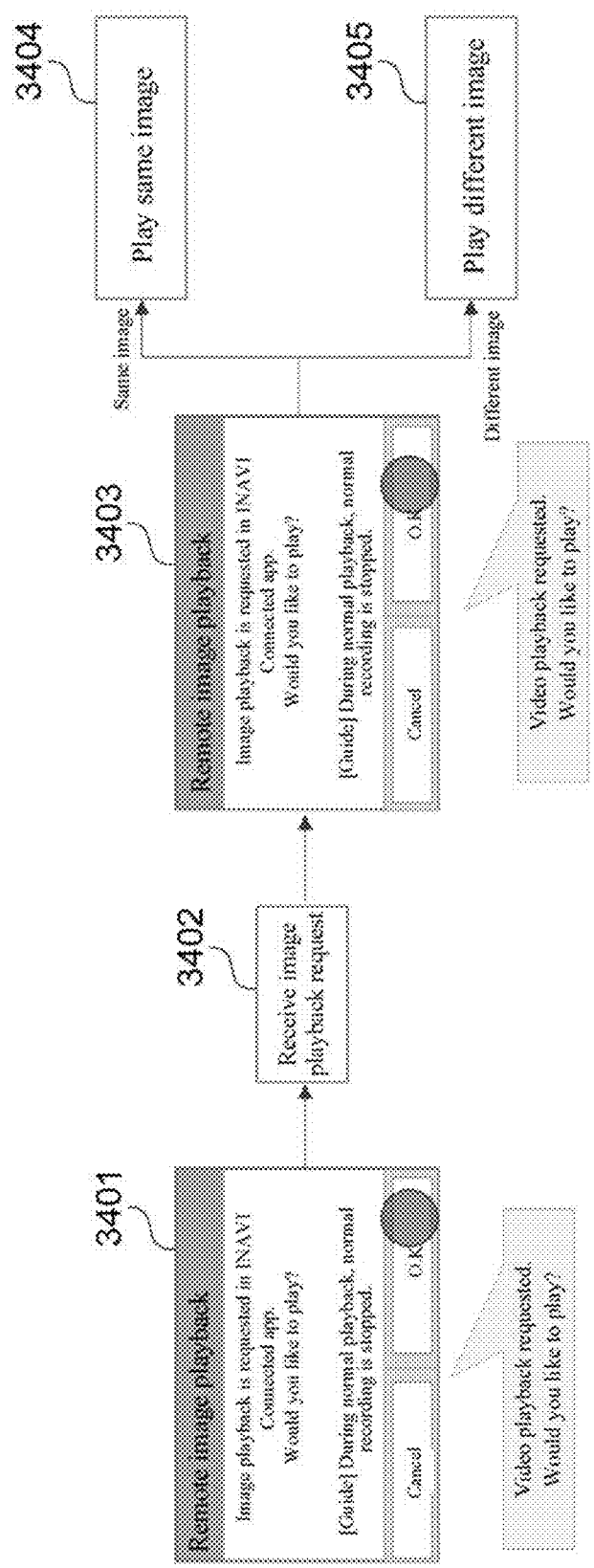
FIG. 35 is a diagram illustrating an operation scenario of a black box when an additional playback request is received during image playback according to an exemplary embodiment of the present invention.

FIG. 35 is a diagram illustrating an operation scenario of a black box when an additional playback request is received during image playback according to an exemplary embodiment of the present invention. Referring to FIG. 35, the black box 100 may display a pop-up window 3401 indicating that image playback is requested in the connected service application of the user terminal device 400, and simultaneously output a voice informing the image playback request. If the user selects "OK" in the pop-up window 3401, the black box 100 may determine whether the image requested by the user terminal device 400 is stored in the black box 100, and may play the corresponding image if there is the corresponding image.

On the other hand, if a playback request of another image is requested in the connected service application of the user terminal device 400 during the playback of the corresponding image (3402), the black box may display a pop-up window 3402 indicating that the playback of another image is requested in the connected service application of the user terminal device 400.

If the user selects "OK" in the pop-up window 3403, the black box 100 determines whether the image requested from the user terminal device 400 is the same image or a different image, and may play the same image (3404) when the image is the same image and may play the different image (3405) when the image is the different image.

FIGS. 36A to 36F are diagrams illustrating a user interface for a remote playback request in a parking mode state of the black box according to an exemplary embodiment of the present invention. The user may select a "remote playback button" in an event history list 3501 illustrated in FIG. 36A or in an event impact notification user interface 3502 illustrated in FIG. 36B. Here, the remote playback button 3502 may be a button that receives a user input requesting a black box to play an image corresponding to an event selected in the event history list 3501 or an event displayed on the user interface 3502.

Figure 36A:
FIGS. 36A to 36F are diagrams illustrating a user interface for a remote playback request in a parking mode state of the black box according to an exemplary embodiment of the present invention.
Figure 36B:
Figure 36C:
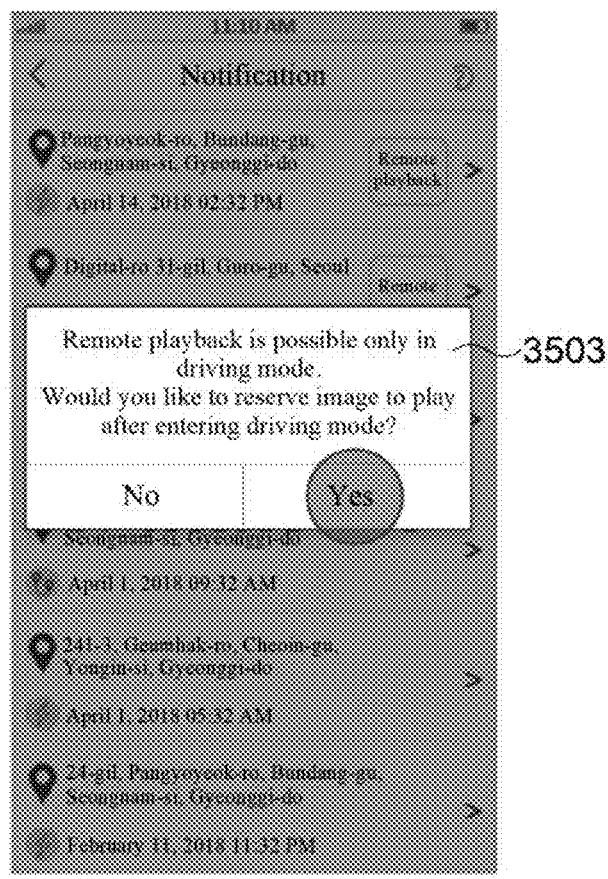
Figure 36D:
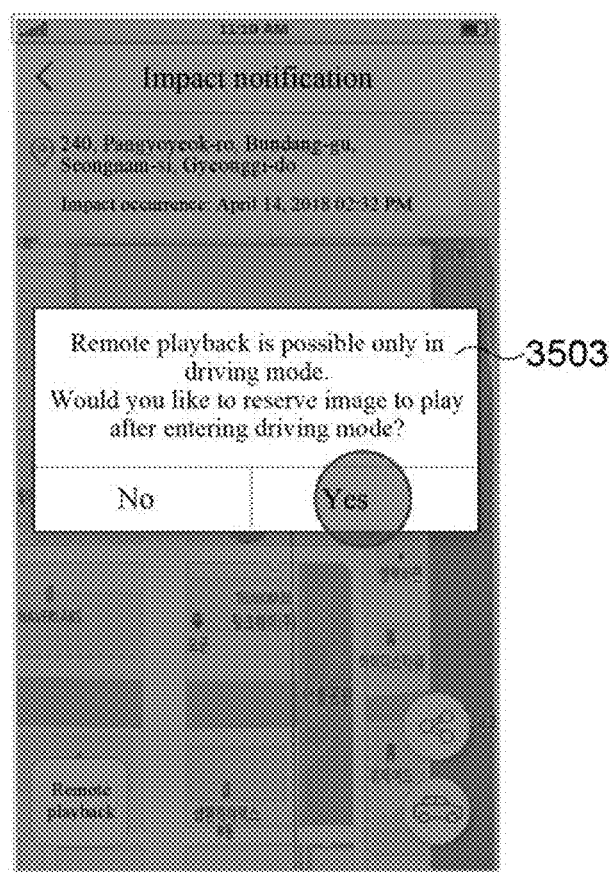

If the operation mode of the black box 100 is the normal recording mode state, the user terminal device 400 may display a pop-up window 3503 inquiring whether or not to reserve the image playback after the black box 100 is switched from the parking recording mode to the normal recording mode, as illustrated in FIG. 36C or FIG. 36D.

Figure 36E:
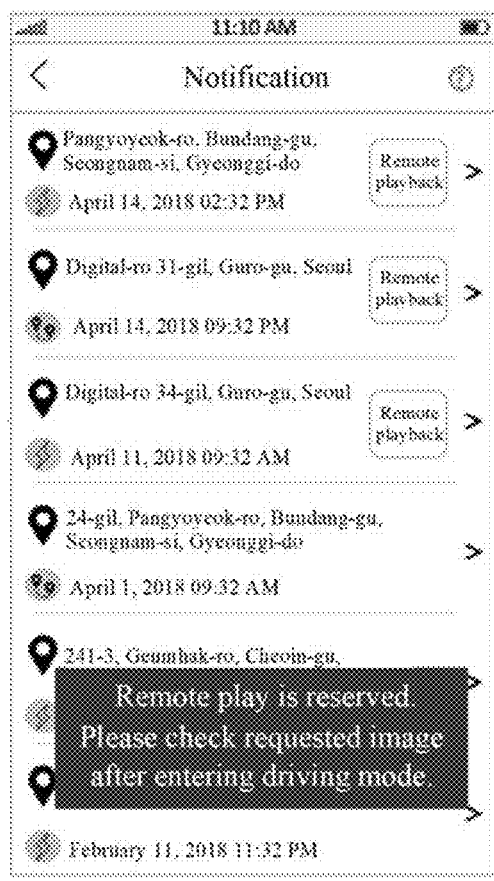
Figure 36F:
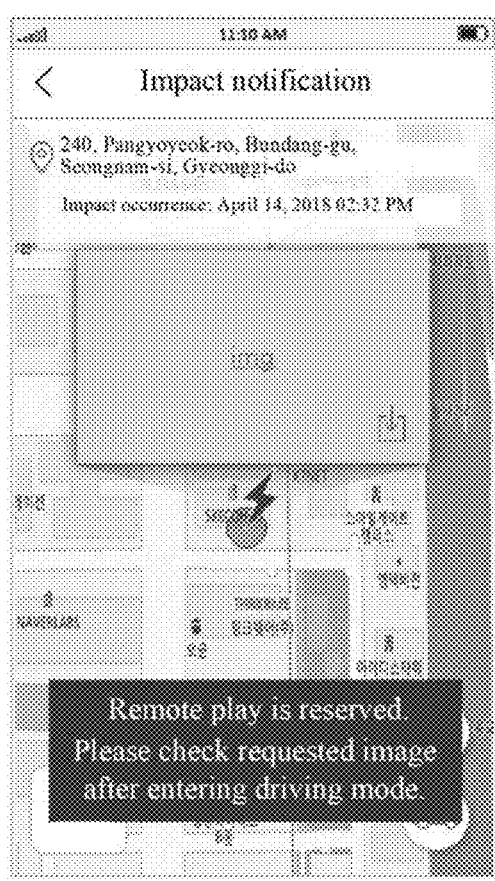

If the user selects "Yes" in the pop-up window 3503, the user terminal device 400 may display a message 3504 guiding that the playback of the corresponding image is reserved in the black box as illustrated in FIG. 36E or FIG. 36F.

Figure 37:
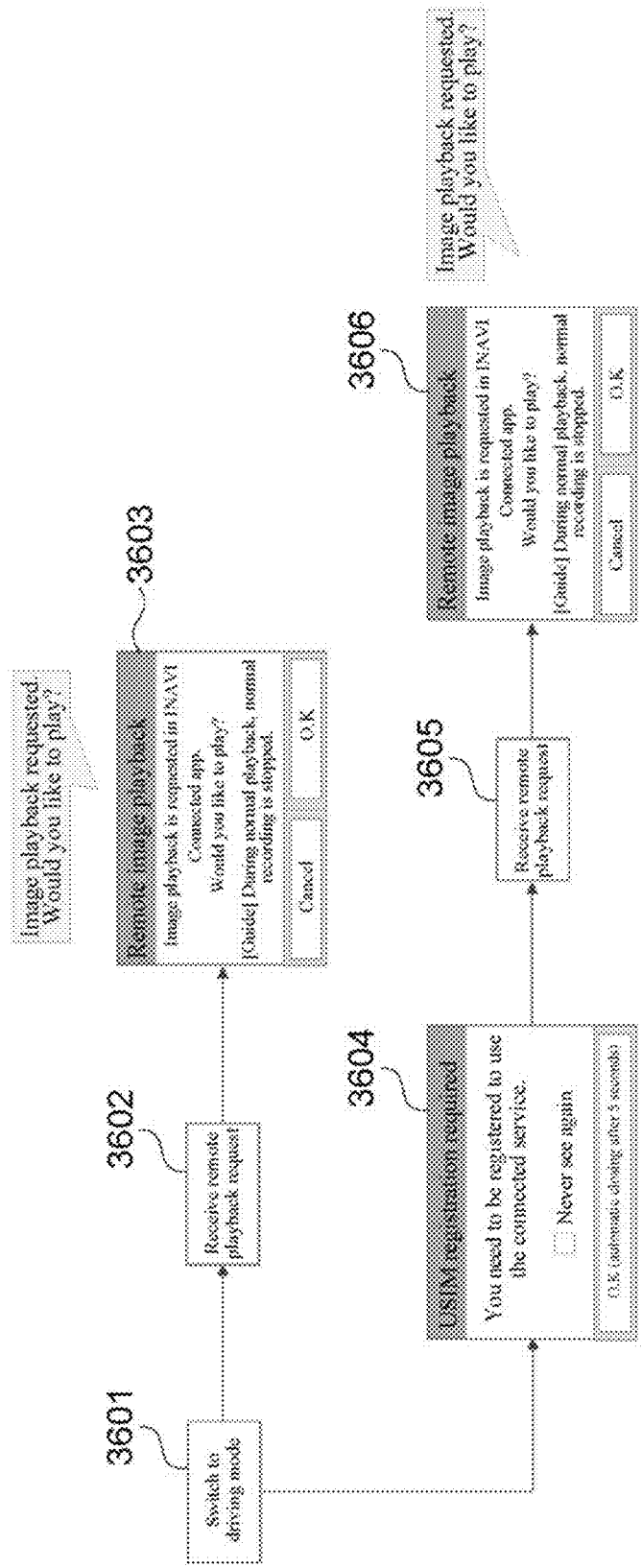
FIG. 37 is a diagram illustrating an operation scenario of the black box when the black box is switched from the parking mode state to the normal mode state according to an embodiment of the present invention.

FIG. 37 is a diagram illustrating an operation scenario of the black box when the black box is switched from the parking mode state to the normal mode state according to an embodiment of the present invention. Referring to FIG. 37, when the operation mode of the black box 100 is switched from the parking recording mode to the driving recording mode (3601), the black box 100 may receive a reserved remote playback request from the user terminal device 400 (3602). In this case, the black box 100 may display a pop-up window 3603 indicating that image playback is requested in the connected service application of the user terminal device 400, and simultaneously output a voice informing the image playback request. If the user selects "OK" in the pop-up window 3603, the black box 100 may determine whether the image requested by the user terminal device 400 is stored in the black box 100, and may play the corresponding image if there is the corresponding image.

However, when the reserved remote playback request is received after a USIM registration pop-up, the black box 100 may first display a USIM registration pop-up window 3604. Thereafter, the black box 100 may receive the reserved remote playback request from the user terminal device 400 (3605), and may display a pop-up window 3606 indicating that image playback is requested in the connected service application of the user terminal device 400, and simultaneously output a voice informing the image playback request.

That is, when the remote playback request reserved by the user terminal device 400 is received before the USIM registration pop-up, the playback request pop-up window may be displayed and the USIM registration pop-up window may not be displayed.

However, when the remote playback request reserved by the user terminal device 400 is received after the USIM registration pop-up, the playback request pop-up window may be displayed after the USIM registration pop-up window.

Figure 38A:
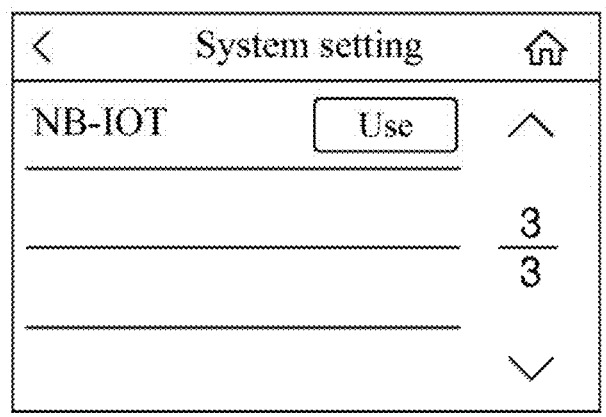
FIGS. 38A to 38B are block diagrams illustrating a server for providing a connected service according to an exemplary embodiment of the present invention.
Figure 38B:
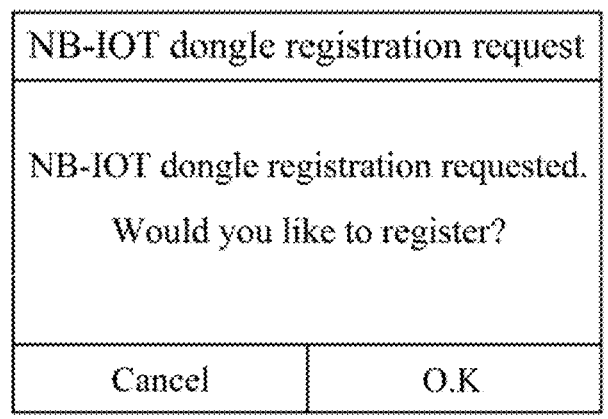

FIGS. 38A to 38B are diagrams illustrating a user interface for selecting a wireless communication network in a black box according to an exemplary embodiment of the present invention. The black box 100 according to an exemplary embodiment of the present invention may access the server 300 using various wireless communication connection methods. As an example, the wireless communication connection method may be various, such as Long Term Evolution (LTE), Wireless Fidelity (WiFi), and Low-Power Wide-Area (LPWA).

The black box 100 may display a user interface capable of allowing the user to select the wireless communication connection method according to the type of a wireless communication module provided. If the user selects one wireless communication connection method through the user interface, the black box 100 may transmit various data to the server 300 using the selected wireless communication connection method. As an example, when the black box 100 includes only an NB-IOT communication module, the black box 100 may display a user interface as illustrated in FIG. 38A.

If the user selects the NB-IOT in the user interface as illustrated in FIG. 38A, the black box 100 may display a dongle registration user interface as illustrated in FIG. 38B, and if the user selects "OK" in the dongle registration user interface, a procedure for registering an NB-IOT dongle to the server 300 may proceed. Here, the procedure for registering the NB-IOT dongle to the server 300 may be as described above in FIG. 5.

According to such a procedure, the server 300 registration process of the communication module for wireless communication of the black box 100 may be performed, and when an authentication of the communication module of the black box 100 is successful in the server 300 and registration is completed, the black box 100 may be connected to the server 300 by wireless communication.

Figure 39A:
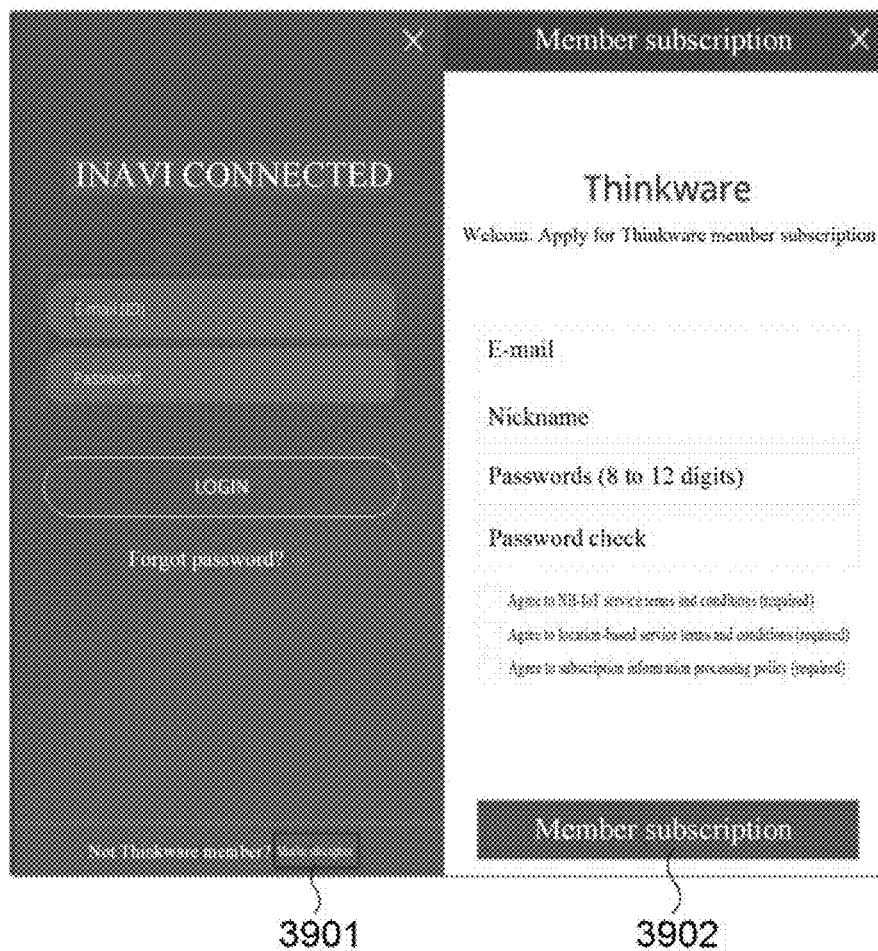
FIGS. 39A to 39C are diagrams illustrating a user interface for selecting a wireless communication network in a black box according to an exemplary embodiment of the present invention.
Figure 39B:
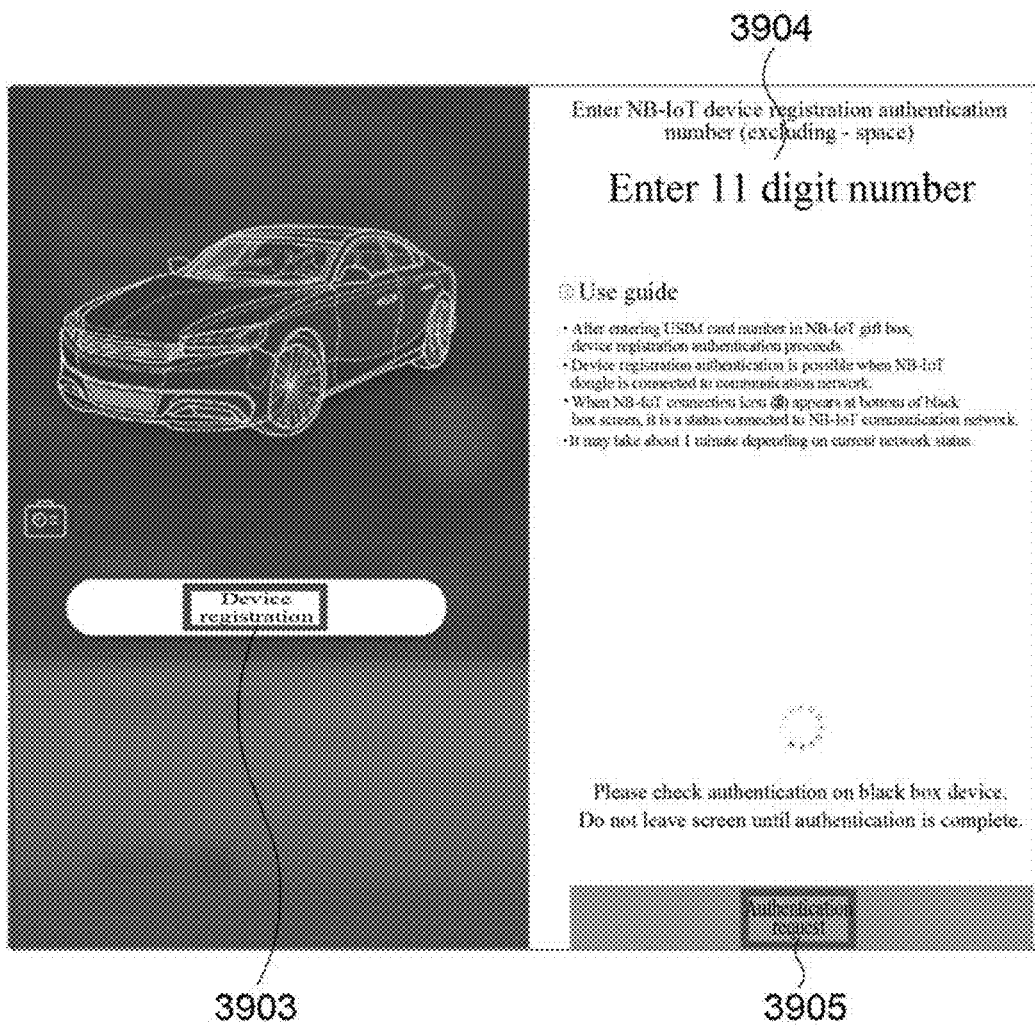
Figure 39C:
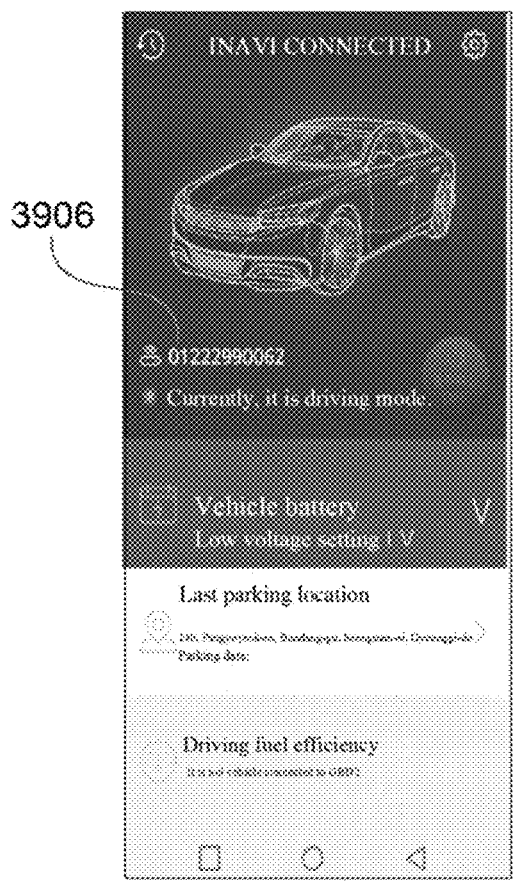

FIGS. 39A to 39C are user interface diagrams illustrating a service member subscription process in a user terminal device according to an exemplary embodiment of the present invention. Referring to FIGS. 39A to 39C, an interface for service member subscription may include a user interface for inputting subscriber identification information. As an example, referring to FIG. 39A, if the user selects "Member Subscription (3901)" displayed on a left interface, the user terminal device 400 may switch to an interface illustrated on the right for receiving a subscriber's ID (e-mail), a subscriber's password, a subscriber's nickname, and the like. If the user sees the screen displayed on the device 400 and enters the user identification information and selects "member registration (3902)", the user terminal device 400 may transmit the input user identification information to the server 300, and the server 300 may determine whether the user is a user having a service use authority to approve or reject the member subscription request. The subscriber identification information for which the member subscription request is approved may be stored in a subscriber information storage unit 321 of the server 300.

In addition, the interface for service member subscription may include a user interface for inputting identification information of the black box 100 and/or the dongle 200 provided with the corresponding subscriber. As an example, referring to FIG. 39B, if the user selects "Device Registration (3903)" displayed on a left interface, the user terminal device 400 may switch to an interface illustrated on the right for receiving a USIM serial number of the NB-IOT terminal 200 provided with the user. If the user inputs the USIM serial number 3904 of the NB-IOT terminal 200 to the interface illustrated on the right and selects "Authentication Request (3905)", the terminal device 400 may transmit the input USIM serial number to the server 300, and the server 300 may determine whether the corresponding NB-IOT terminal 200 is a terminal having a service use authority to approve or reject the authentication request. The apparatus identification information for which the authentication request is approved may be stored in the subscriber information storage unit 321 of the server 300.

In this case, the server 300 may match and store the subscriber identification information and the apparatus identification information for each of a plurality of service subscribers.

On the other hand, if the user's member subscription and terminal authentication are completed according to the processes illustrated in FIGS. 39A and 39B, the user terminal device 400 may display a user interface as illustrated in FIG. 39C. That is, as illustrated in FIG. 39C, the serial number of the USIM of the dongle 200 authenticated to the user may be displayed on one region 3906 of the user interface.

Figure 41:
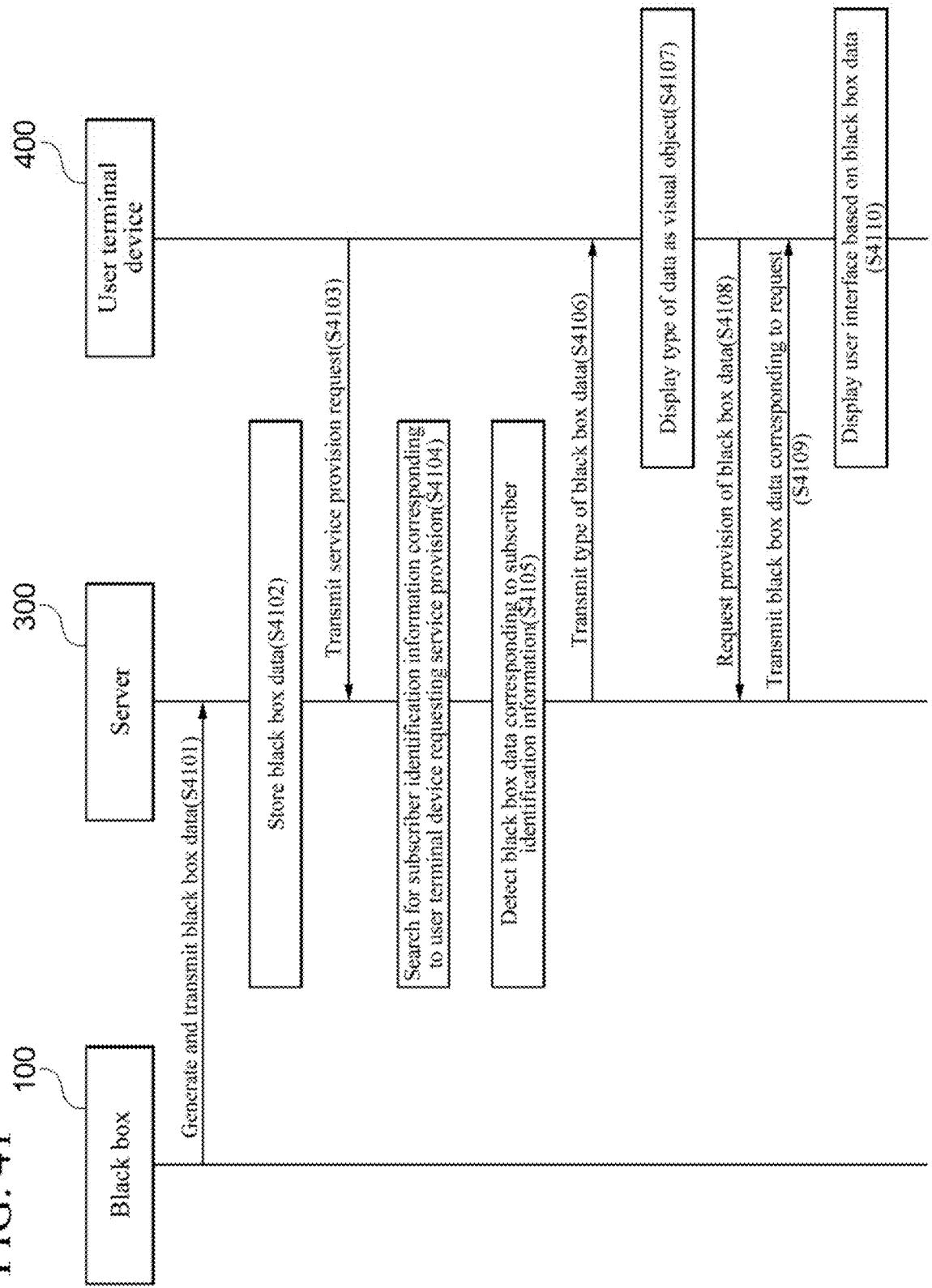
FIG. 41 is a timing diagram illustrating a method for providing a connected service according to another exemplary embodiment of the present invention.

FIG. 40 is a timing diagram illustrating a method for providing a connected service according to an exemplary embodiment of the present invention. FIG. 41 is a timing diagram illustrating a method for providing a connected service according to another exemplary embodiment of the present invention.

Referring to FIG. 40, the black box 100 may generate various data during an operation process and transmit the generated data to the server 300 (S4001). Here, the data generated in the black box 100 may be various, such as image upload data, event occurrence notification data, location data, time data, and the like, and may be as described above with reference to FIGS. 5 to 11.

In addition, the server 300 may store the data received from the black box 100 in a storage unit (S4002). As an example, the server 300 may store the data received from the black box 100 in the service operation information storage unit 322.

In addition, the server 300 may search for identification information of the user terminal device 400 corresponding to the black box that generated the data (S4003). As an example, the server 300 may search for the identification information of the user terminal device 400 corresponding to the black box 100 based on the information stored in the service subscriber information storage unit 321.

In addition, the server 300 may generate a notification message to be sent to the searched user terminal device 400 (S4004). Here, the notification message is a message informing that data is generated in the black box 100 and may be in a push message format.

Meanwhile, if the message is transmitted to the user terminal device 400 (S4005), the user terminal device 400 may display the notification message (S4006), and if the user selects the message, the user terminal device 400 may request the server 300 to provide the data generated in the black box corresponding to the message (S4007).

In this case, the server 300 may transmit the black box data corresponding to the request of the user terminal device 400 to the user terminal device 400 (S4008), and the user terminal device 400 may configure a user interface based on the data generated in the black box and display the user interface on the screen (S4009).

Meanwhile, FIG. 40 is one implementation example of the present invention, and may also be implemented as in FIG. 41 according to another exemplary embodiment of the present invention. S4001 to S4002 of FIG. 40 may be applied to FIG. 41 in the same way.

Specifically, the black box 100 may generate various data in the operation process (S4101). In addition, the server 300 may store the black box data generated from the black box 100 received from the black box 100 in the storage unit (S4102).

In addition, the server 300 may receive a service provision request from the user terminal device 400 (S4103). In this case, the server 300 may search for subscriber identification information corresponding to the user terminal device 400 requesting the service provision from the service subscriber information storage unit 321 (S4104), and may detect the black box data corresponding to the subscriber identification information from the service operation information storage unit 322 if there is searched subscriber identification information as a result of the search (S4105).

In addition, the server 300 may provide the type of detected black box data to the user terminal device 400 (S4106), and the user terminal device 400 may display the type of data as a visual object (S4107).

If the user of the user terminal device 400 requests the provision of data generated in the black box 100 by a click for the visual object or a voice command, the user terminal device 400 may transmits the black box data provision request to the server 300 (S4108), and the server 300 may provide the black box data for the request to the user terminal device 400 (S4109).

In this case, the user terminal device 400 may configure a user interface based on the black box data and display the user interface on the screen (S4110).

According to the exemplary embodiment of the present invention, image data generated from a plurality of black boxes subscribed to the service may be separately stored according to the identification information of the black boxes. Accordingly, when an image data provision request is received from the user terminal device of the user corresponding to the identifier of each black box in the future, the server may confirm whether the image data to be provided exists and whether the request is an image data provision request from a legitimate user, by confirming the identifier of the user terminal device that has transmitted the data provision request.

Hereinafter, a method for providing a connected service according to another exemplary embodiment of the present invention will be described with reference to the subsequent drawings.

Figure 42:
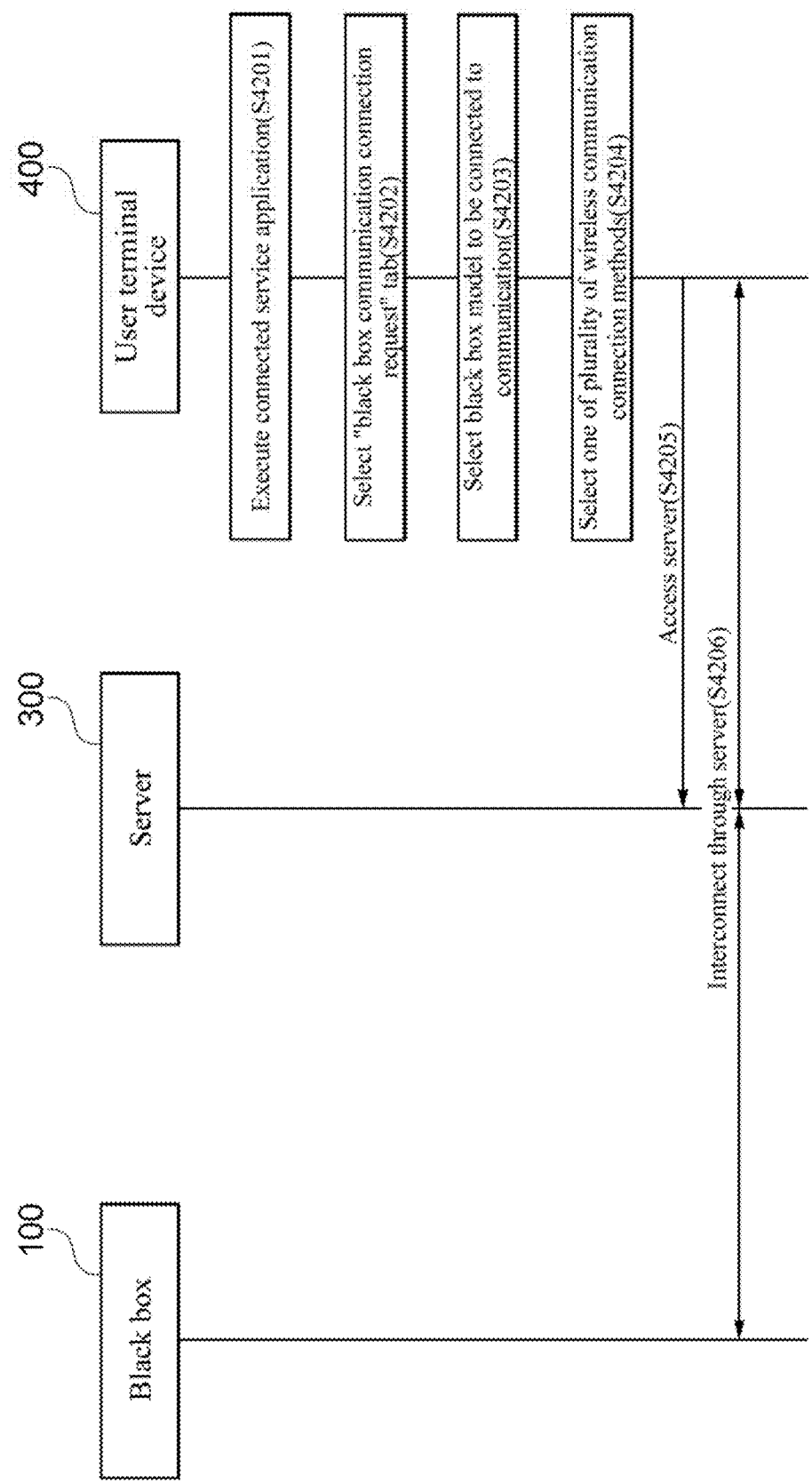
FIG. 42 is a timing diagram illustrating a communication connection process between a user terminal device and a black box according to an exemplary embodiment of the present invention.

FIG. 42 is a timing diagram illustrating a communication connection process between a user terminal apparatus and a black box according to an exemplary embodiment of the present invention. Referring to FIG. 42, the user may execute the connected service application through the user terminal device 400 (S4201), and may select the "black box communication connection request" tab in the displayed user interface according to the execution (S4202).

In addition, the user may select a black box model to be connected to communication among a plurality of black box models displayed on the user interface (S4203). If there is only one registered black box, only one black box model may be displayed on the user interface.

In addition, the user may select one of a plurality of wireless communication connection methods of the user terminal device 400 (S4204). Here, the plurality of wireless communication connection methods may be various, such as Long Term Evolution (LTE), Wireless Fidelity (WiFi), and WiFi hot spot.

In addition, the user terminal device 400 may access the server 300 using the selected wireless communication connection method (S4205). As an example, if the user selects Wi-Fi as the wireless communication connection method, the user terminal device 400 may access the server 300 through a Wi-Fi network.

In addition, the user terminal device 400 may be communicatively connected to the user selection black box 100 through the accessed server 300 (S4205). If the communication between the user terminal device 400 and the black box 100 is connected, the interface of the user terminal device 400 may display a visual object indicating that the user terminal device 400 accesses (S4206).

Figure 43:
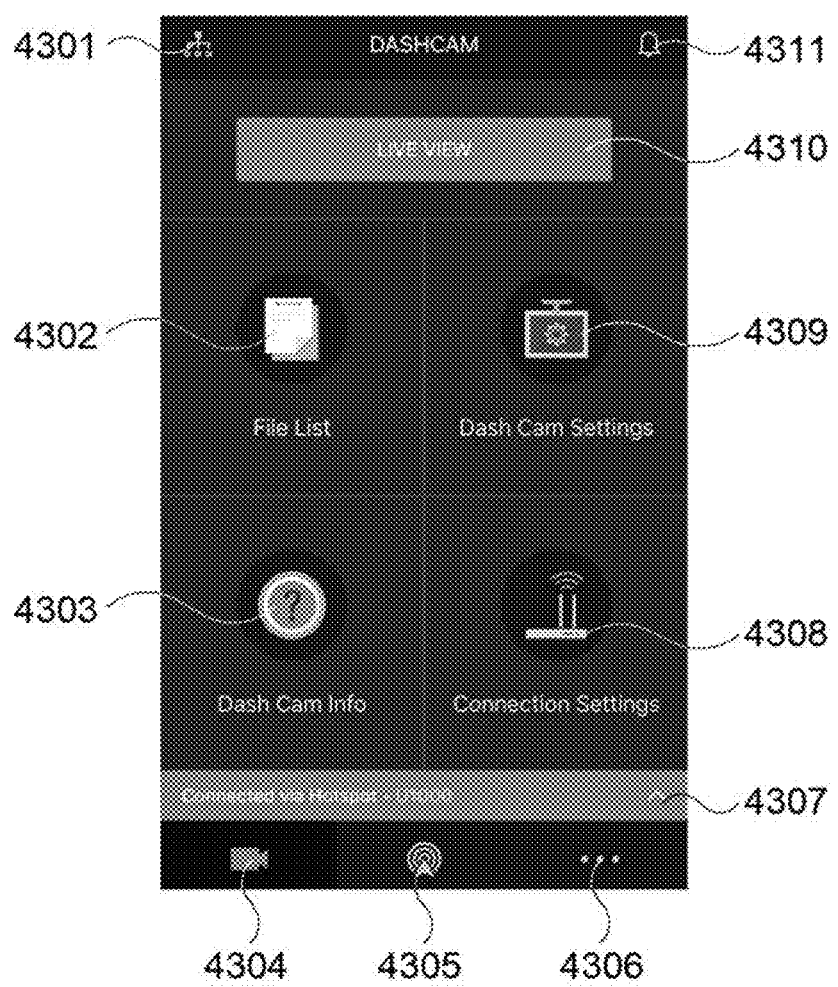
FIG. 43 is a diagram illustrating a main user interface of a user terminal device according to another exemplary embodiment of the present invention.

FIG. 43 is a diagram illustrating a main user interface of a user terminal device according to another exemplary embodiment of the present invention. Referring to FIG. 43, a user interface may include a plurality of regions.

When one region 4301 of the user interface is selected, the user terminal device 400 may display a screen for configuring a connected black box or a new connection.

When a region 4302 of the user interface is selected, a screen for displaying and playing a recorded image of the black box 100 may be displayed.

When a region 4303 of the user interface is selected, black box product information may be displayed.

When a region 4304 of the user interface is selected, a main menu may be displayed.

When a region 4305 of the user interface is selected, a connected service menu may be displayed.

When a region 4306 of the user interface is selected, various menus for account settings, firmware updates, and safety cameras data may be displayed.

When a region 4307 of the user interface is selected, a screen for changing a current communication connection type or disconnecting a current connection may be displayed. Here, a bar region included in the region 4307 may display a communication connection method of the black box or a connection state of the black box (e.g., "Connected via Hotspot").

When a region 4308 of the user interface is selected, a screen for showing the connected WiFi network or adding a new network may be displayed.

When a region 4309 of the user interface is selected, a screen for setting the settings of the black box may be displayed.

When a region 4310 of the user interface is selected, a screen for displaying a live image may be displayed.

When a region 4311 of the user interface is selected, various notification information, such as a firmware update notification, a Geo-Fencing zone entry and exit notification, and an impact notification may be displayed.

Hereinafter, a user interface for providing a connected service according to another exemplary embodiment of the present invention will be described with reference to FIGS. 44 to 51. The connected service illustrated in FIGS. 44 to 51 may be performed when the black box 100 is connected to a wireless communication network, and the connected service may provide various services, such as a service showing the location of the vehicle, a service notifying that a vehicle enters or exits the geo-fencing zone, and a service notifying that a strong impact is detected.

Figure 44A:
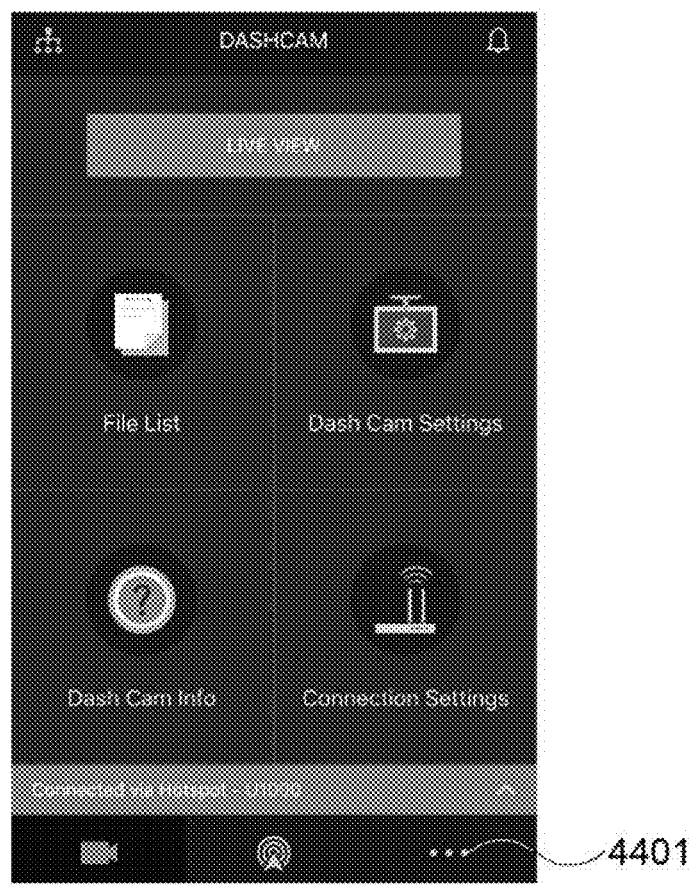
FIGS. 44A to 44C are user interface diagrams illustrating an account login process of a service subscriber according to an exemplary embodiment of the present invention.
Figure 44B:
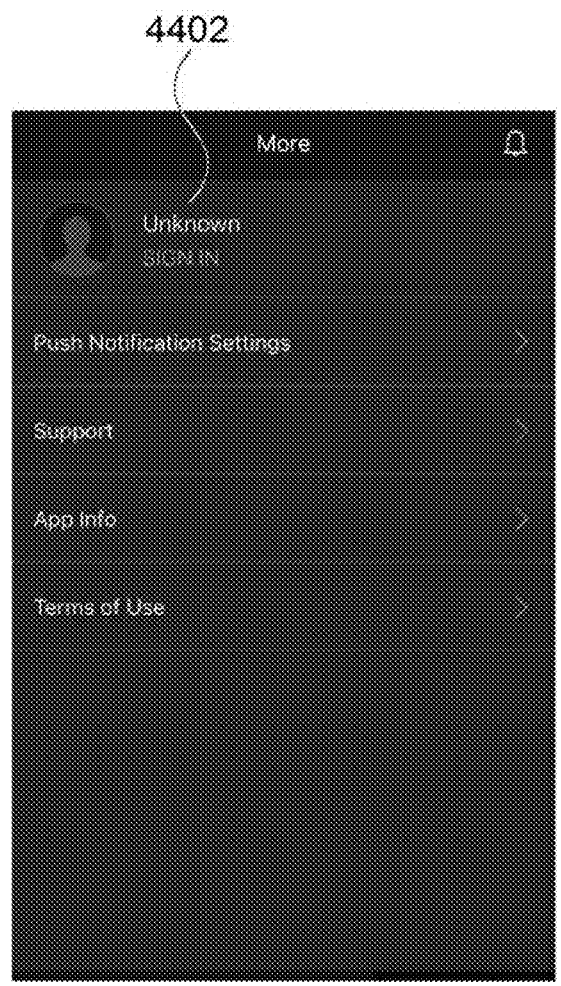
Figure 44C:
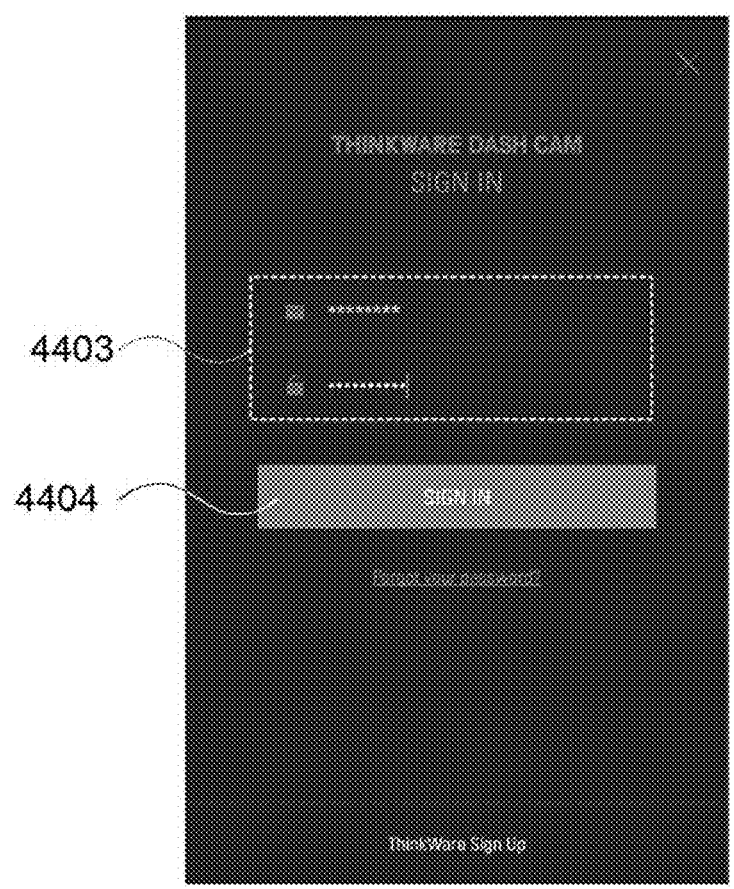

FIGS. 44A to 44C are user interface diagrams illustrating an account login process of a service subscriber according to an exemplary embodiment of the present invention. When the user selects one region 4401 of the main user interface illustrated in FIG. 44A, the user terminal device 400 may display a user interface of FIG. 44B. If the user selects "sign in (4402)" in the user interface of FIG. 44B, the user terminal device 400 may display a user interface of FIG. 44C.

In addition, if the user inputs the ID and password to a region 4403 of FIG. 44C and selects "sign in (4404)", the user terminal device 400 may access the server 300 and perform log in. If the user's information is stored in the service subscriber information storage unit 321 of the server 300, the server 300 may allow the user to log in.

Figure 45A:
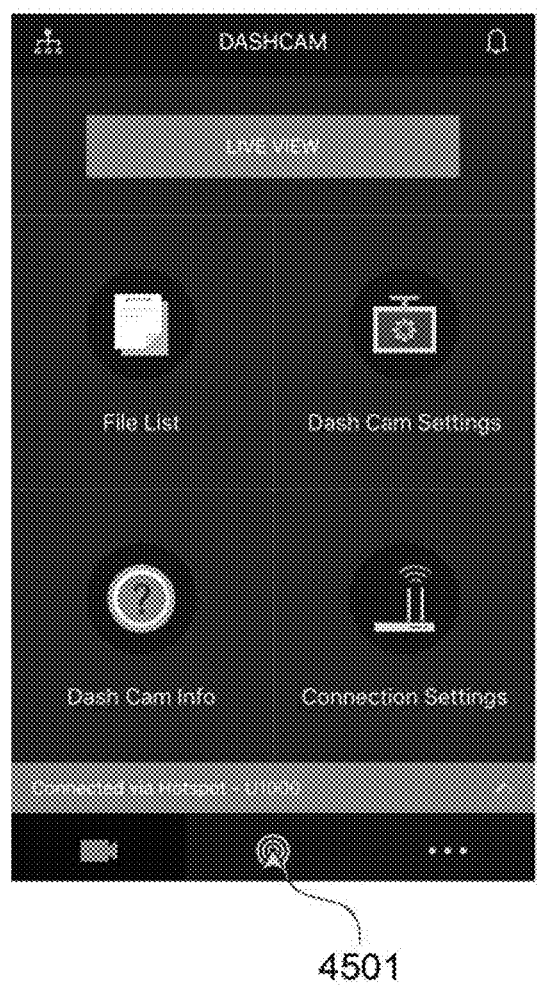
FIGS. 45A to 45C are user interface diagrams illustrating a process of displaying a location of a vehicle according to an exemplary embodiment of the present invention.
Figure 45B:
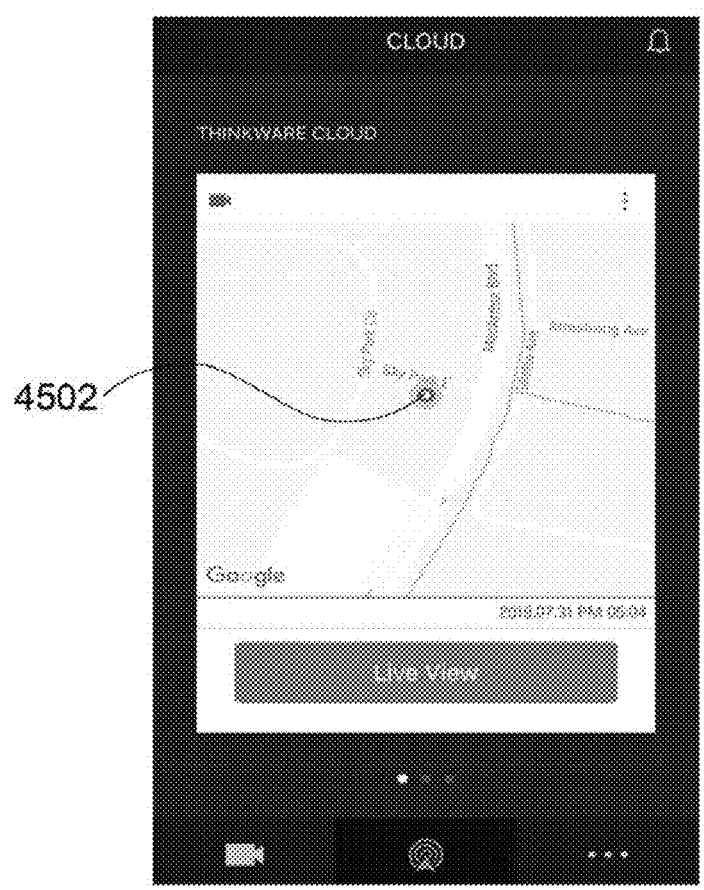
Figure 45C:
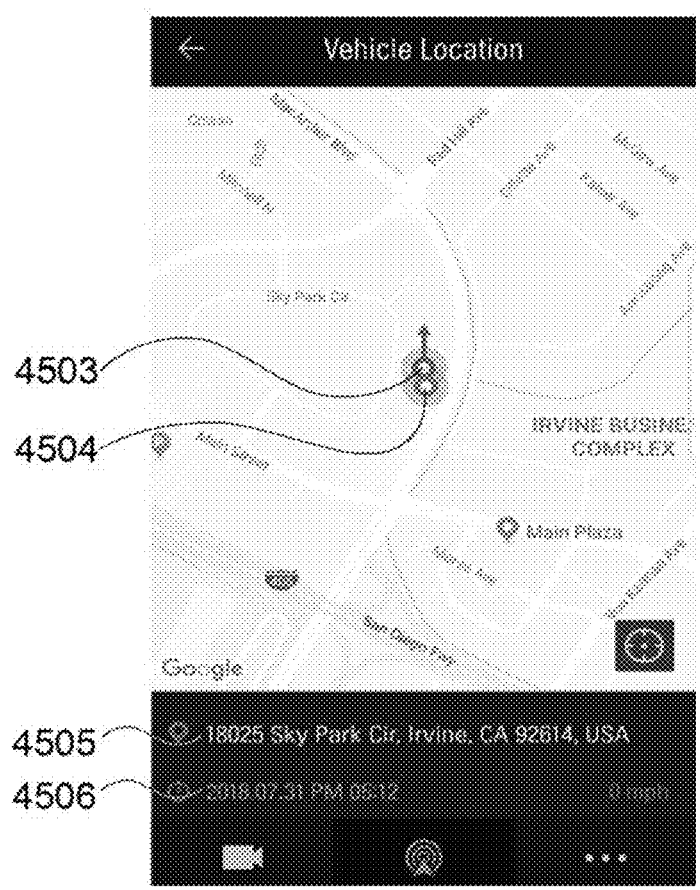

FIGS. 45A to 45C are user interface diagrams illustrating a process of displaying a location of a vehicle according to an exemplary embodiment of the present invention. When the user selects one region 4501 of the main user interface of FIG. 45A, the user terminal device 400 may display a user interface of FIG. 45B.

The user interface of the FIG. 45B may display a location 4502 of the user terminal device 400 on a map, and at the bottom of the map, a Live View button capable of providing an image generated in the black box 100 to the user is displayed. When the user clicks the Live View button, the image provided from the black box 100 may be a real-time generated image, and may also be an image that is previously generated and stored in an internal memory of the server or the black box 100. In FIG. 45B, the Live View button is displayed on the bottom of the map, but this is only an example, and the Live View button may be displayed on either side of the map screen or around the location 4502 displayed on the map. In addition, if the user selects the map of the user interface of FIG. 45B, the user terminal device 400 may display a user interface of FIG. 45C.

Here, the user interface of FIG. 45C is an interface that displays the location and direction 4503 of the vehicle on a map, and the interface may simultaneously display a location 4504 of the user terminal device 400.

In addition, the user interface of FIG. 45C may display address information 4505 corresponding to the location of the vehicle, and display last information reception time information 4506 for the location of the vehicle.

Figure 46A:
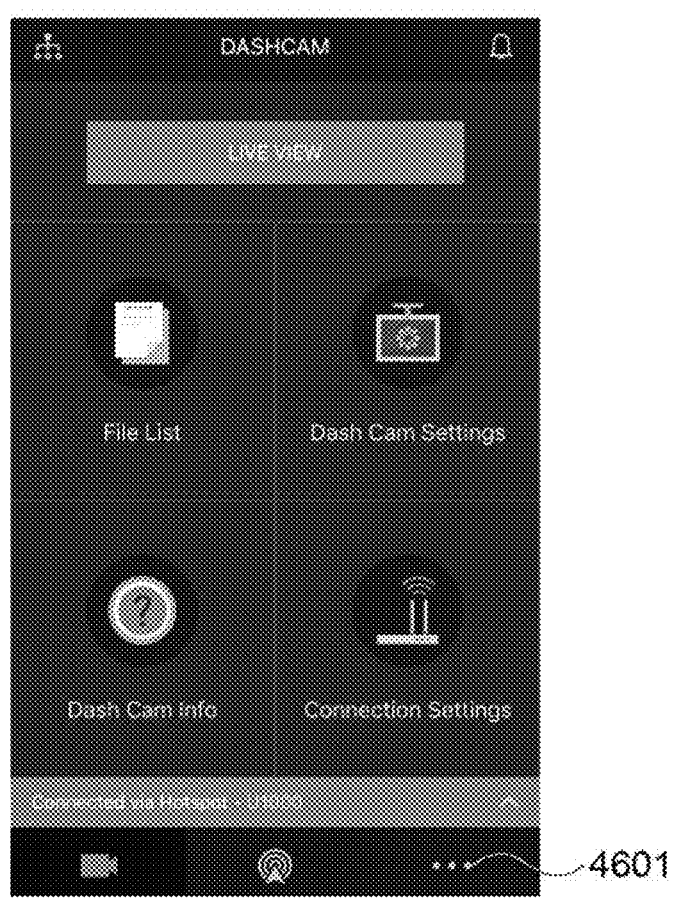
FIGS. 46A to 46C are diagrams illustrating a process of setting whether to notify geo-fencing according to an exemplary embodiment of the present invention.
Figure 46B:
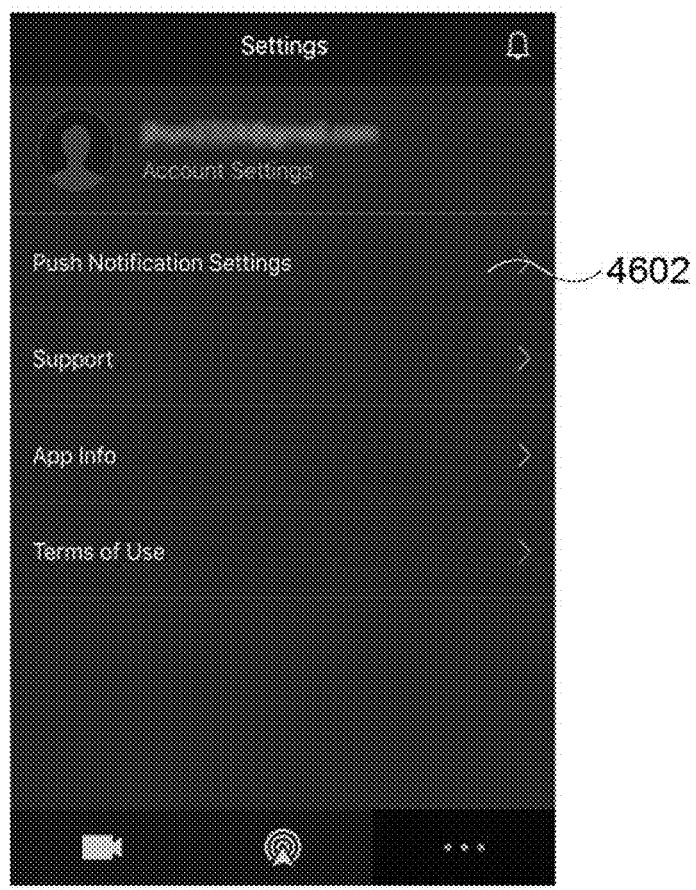
Figure 46C:
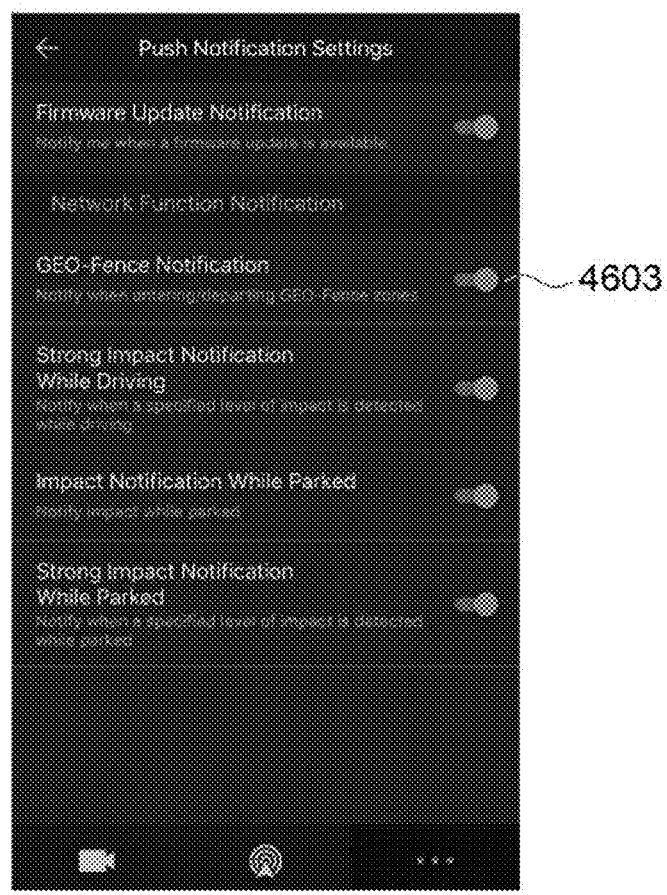

FIGS. 46A to 46C are diagrams illustrating a process of setting whether to notify geo-fencing according to an exemplary embodiment of the present invention. Here, geo-fencing means a technique for setting a radius based on a location information solution.

Specifically, when the user selects one region 4601 of the main user interface of FIG. 46A, the user terminal device 400 may display a user interface of FIG. 46B. In addition, if the user selects "push notification settings 4602" in FIG. 46B, the user terminal device 400 may display a setting screen as illustrated in FIG. 46C.

In this case, the user may set a geo-fence notification 4603 through the setting screen of FIG. 46C. Additionally, the setting screen of FIG. 46C may further include regions for setting Firmware Update Notification, Strong Impact Notification While Driving, Impact Notification While Parked, and Strong Impact Notification While Parked.

FIGS. 47A to 47F are user interface diagrams illustrating a process of setting a geo-fencing area according to an exemplary embodiment of the present invention. When the user selects one region 4701 of the main user interface of FIG. 47A, the user terminal device 400 may display a user interface of FIG. 47B.

Figure 47A:
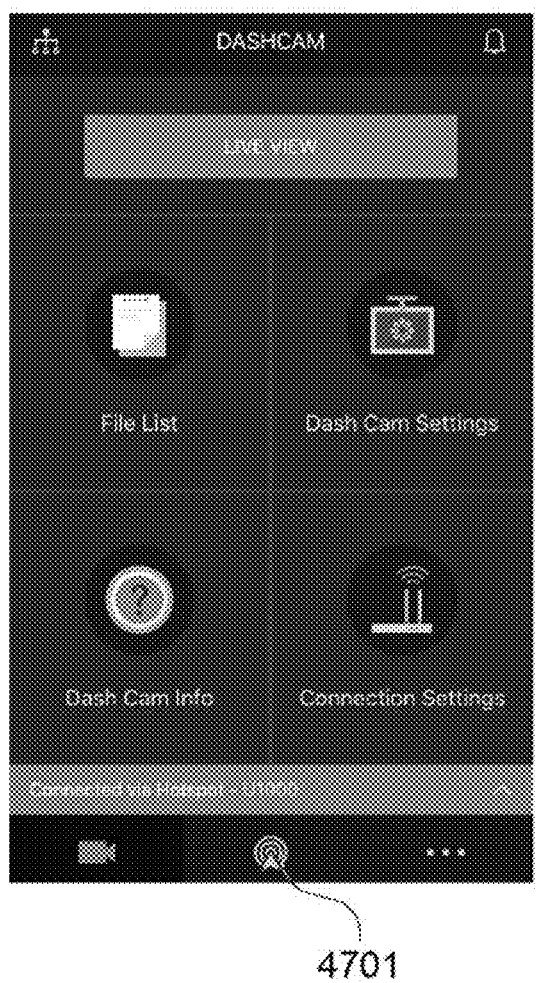
FIGS. 47A to 47F are user interface diagrams illustrating a process of setting a geo-fencing area according to an exemplary embodiment of the present invention.
Figure 47B:
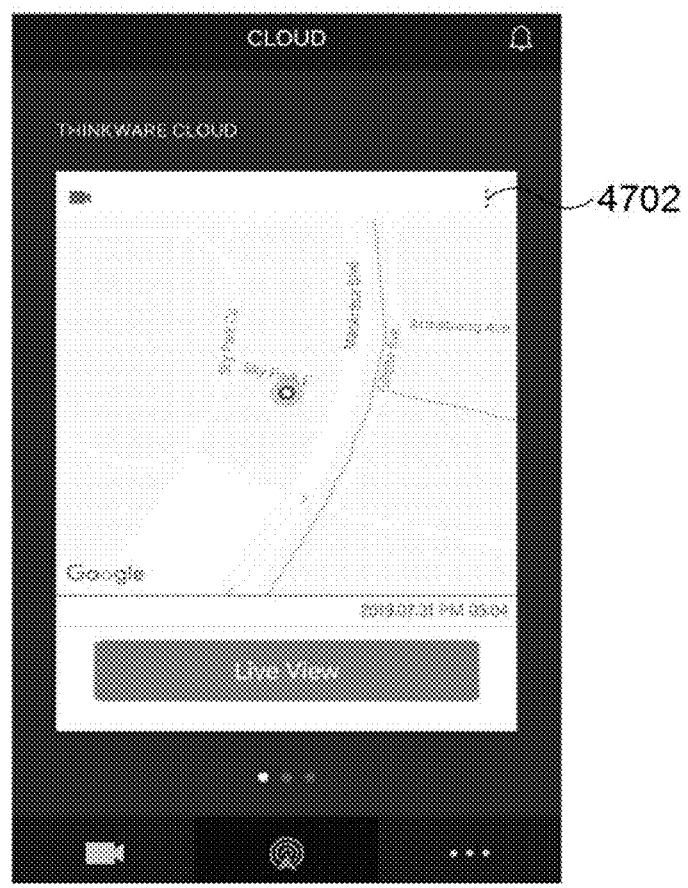
Figure 47C:
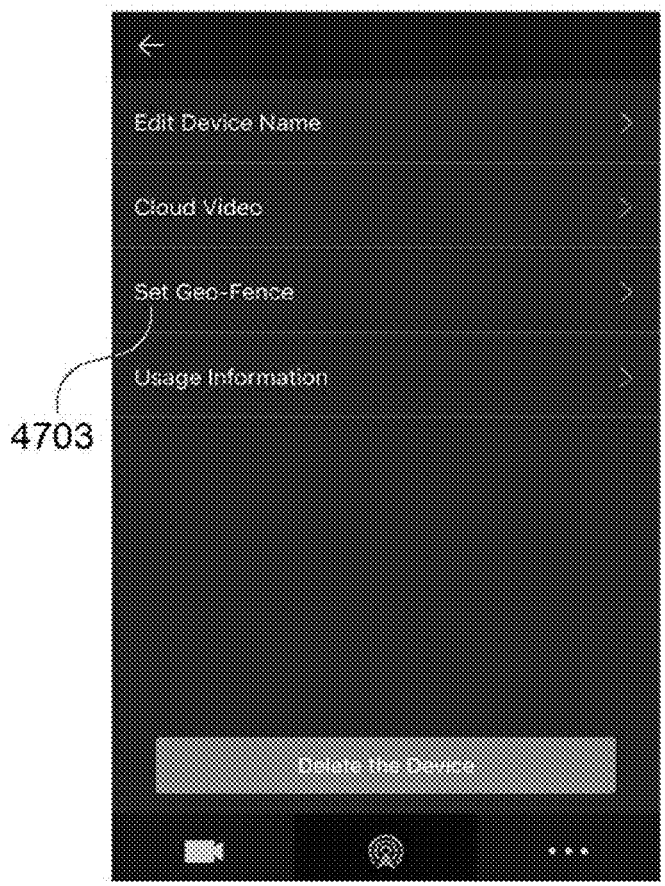

The user interface of FIG. 47B is a user interface that displays the location of the user terminal device 400 on a map, and when the user selects one region 4702 of the main user interface, the user terminal device 400 may display a user interface of FIG. 47C.

Figure 47D:
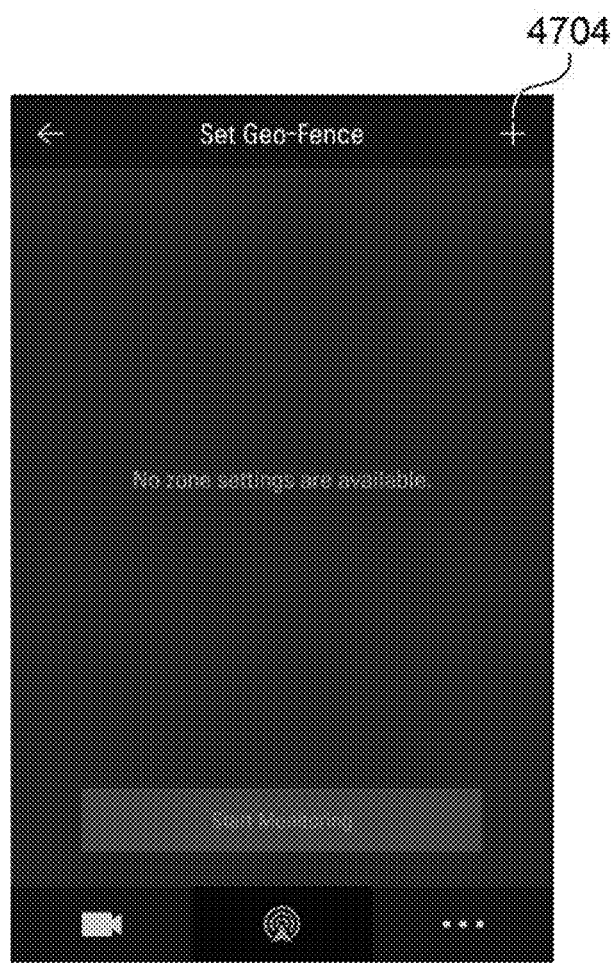
Figure 47E:
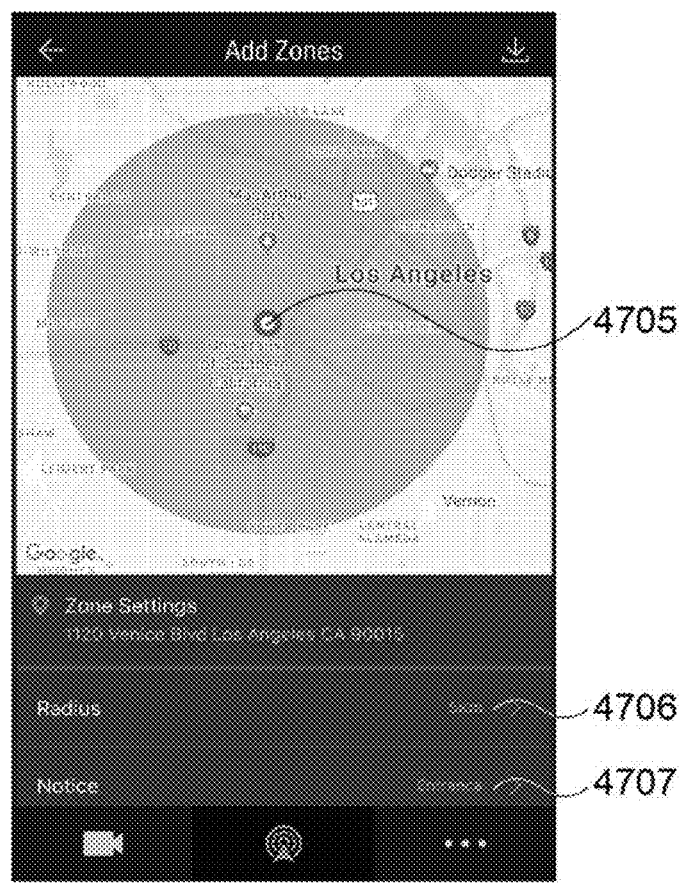

In addition, if the user selects "Set Geo-Fence (4703)" in the user interface of FIG. 47C and selects a region 4704 in a user interface of FIG. 47D, the user terminal device 400 may display a user interface as illustrated in FIG. 47E.

FIG. 47E illustrates a user interface for setting a geo-fencing area, and the user may set the geo-fencing area by first selecting a specific point 4705 on the map and selecting a radius distance 4706 centered on the selected point. At this time, the set geo-fencing area may be set to a polygonal shape such as a circle or triangle, and the shape of the geo-fencing area may be set according to user's input. In addition, the user may set a notification 4707 when entering the geo-fencing area.

Figure 47F:
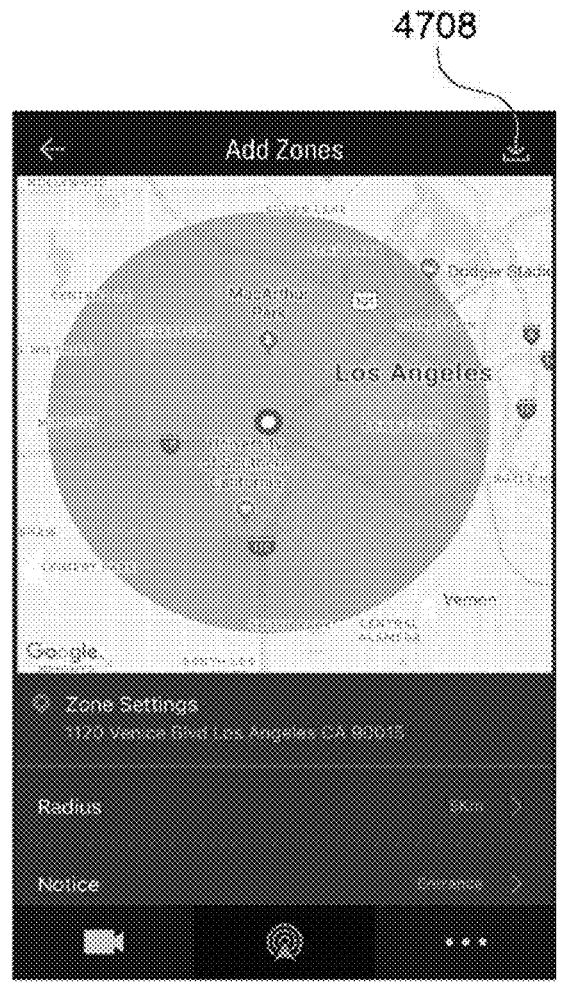

In this case, the user terminal device 400 may display a user interface for displaying the set geo-fencing area on the map as illustrated in FIG. 47F, and when the user selects a region 4708, the geo-fencing set may be completed.

Figure 48A:
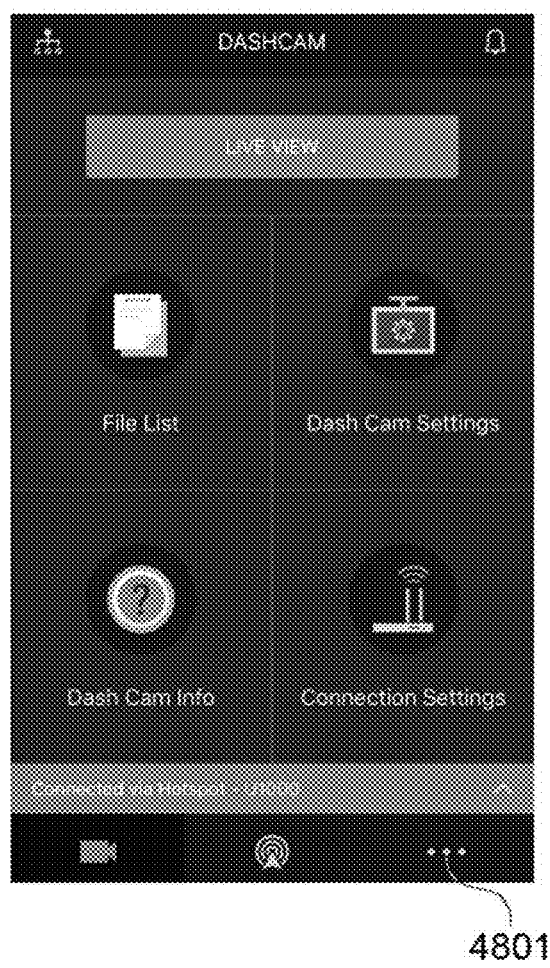
FIGS. 48A to 48C are user interface diagrams illustrating a process of setting a strong impact notification while driving a vehicle according to an exemplary embodiment of the present invention.
Figure 48B:
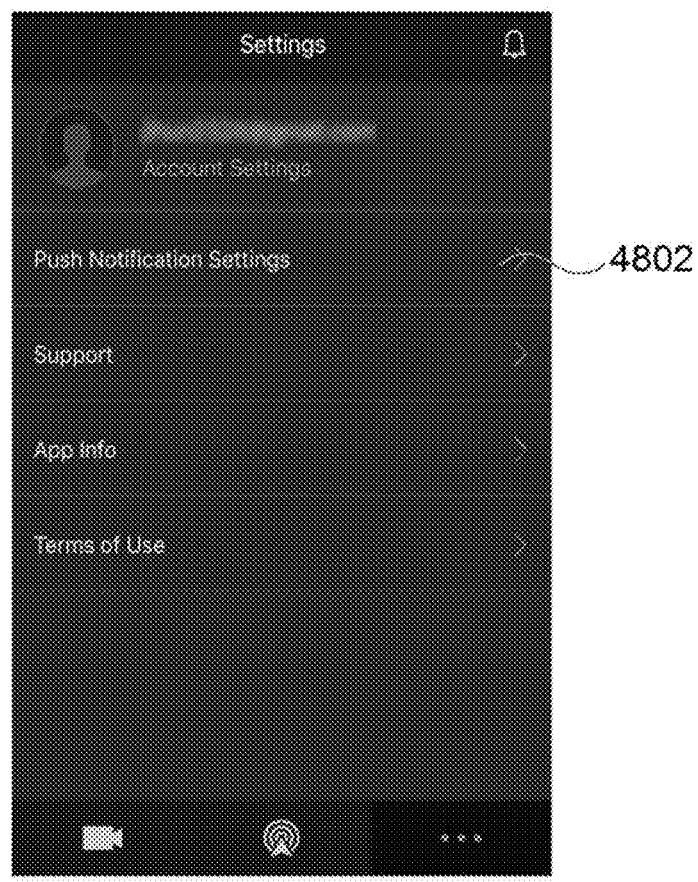
Figure 48C:
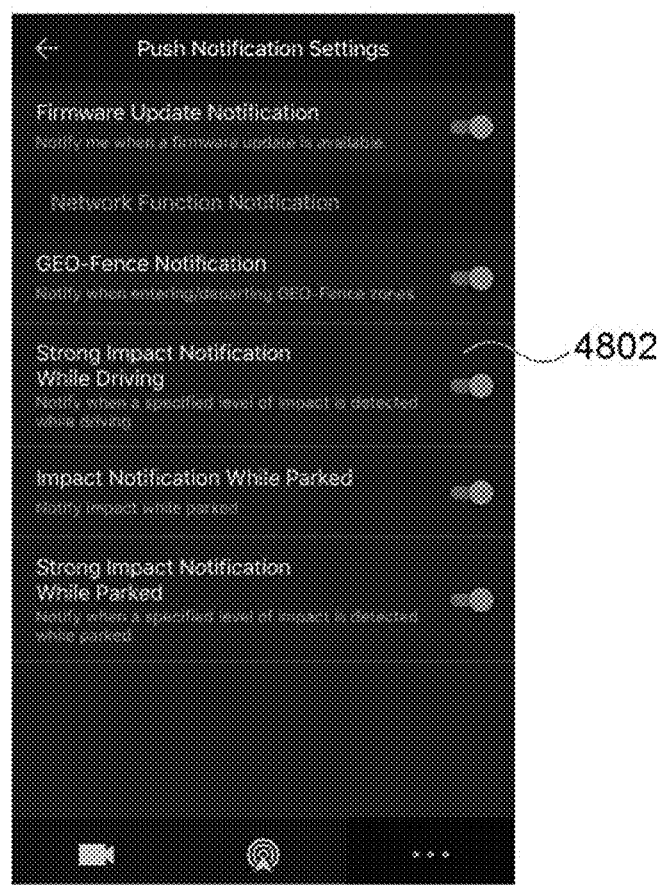

FIGS. 48A to 48C are user interface diagrams illustrating a process of setting a strong impact notification while driving a vehicle according to an exemplary embodiment of the present invention. Here, the strong impact may mean a situation in which a large impact of a second impact level or more occurs, and a situation in which an impact that is greater than a first impact level and less than the second impact level occurs may be referred to as a general impact.

Specifically, when the user selects one region 4801 of the main user interface of FIG. 48A, the user terminal device 400 may display a user interface of FIG. 48B. In addition, if the user selects "push notification settings 4802" in FIG.

48B, the user terminal device 400 may display a setting screen as illustrated in FIG. 48C.

In this case, the user may set a strong impact notification while driving through the setting screen of FIG. 48C.

Figure 49A:
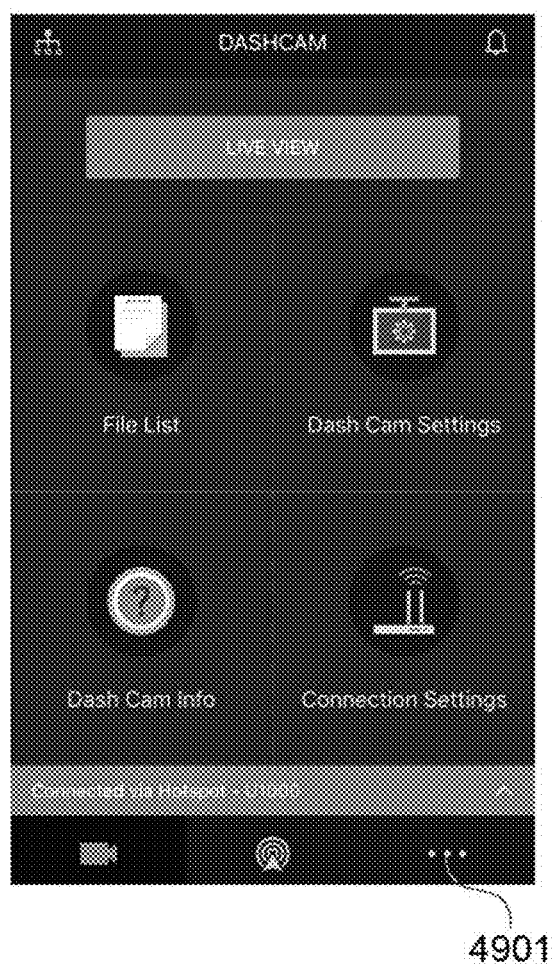
FIGS. 49A to 49C are user interface diagrams illustrating a process of setting an impact notification while parking a vehicle according to an embodiment of the present invention.
Figure 49B:
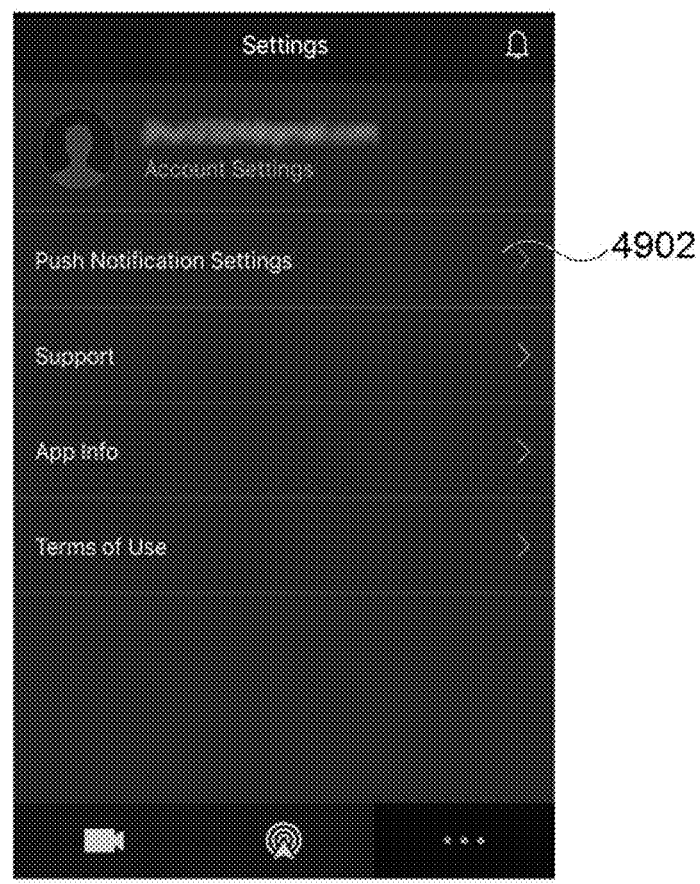
Figure 49C:
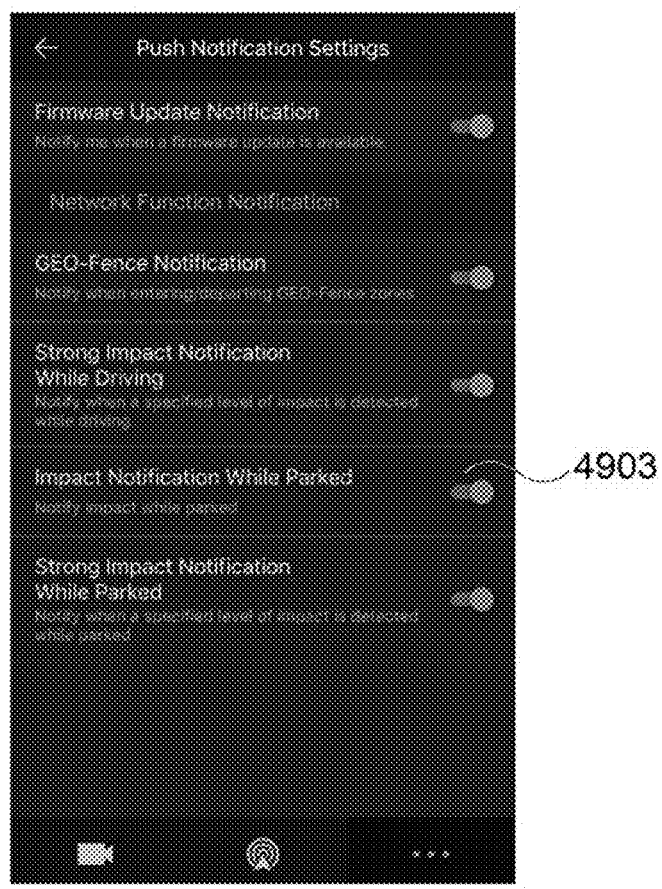

FIGS. 49A to 49C are user interface diagrams illustrating a process of setting an impact notification while parking a vehicle according to an embodiment of the present invention. FIGS. 49A and 49B may be performed through the same processes as in FIGS. 48A and 48B, respectively.

In this case, the user may set an impact notification while parked 4901 through the user interface of FIG. 49C.

Figure 50A:
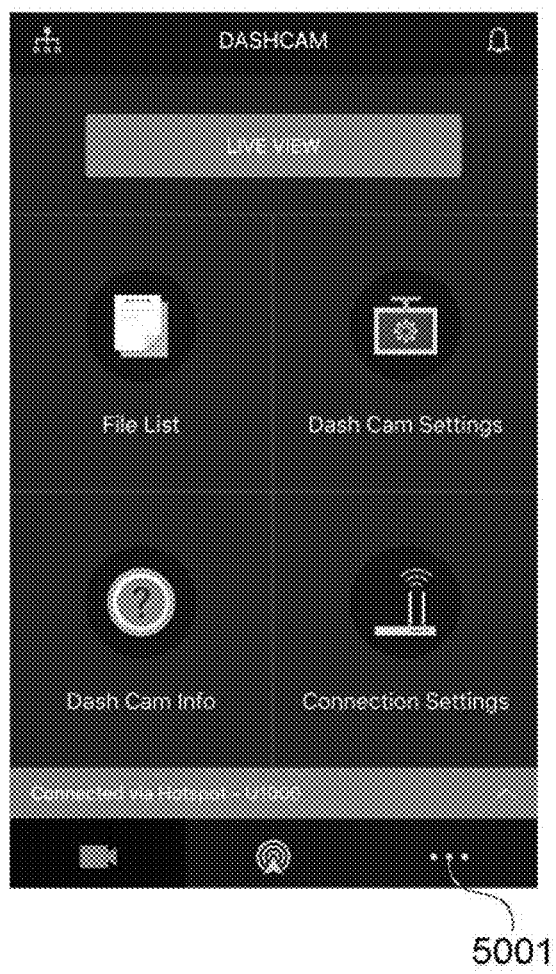
FIGS. 50A to 50C are user interface diagrams illustrating a process of setting a strong impact notification while parking a vehicle according to an exemplary embodiment of the present invention.
Figure 50B:
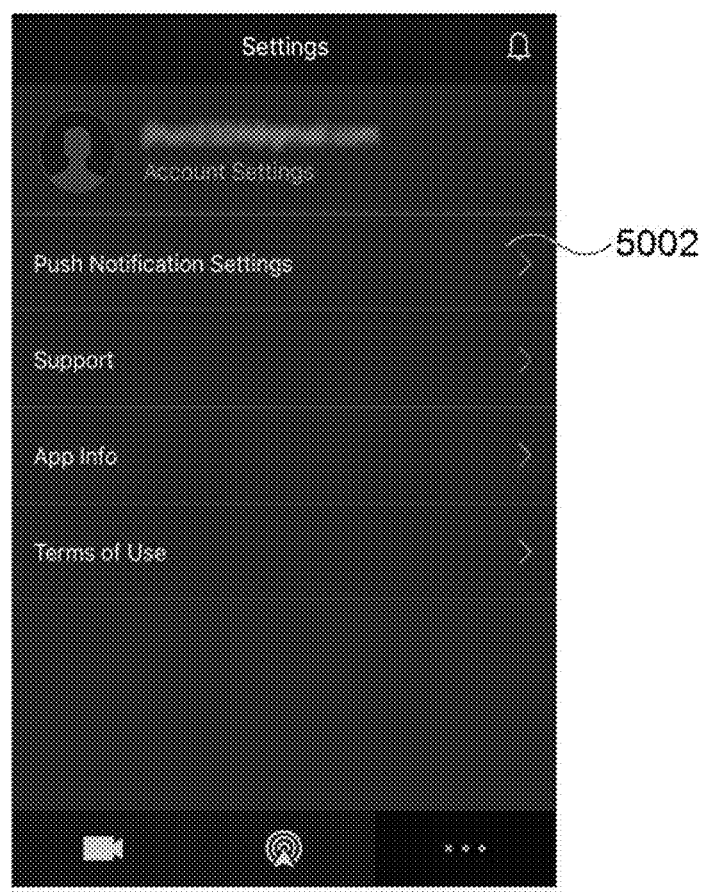
Figure 50C:
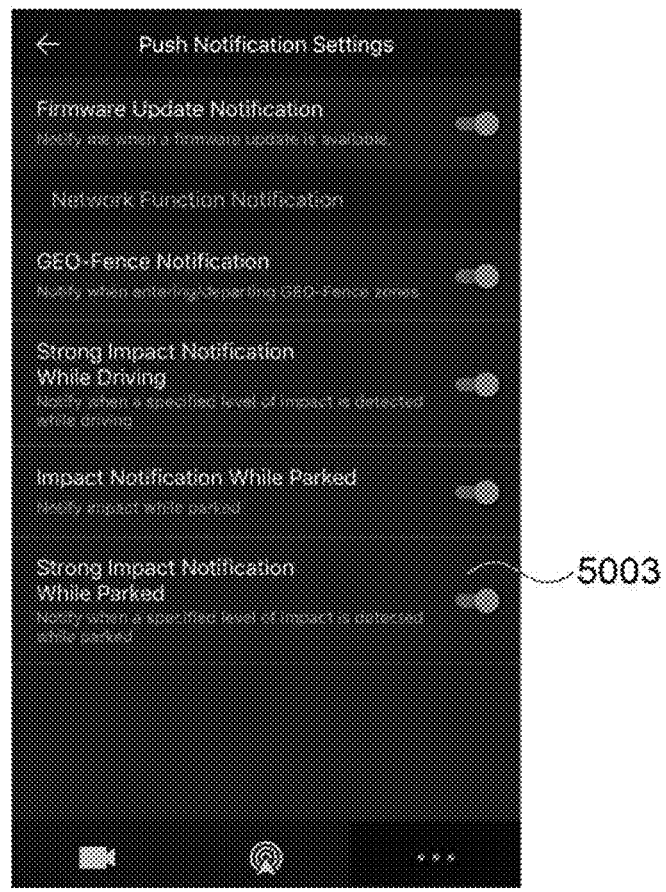

FIGS. 50A to 50C are user interface diagrams illustrating a process of setting a strong impact notification while parking a vehicle according to an exemplary embodiment of the present invention. FIGS. 50A and 50B may be performed through the same processes as in FIGS. 48A and 48B, respectively.

In this case, the user may set a strong impact notification while parked 5001 through a user interface of FIG. 50C.

FIGS. 51A to 51E are diagrams illustrating a process of checking an impact image according to an exemplary embodiment of the present invention. When the user selects one region 5101 of the main user interface of FIG. 51A, the user terminal device 400 may display a user interface of FIG. 51B.

Figure 51A:
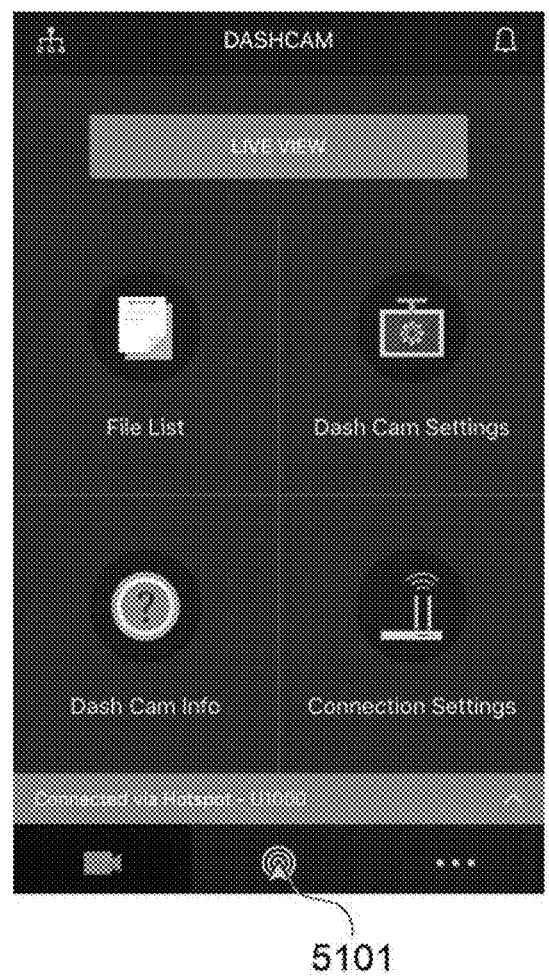
FIGS. 51A to 51E are diagrams illustrating a process of checking an impact image according to an exemplary embodiment of the present invention.
Figure 51B:
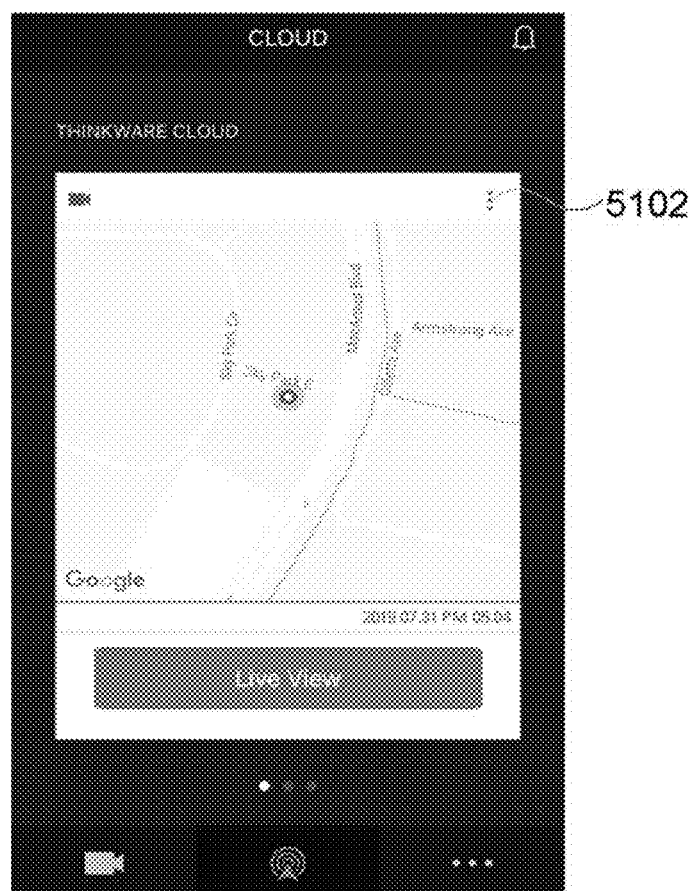
Figure 51C:
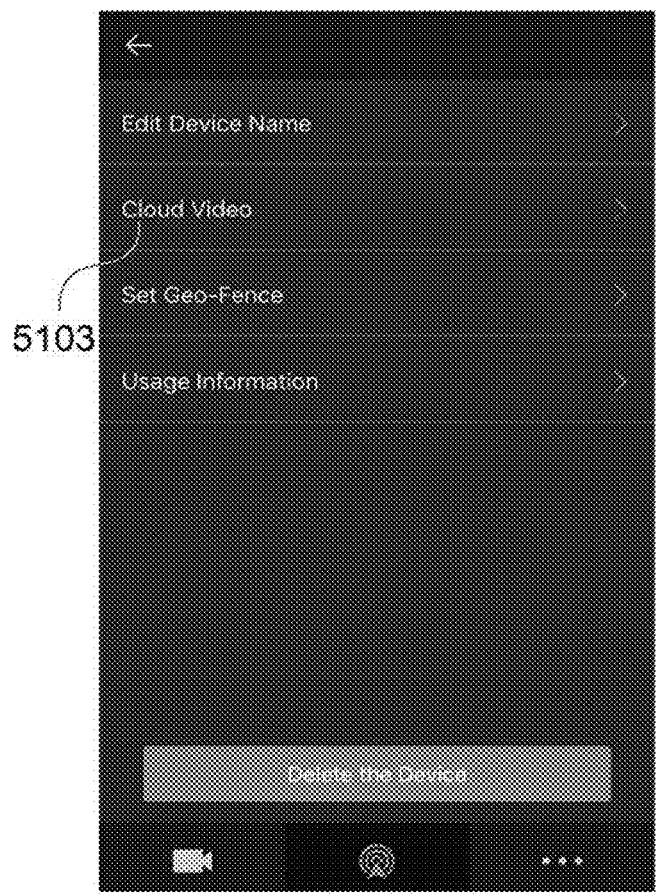

The user interface of FIG. 51B is a user interface that displays the location of the user terminal device 400 on a map, and when the user selects one region 5102 of the user interface, the user terminal device 400 may display a user interface of FIG. 51C.

Figure 51D:
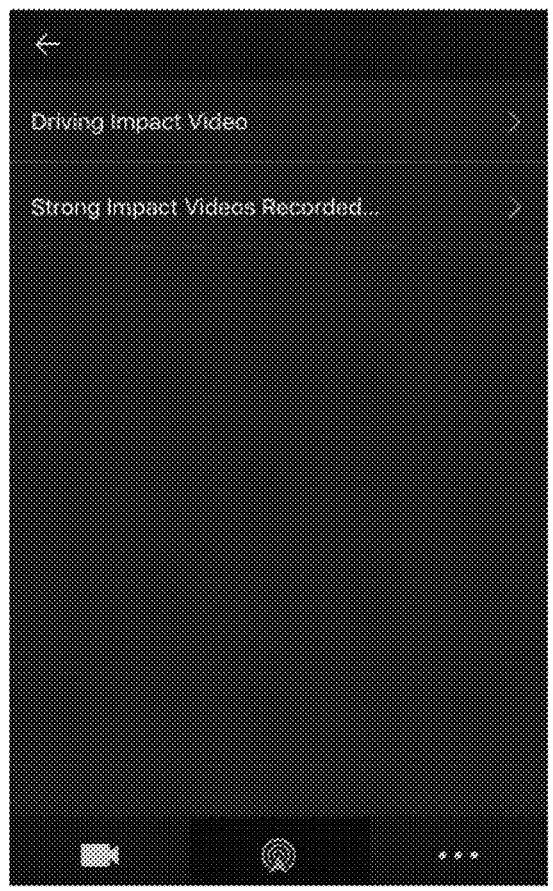
Figure 51E:
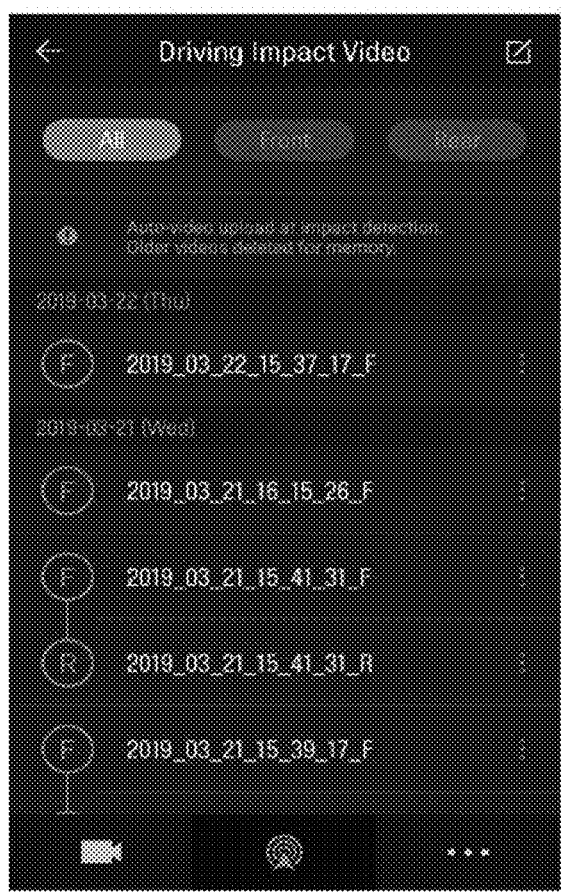

In addition, if the user selects a cloud video 5103 in the user interface of FIG. 51C and selects a driving impact video or a strong impact video while parked in a user interface of FIG. 51D, the user terminal device 400 may display a user interface as illustrated in FIG. 51E.

FIG. 51E illustrates a user interface for displaying an impact video list, and the user may select a video to play on the displayed list and request a download. In this case, the user terminal device 400 may transmit a transmission request of the selected video to the server 300 and receive the selected video from the server 300.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. The terms used as such will be understood by the exemplary embodiments of the invention described herein. Likewise, in the case in which it is described herein that a method includes a series of steps, a sequence of the steps suggested herein is not necessarily a sequence in which the steps may be executed, and any described step may be omitted and/or any other steps that are not described herein may be added to the method. For example, the first component may be referred to as a second component, and similarly, the second component may be referred to as a first component, without departing from the scope of the present invention.

In addition, in the specification and the claims, terms such as "left", "right", "front", "rear", "top", "bottom", "over", "under", and the like do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. The term. "connected" as used herein is defined as being connected directly or indirectly in an electrical or non-electrical manner. Here, targets described as being "adjacent to" each other may physically contact each other, be close to each other, or be in the same general range or region, in a context in which the above phrase is used. Here, the present of the phrase "in an exemplary embodiment" means the same exemplary embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

On the other hand, when it is mentioned that any component is "directly coupled" or "directly connected" to another component, it is to be understood that any component may be coupled or connected to the other element without another component interposed therebetween.

In addition, terms "module" and "unit" for components used in the present specification are used only in order to easily make the specification. Therefore, these terms do not have meanings or roles that distinguish from each other in themselves.

In addition, the terms used in the present specification are for explaining exemplary embodiments rather than limiting the present invention. The singular expression used in the present specification includes the plural expression unless the context clearly indicates otherwise. In the specification, it is to be noted that the terms "comprising" or "including", and the like, are not be construed as necessarily including several components or several steps described in the specification and some of the above components or steps may not be included or additional components or steps are construed as being further included.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention is shown in the claims rather than the foregoing description, and all differences within the equivalent range should be interpreted as being included in the present invention.

Meanwhile, the lane detection method according to various exemplary embodiments of the present invention described above may be implemented as programs and be provided to servers or devices. Therefore, the respective apparatuses may access the servers or the devices in which the programs are stored to download the programs.

In addition, the method according to various exemplary embodiments of the present invention described above may be implemented as a program and stored in various non-transitory computer readable media and provided. The non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the specific exemplary embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed:

1. A method for providing a connected service of an image capturing apparatus for a vehicle, the method comprising:
    connecting the image capturing apparatus for a vehicle to a server for providing a connected service using a wireless communication module;
    generating event data including event code information and operation mode information of the image capturing apparatus for a vehicle, when an event occurs in the image capturing apparatus for a vehicle; and
    transmitting the generated event data to the server for providing a connected service through the wireless communication module,
    wherein the event includes a first event including at least one of an impact occurrence event while parked, an impact occurrence event while driving, and a movement occurrence event while parked,
    the method further includes extracting at least two images of images captured within a predetermined time range of an occurrence of the first event when the first event occurs, and generating image upload data using the extracted images, and
    in the transmitting of the generated event data, the first event data and the image upload data are transmitted to the server for providing a connected service through the wireless communication module.

2. The method for providing a connected service of claim 1, wherein the image upload data includes total image count information.

3. A method for providing a connected service of an image capturing apparatus for a vehicle, the method comprising:
    connecting the image capturing apparatus for a vehicle to a server for providing a connected service using a wireless communication module;
    generating event data including event code information and operation mode information of the image capturing apparatus for a vehicle, when an event occurs in the image capturing apparatus for a vehicle; and
    transmitting the generated event data to the server for providing a connected service through the wireless communication module,
    wherein the event includes a second event including at least one of a parking location image request response event and a live image request response event according to a request in the user terminal device provided with the connected service,
    the method further includes extracting an image of a time point corresponding to the second event when the second event occurs and generating image upload data, and
    in the transmitting of the generated event data, the second event data and the image upload data are transmitted to the server for providing a connected service through the wireless communication module.

4. The method for providing a connected service of claim 1, wherein the event includes a third event corresponding to an advance driving assistance system (ADAS) event, and
    the method further includes generating third event data including the type of the third event, an occurrence time of the third event, and an occurrence location of the third event, when the third event occurs.

5. The method for providing a connected service of claim 4, wherein the ADAS includes at least two of a front vehicle start notification, a front vehicle collision notification, and a lane departure notification.

6. A method for providing a connected service of an image capturing apparatus for a vehicle, the method comprising:
    connecting the image capturing apparatus for a vehicle to a server for providing a connected service using a wireless communication module;
    generating event data including event code information and operation mode information of the image capturing apparatus for a vehicle, when an event occurs in the image capturing apparatus for a vehicle; and
    transmitting the generated event data to the server for providing a connected service through the wireless communication module,
    wherein the method for providing the connected service further comprising:
    generating data for terminal registration request of the image capturing apparatus for a vehicle upon initial connection of the image capturing apparatus for a vehicle and transmitting the generated data to the server for providing a connected service through the wireless communication module; and
    receiving registration request response data including at least one of a traffic information day use time limit, a parking location image remaining count, a live image remaining count, and an impact image remaining count from the server for providing a connected service as a response to the terminal registration request.

7. The method for providing a connected service of claim 6, wherein the terminal registration request is repeatedly performed whenever the power of the image capturing apparatus for a vehicle is turned on.

8. The method for providing a connected service of claim 1, wherein the wireless communication module is NB-IOT or CAT-M1.

9. The method for providing a connected service of claim 1, wherein in the generating of the image upload data, the image capturing apparatus for a vehicle adjusts a size of data to be transmitted to the server in consideration of data communication speed with the server for providing a connected service, a state of a battery of the image capturing apparatus for a vehicle, and a size of a storage space allocated to the server for providing a connected service.

10. An image capturing apparatus for a vehicle, comprising:
    a communication unit communicating with a server for providing a connected service; and
    a control unit generating event data including event code information and operation mode information of the image capturing apparatus for a vehicle, when an event occurs in the image capturing apparatus for a vehicle, and controlling the communication unit to transmit the generated event data to the server for providing a connected service,
    wherein the event includes a first event including at least one of an impact occurrence event while parked, an impact occurrence event while driving, and a movement occurrence event while parked, the control unit:
extracts at least two images of images captured within a predetermined time range of an occurrence of the first event when the first event occurs, and generates image upload data using the extracted images, and
transmits the first event data and the image upload data to the server for providing a connected service through the communication unit.

11. The image capturing apparatus for a vehicle claim 10, wherein the image upload data includes total image count information.

12. An image capturing apparatus for a vehicle, comprising:
a communication unit communicating with a server for providing a connected service; and
a control unit generating event data including event code information and operation mode information of the image capturing apparatus for a vehicle, when an event occurs in the image capturing apparatus for a vehicle, and controlling the communication unit to transmit the generated event data to the server for providing a connected service,
wherein the event includes a second event including at least one of a parking location image request response event and a live image request response event according to a request in the user terminal device provided with the connected service,
the control unit:
extracts an image of a time point corresponding to the second event when the second event occurs and generates image upload data, and
transmits the second event data and the image upload data to the server for providing a connected service through the communication unit.

13. The image capturing apparatus for a vehicle claim 10, wherein the event includes a third event corresponding to an advance driving assistance system (ADAS) event, and
the control unit generates third event data including the type of the third event, an occurrence time of the third event, and an occurrence location of the third event, when the third event occurs.

14. The image capturing apparatus for a vehicle claim 13, wherein the ADAS includes at least two of a front vehicle start notification, a front vehicle collision notification, and a lane departure notification.

15. An image capturing apparatus for a vehicle, comprising:
a communication unit communicating with a server for providing a connected service; and
a control unit generating event data including event code information and operation mode information of the image capturing apparatus for a vehicle, when an event occurs in the image capturing apparatus for a vehicle, and controlling the communication unit to transmit the generated event data to the server for providing a connected service,
wherein the control unit controls to generate data for terminal registration request of the image capturing apparatus for a vehicle upon initial connection of the image capturing apparatus for a vehicle and transmit the generated data to the server for providing a connected service through the communication unit, and
the communication unit receives registration request response data including at least one of a traffic information day use time limit, a parking location image remaining count, a live image remaining count, and an impact image remaining count from the server for providing a connected service as a response to the terminal registration request.

16. The image capturing apparatus for a vehicle claim 15, wherein the terminal registration request is repeatedly performed whenever the power of the image capturing apparatus for a vehicle is turned on.

17. The image capturing apparatus for a vehicle claim 10, wherein the control unit adjusts a size of data to be transmitted to the server in consideration of data communication speed of the image capturing apparatus for a vehicle with the server for providing a connected service, a state of a battery of the image capturing apparatus for a vehicle, and a size of a storage space allocated to the server for providing a connected service.

18. A non-transitory computer readable recording storage medium containing instructions that, when executed by one or more processors, cause the one or more processors to perform a method for providing a connected service of an image capturing apparatus for a vehicle, the method comprising:
connecting the image capturing apparatus for a vehicle to a server for providing a connected service using a wireless communication module;
generating event data including event code information and operation mode information of the image capturing apparatus for a vehicle, when an event occurs in the image capturing apparatus for a vehicle; and
transmitting the generated event data to the server for providing a connected service through the wireless communication module,
wherein the event includes a first event including at least one of an impact occurrence event while parked, an impact occurrence event while driving, and a movement occurrence event while parked,
the method further includes extracting at least two images of images captured within a predetermined time range of an occurrence of the first event when the first event occurs, and generating image upload data using the extracted images, and
in the transmitting of the generated event data, the first event data and the image upload data are transmitted to the server for providing a connected service through the wireless communication module.

* * * * *